United States Patent
Hirata et al.

(10) Patent No.: US 9,348,210 B2
(45) Date of Patent: May 24, 2016

(54) PROJECTION APPARATUS AND TRANSPARENT SCREEN FOR IT

(71) Applicant: Hitachi Maxell, Ltd., Osaka (JP)

(72) Inventors: Koji Hirata, Yokohama (JP); Masahiko Yatsu, Fujisawa (JP); Hidehiro Ikeda, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 227 days.

(21) Appl. No.: 14/065,669

(22) Filed: Oct. 29, 2013

(65) Prior Publication Data

US 2014/0055757 A1 Feb. 27, 2014

Related U.S. Application Data

(63) Continuation of application No. 12/777,364, filed on May 11, 2010, now Pat. No. 8,585,209.

(30) Foreign Application Priority Data

May 12, 2009 (JP) ................................. 2009-115132

(51) Int. Cl.
*G03B 21/26* (2006.01)
*G03B 21/62* (2014.01)
*G02B 13/18* (2006.01)
*H04N 7/14* (2006.01)
*G03B 21/10* (2006.01)

(52) U.S. Cl.
CPC ................ *G03B 21/62* (2013.01); *G02B 13/18* (2013.01); *G03B 21/10* (2013.01); *H04N 7/142* (2013.01)

(58) Field of Classification Search
CPC ........ G02B 13/18; G03B 21/14; G03B 21/62; H04N 7/142
See application file for complete search history.

(56) References Cited

U.S. PATENT DOCUMENTS 6,144,503 A 11/2000 Sugano
7,116,476 B2 10/2006 Suzuki et al.
(Continued)

FOREIGN PATENT DOCUMENTS

EP 2 026 571 A2 2/2009
JP 04-080369 3/1992
(Continued)

OTHER PUBLICATIONS

Japanese Office Action dated May 13, 2014 for Application No. 2013-181754.
(Continued)

*Primary Examiner* — Sultan Chowdhury
*Assistant Examiner* — Danell L Owens
(74) *Attorney, Agent, or Firm* — Baker Botts L.L.P.

(57) ABSTRACT

There is provided a projection apparatus using an oblique projection optical system, which generates little reflection loss by providing a linear Fresnel lens at an incident surface in the case where the apparatus is used as a linear system, wherein said linear Fresnel lens makes total reflection of image light, and is capable of obtaining total surface property with good brightness in a region with small incident angle onto a screen, by using a total reflection Fresnel lens and a refraction Fresnel lens in combination. In addition, total surface property with further good brightness can be obtained by using a plurality of projection image display apparatuses in the same projection apparatus.

23 Claims, 41 Drawing Sheets

(56) References Cited

U.S. PATENT DOCUMENTS

| | | | |
|---|---|---|---|
| 7,170,687 B2 | 1/2007 | Kobayashi | |
| 7,245,429 B2 | 7/2007 | Yoshikawa et al. | |
| 7,369,311 B2 | 5/2008 | Kokuzawa et al. | |
| 7,572,014 B2 | 8/2009 | Suzuki et al. | |
| 7,586,687 B2 | 9/2009 | Yoshikawa et al. | |
| 2001/0002735 A1* | 6/2001 | Hirota et al. | 264/2.2 |
| 2002/0070278 A1* | 6/2002 | Hung et al. | 235/472.01 |
| 2003/0137729 A1* | 7/2003 | Goto et al. | 359/457 |
| 2004/0001254 A1* | 1/2004 | Shimizu | 359/449 |
| 2004/0160681 A1 | 8/2004 | Sekiguchi et al. | |
| 2004/0227990 A1 | 11/2004 | Peterson et al. | |
| 2004/0252284 A1* | 12/2004 | Suzuki et al. | 353/77 |
| 2005/0259336 A1* | 11/2005 | Kobayashi | 359/782 |
| 2005/0270431 A1* | 12/2005 | Conner et al. | 348/744 |
| 2007/0097337 A1 | 5/2007 | Morikuni et al. | |
| 2007/0279736 A1 | 12/2007 | Endo et al. | |
| 2008/0137040 A1 | 6/2008 | Rodriguez et al. | |
| 2008/0204901 A1* | 8/2008 | Amano et al. | 359/742 |

FOREIGN PATENT DOCUMENTS

| | | |
|---|---|---|
| JP | 04-223780 | 8/1992 |
| JP | 04-266276 | 9/1992 |
| JP | 08-201603 | 8/1996 |
| JP | 2001-249407 A | 9/2001 |
| JP | 2002-207168 | 7/2002 |
| JP | 2002-350774 | 12/2002 |
| JP | 2003-330108 | 11/2003 |
| JP | 2004-085752 | 3/2004 |
| JP | 2004-212770 | 7/2004 |
| JP | 2005-091541 | 4/2005 |
| JP | 2005-331649 | 12/2005 |
| JP | 2006-065185 | 3/2006 |
| JP | 2006-259252 | 9/2006 |
| JP | 2006-276526 | 10/2006 |
| JP | 2006-292900 | 10/2006 |
| JP | 3864051 | 10/2006 |
| JP | 2007-079524 | 3/2007 |
| JP | 2007-293172 | 11/2007 |
| JP | 2007-328359 | 12/2007 |
| JP | 2008-146221 | 6/2008 |
| JP | 2008-181155 | 8/2008 |
| JP | 2008-250296 | 10/2008 |
| JP | 2009-42454 | 2/2009 |
| WO | WO 00/52526 | 9/2000 |
| WO | WO02/27399 | 4/2002 |
| WO | WO 2007/046506 A1 | 4/2007 |

OTHER PUBLICATIONS

Japanese Office Action dated Nov. 6, 2012 for Application No. 2009-115132.

* cited by examiner

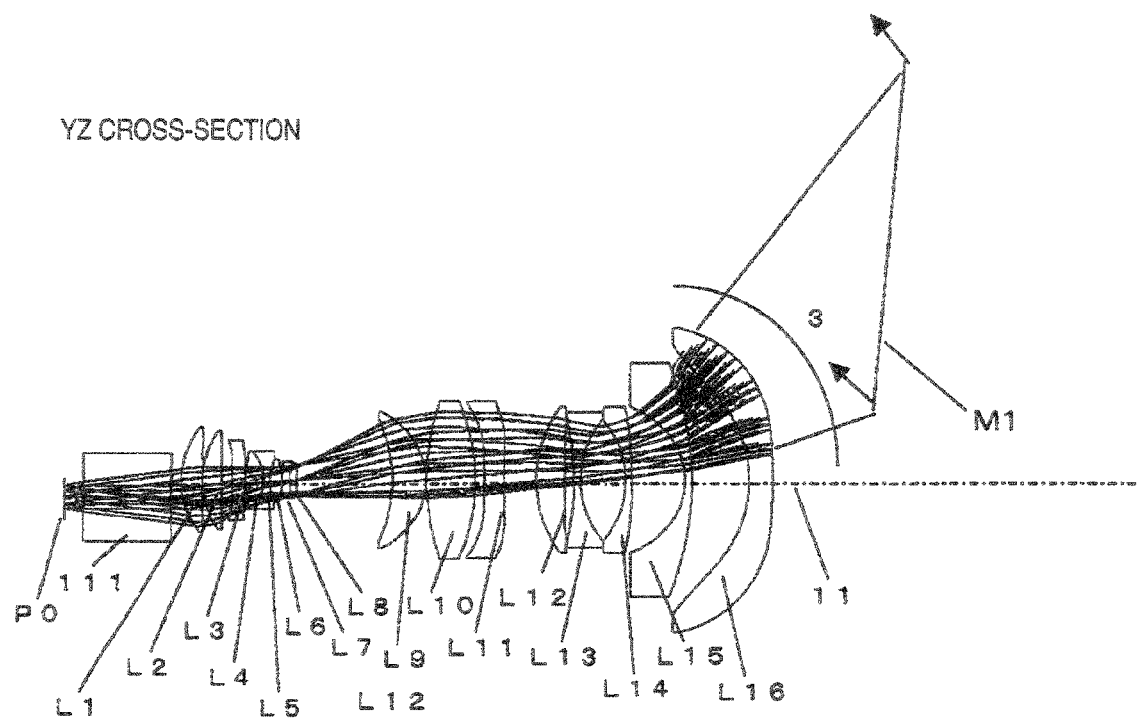

FIG.25A

| NAME | SURFACE NO. | SHAPE | CURVATURE RADIUS | DISTANCE BETWEEN SURFACES | REFRACTIVE INDEX / Abbe NUMBER | EFFECTIVE RADIUS (RADIUS) |
|---|---|---|---|---|---|---|
| OBJECT SURFACE | (0) | SPHARE | ∞ | 3000 | | |
| INCIDENT PUPIL | (1) | SPHARE | ∞ | -3000 | | |
| | (2) | SPHARE | ∞ | 5.977 | | |
| CONVERSION FILTER | (3) | SPHARE | ∞ | 26.395 | 1.5168 / 64.20 | |
| | (4) | SPHARE | ∞ | 2.9000 | | |
| L1 | (5) | SPHARE | 33.3860 | 6.08 | 1.8467 / 23.78 | 17.22 |
| | (6) | SPHARE | 291.769 | 0.200 | | 16.9 |
| L2 | (7) | SPHARE | 34.059 | 5.840 | 1.8467 / 23.78 | 15.86 |
| | (8) | SPHARE | -726.066 | 3.023 | | 15.2 |
| L3 | (9) | ASPHERICAL | 154.0648 | 4.000 | 1.5251 / 56.46 | 12.8 |
| | (10) | ASPHERICAL | 236.3251 | 0.200 | | 11.46 |
| L4 L5 L6 | (11) | SPHARE | 44.6633 | 5.428 | 1.4875 / 70.44 | 9.82 |
| | (12) | SPHARE | -16.5979 | 2.000 | 1.8467 / 23.78 | 8.66 |
| | (13) | SPHARE | 18.1922 | 3.828 | 1.4875 / 70.44 | 7.2 |
| | (14) | SPHARE | -21.9158 | 0.2 | | 6.96 |
| L7 L8 | (15) | SPHARE | -195.1310 | 2 | 1.8467 / 23.78 | 6.35 |
| | (16) | SPHARE | 15.8472 | 2.28 | 1.4875 / 70.44 | 5.76 |
| | (17) | SPHARE | -130.2177 | 0.282 | | 5.74 |
| APERTURE | (18) | SPHARE | ∞ | 28.525 | | 5.7669 |
| L9 | (19) | SPHARE | -56.4261 | 9.972 | 1.58144 / 40.89 | 21.4 |
| | (20) | SPHARE | -27.7268 | 0.200 | | 22.4 |
| L10 | (21) | SPHARE | 97.3236 | 14.498 | 1.64769 / 33.84 | 26 |
| | (22) | SPHARE | -78.9271 | 2.764 | | 26.18 |
| L11 | (23) | ASPHERICAL | 17912.7756 | 6 | 1.4909 / 58.03 | 25.67 |
| | (24) | ASPHERICAL | 104.9443 | 9.505 | | 26.2 |
| L12 | (25) | SPHARE | 48.9383 | 8.508 | 1.8467 / 23.78 | 24.15 |
| | (26) | SPHARE | 1165.9755 | 2.677 | | 23.4 |
| L13 | (27) | SPHARE | -113.337 | 2 | 1.74400 / 44.90 | 23.4 |
| | (28) | SPHARE | 36.138 | 13.754 | | 21.08 |
| L14 | (29) | SPHARE | -35.4445 | 2.000 | 1.80420 / 46.50 | 21.08 |
| | (30) | SPHARE | -150.6840 | 16.133 | | 24 |
| L15 | (31) | SPHARE | -27.5039 | 2 | 1.80420 / 46.50 | 25.28 |
| | (32) | SPHARE | -121.761 | 17.105 | | 39.25 |
| L16 | (33) | ASPHERICAL | -53.0389 | 7 | 1.4909 / 58.03 | 46.800 |
| | (34) | ASPHERICAL | -630.8458 | Z(OTHER TABLE) | | 52.500 |
| IMAGE SURFACE | (35) | SPHARE | ∞ | 0 | | |

FIG.25B $$Z = \frac{c \cdot h2}{1+\sqrt{1-(1+K)c2 \cdot h2}} + A \times h4 + B \times h6 + C \times h8 + D \times h10 + E \times h12 + F \times h14 + G \times h16 + H \times h18 + J \times h20 \quad \text{(EQUATION 1)}$$

| | SURFACE 9 | SURFACE 10 | SURFACE 23 | SURFACE 24 | SURFACE 33 | SURFACE 34 |
|---|---|---|---|---|---|---|
| 1/c | 154.0648 | 236.3251 | 17912.7756 | 104.9443 | -53.0389 | -630.8458 |
| K | 0 | 0 | 0 | 0 | 0 | 0 |
| A | -5.53275E-05 | -4.26343E-05 | -1.68081E-05 | -1.98695E-05 | -2.64101E-06 | -5.60554E-06 |
| B | -4.25424E-08 | -1.06576E-07 | 9.47872E-09 | 1.41385E-08 | 1.48254E-09 | 3.69316E-09 |
| C | 1.11533E-09 | 1.87854E-09 | 7.98423E-12 | 3.40829E-13 | 1.44383E-13 | -2.15871E-12 |
| D | -3.38000E-12 | -1.00894E-11 | -2.48775E-14 | -1.67995E-14 | -6.01192E-17 | 6.07712E-16 |
| E | -2.00200E-14 | -9.92516E-14 | 1.04594E-17 | 1.26685E-17 | 2.83203E-20 | 3.61378E-20 |
| F | 9.26988E-17 | 6.77746E-16 | 4.44289E-20 | 2.13486E-20 | 1.19401E-23 | -6.39771E-23 |
| G | 6.66549E-19 | 5.91739E-18 | -5.19672E-23 | -2.38992E-23 | -5.17162E-27 | -3.48383E-27 |
| H | -5.04272E-21 | -6.45314E-20 | -1.31093E-26 | -1.88830E-26 | -4.83548E-30 | 9.34649E-30 |
| J | 7.90195E-24 | 1.60725E-22 | 2.74980E-29 | 2.19071E-29 | 1.71219E-33 | -1.75388E-33 |

DISTANCE BETWEEN SURFACES

| | | 60 INCH | 80 INCH | 100 INCH |
|---|---|---|---|---|
| DISTANCE BETWEEN SURFACES | S30 SURFACE | 16.697 | 16.133 | 15.778 |
| | S34 SURFACE | 650.146 | 885.600 | 1121.190 |

FIG.27
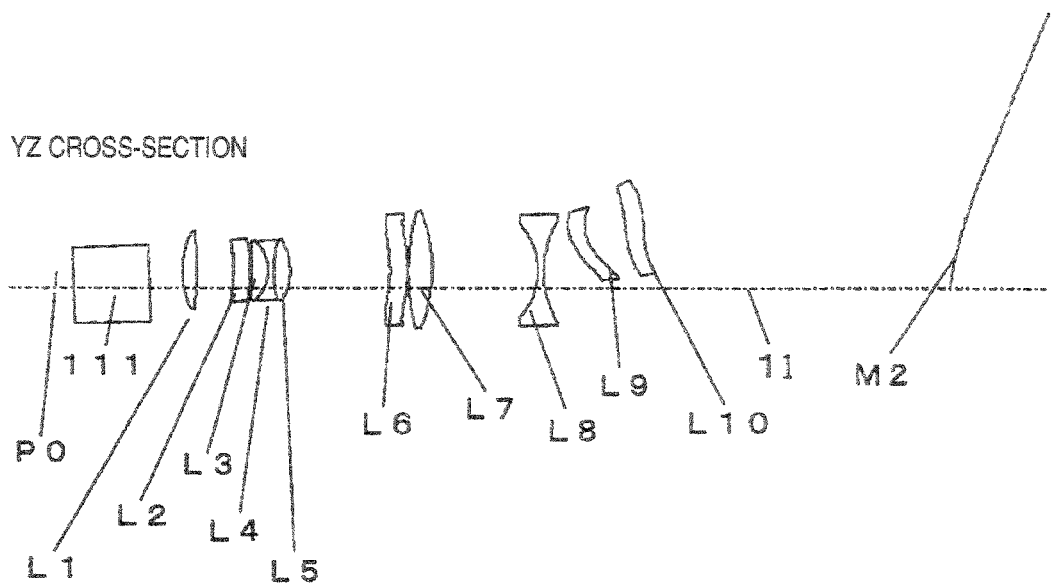
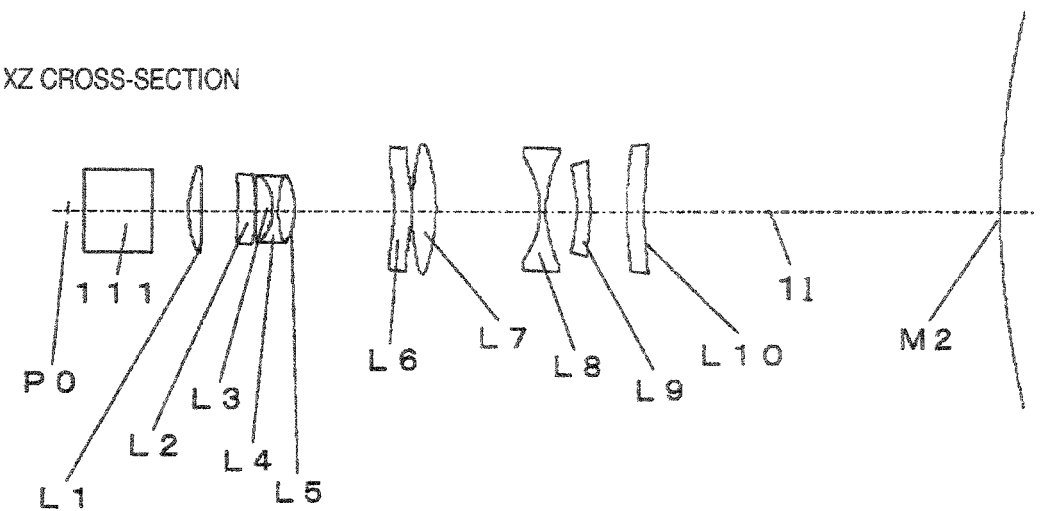

FIG.28A

| NAME | SURFACE NO. | SAHPE | CURVATURE RADIUS | DISTANCE BETWEEN SURFACES | REFRACTIVE INDEX / Abbe NUMBER |
|---|---|---|---|---|---|
| OBJECT SURFACE | (0) | SPHERE | ∞ | 5.977 | |
| CONVERSION FILTER | (1) | SPHERE | ∞ | 26.395 | 1.51680/64.20 |
| | (2) | SPHERE | ∞ | 11.5465284 | |
| L1 | (3) | SPHERE | 40.176 | 4.9 | 1.84666/23.78 |
| | (4) | SPHERE | -176.637 | 12.648 | |
| L2 | (5) | ASPHERICAL | -167.959 | 5.89 | 1.5251/56.46 |
| | (6) | ASPHERICAL | -122.832 | 0.300 | |
| L3 | (7) | SPHERE | 401.653 | 6 | 1.48749/70.44 |
| L4 | (8) | SPHERE | -17.707 | 2 | 1.84666/23.78 |
| L5 | (9) | SPHERE | 50.018 | 5.7 | 1.48749/70.44 |
| | (10) | SPHERE | -26.002 | 0 | |
| | (11) | SPHERE | ∞ | 35.974 | |
| L6 | (12) | ASPHERICAL | -86.6459 | 6 | 1.4909/58.03 |
| | (13) | ASPHERICAL | -62.2313 | 0.3 | |
| L7 | (14) | SPHERE | 105.0660 | 8.3 | 1.80610/33.27 |
| | (15) | SPHERE | -71.1810 | 36.896 | |
| L8 | (16) | SPHERE | -30.4830 | 2 | 1.48749/70.44 |
| | (17) | SPHERE | 45.8480 | 19.722 | |
| L9 | (18) | XY POLYNOMIAL SURFACE | ∞ | 6 | 1.4909/58.03 |
| | (19) | XY POLYNOMIAL SURFACE | ∞ | 5.146 | |
| L10 | (20) | XY POLYNOMIAL SURFACE | ∞ | 6 | 1.4909/58.03 |
| | (21) | XY POLYNOMIAL SURFACE | ∞ | 119.906 | |
| M1 | (22) | XY POLYNOMIAL SURFACE | ∞ | 0 | REFLECTION SURFACE |
| | (23) | SPHERE | ∞ | Z(OTHER TABLE) | |
| IMAGE SURFACE | (24) | SPHERE | ∞ | 0 | |

ASPHERICAL SURFACE COEFFICIENT $$Z = \frac{c \cdot h^2}{1 + \sqrt{1-(1+K)c^2 \cdot h^2}} + A \times h^4 + B \times h^6 + C \times h^8 + D \times h^{10} + E \times h^{12} + F \times h^{14} + G \times h^{16} + H \times h^{18} + J \times h^{20}$$

| | SURFACE 5 | SURFACE 6 | SURFACE 12 | SURFACE 13 |
|---|---|---|---|---|
| 1/c | -167.959 | -122.832 | -66.6459 | -62.2313 |
| K | 172.744 | 0 | -0.153937 | 0.206380 |
| A | -2.66335E-05 | -2.38519E-05 | 3.76738E-06 | 3.96741E-06 |
| B | 7.92220E-08 | 3.17440E-08 | 1.42797E-08 | 1.09868E-08 |
| C | -5.26342E-10 | -1.61512E-10 | 3.16419E-11 | 1.58678E-11 |
| D | 6.67854E-12 | 3.52176E-12 | -9.44863E-14 | -5.49933E-15 |
| E | 7.04598E-15 | 8.65105E-15 | -7.39034E-17 | -1.15325E-16 |
| F | -3.43447E-16 | -3.83917E-16 | 1.07298E-18 | 1.50989E-19 |
| G | -5.57170E-19 | -1.00491E-18 | -2.85225E-21 | 7.93244E-22 |
| H | 2.04723E-20 | 3.44806E-20 | 2.57004E-24 | -2.80136E-24 |
| J | -5.52648E-23 | -1.20548E-22 | 1.18394E-29 | 2.53254E-27 |

CHANGE OF DISTANCE BETWEEN SURFACES

| | | 60 INCH | 80 INCH | 100 INCH |
|---|---|---|---|---|
| DISTANCE BETWEEN SURFACES Z (mm) | s17 | 19.889 | 19.722 | 19.646 |
| | s19 | 6.846 | 5.146 | 4.079 |
| | s21 | 118.038 | 119.906 | 121.048 |
| | s23 | -646.189 | -882.074 | -1117.63 |

FIG.28B

FREE CURVED SURFACE COEFFICIENT $$z = \frac{c \cdot (x^2+y^2)}{1+\sqrt{1-(1+K) \cdot c^2 \cdot (x^2+y^2)}} + \sum\sum Cj(m,n) \cdot x^m \cdot y^n$$

$$j = [(m+n)2+m+3n]/2+1$$

| CODE | | SURFACE 18 | SURFACE 19 | SURFACE 20 | SURFACE 21 | SURFACE 22 |
|---|---|---|---|---|---|---|
| 1/R | c | 0 | 0 | 0 | 0 | 0 |
| K | K | 0 | 0 | 0 | 0 | 0 |
| C3 | $Y^1$ | 0.751345217 | 0.78007117 | 0.317146197 | 0.282854435 | 0.544526224 |
| C4 | $X^2$ | -0.01758175 | -0.011522589 | 0.00789724 | 0.009148087 | 0.003714338 |
| C6 | $Y^2$ | -0.02124885 | -0.027915463 | 0.019783429 | 0.024311975 | 0.000924242 |
| C8 | $X^2Y$ | 0.000222852 | 0.000410962 | 0.000172737 | 0.000152295 | 6.02681E-05 |
| C10 | $Y^3$ | -0.001815279 | -0.002003168 | 0.000578679 | 0.000810141 | 2.07306E-05 |
| C11 | $X^4$ | -3.08048E-05 | -3.06833E-05 | -1.52049E-05 | -1.69764E-05 | -1.75992E-07 |
| C13 | $X^2Y^2$ | 9.50625E-05 | 7.78647E-05 | -3.37202E-05 | -4.88457E-05 | 7.26017E-07 |
| C15 | $Y^4$ | 3.03736E-05 | 4.75846E-05 | -1.93278E-05 | -1.94222E-05 | 2.93839E-07 |
| C17 | $X^4Y$ | -3.62457E-06 | -3.38545E-06 | -1.38678E-06 | -1.2879E-06 | -5.87712E-09 |
| C19 | $X^2Y^3$ | 1.6436E-06 | -1.30846E-06 | -1.786E-06 | -2.36902E-06 | 6.93373E-09 |
| C21 | $Y^5$ | 2.68751E-06 | 2.23615E-06 | -1.44908E-06 | -1.55877E-06 | 3.7941E-09 |
| C22 | $X^6$ | 1.13872E-07 | 6.93151E-08 | 1.62591E-08 | 1.5632E-08 | 2.56251E-11 |
| C24 | $X^4Y^2$ | -2.76227E-07 | -8.74443E-08 | -2.99468E-08 | 6.47985E-09 | -1.19259E-10 |
| C26 | $X^2Y^4$ | -1.92564E-07 | -1.65778E-07 | -2.12785E-08 | -8.72645E-09 | 2.15129E-11 |
| C28 | $Y^6$ | -4.67109E-10 | -3.89024E-08 | -3.34103E-08 | -2.85206E-08 | 3.73103E-11 |
| C30 | $X^6Y$ | -1.20879E-08 | -1.1772E-08 | 1.27991E-09 | 1.70847E-09 | 7.42243E-13 |
| C32 | $X^4Y^3$ | -1.05915E-08 | 5.64453E-09 | -7.1992E-10 | 2.02511E-09 | -1.71322E-12 |
| C34 | $X^2Y^5$ | -9.46258E-09 | 2.79616E-09 | 7.89308E-10 | 2.41317E-09 | -1.0714E-12 |
| C36 | $Y^7$ | 4.9728E-10 | 5.18671E-10 | -4.36801E-10 | 3.17904E-10 | 4.63964E-13 |
| C37 | $X^8$ | -1.07985E-10 | -5.10075E-11 | -1.80567E-11 | -1.42035E-11 | -3.16657E-15 |
| C39 | $X^6Y^2$ | -1.19793E-10 | -7.01E-10 | 3.98188E-11 | 3.18713E-11 | 1.31587E-14 |
| C41 | $X^4Y^4$ | 2.80851E-10 | 2.48715E-10 | -4.84575E-11 | 2.46308E-11 | -1.9509E-14 |
| C43 | $X^2Y^6$ | 2.9954E-11 | 2.73242E-10 | 3.81109E-11 | 4.79457E-11 | -2.32612E-14 |
| C45 | $Y^8$ | 6.5869E-11 | 6.47438E-11 | 4.89405E-12 | 2.00339E-11 | 7.93177E-15 |
| C47 | $X^8Y$ | 6.94945E-11 | 4.35876E-11 | -7.8119E-13 | -1.47199E-12 | -6.54372E-17 |
| C49 | $X^6Y^3$ | 3.7162E-11 | -1.70584E-11 | 1.03985E-12 | -7.10612E-13 | 1.49368E-16 |
| C51 | $X^4Y^5$ | 2.86518E-11 | 1.74347E-12 | -2.41585E-12 | -1.94158E-12 | -1.65368E-16 |
| C53 | $X^2Y^7$ | 5.26582E-12 | 7.06206E-13 | 3.20388E-13 | -1.12981E-12 | -1.95843E-16 |
| C55 | $Y^9$ | -2.75688E-12 | -2.04243E-12 | 7.20951E-13 | 2.40184E-13 | 8.07433E-17 |
| C56 | $X^{10}$ | 3.54774E-13 | 2.19244E-13 | 2.49719E-14 | 1.64795E-14 | 7.48982E-20 |
| C58 | $X^8Y^2$ | 3.06388E-12 | 1.72361E-12 | -4.25312E-14 | -5.97791E-14 | -5.10157E-19 |
| C60 | $X^6Y^4$ | 4.36927E-13 | -4.88938E-13 | 2.28321E-14 | -1.05274E-14 | 8.39697E-19 |
| C62 | $X^4Y^6$ | 5.73606E-13 | 4.39862E-14 | -4.41159E-14 | -4.63017E-14 | -7.37124E-19 |
| C64 | $X^2Y^8$ | -9.59911E-15 | -1.02118E-13 | -1.20084E-14 | -3.50914E-14 | -5.89462E-19 |
| C66 | $Y^{10}$ | -1.10234E-13 | -7.22795E-14 | 1.18093E-14 | -1.22963E-15 | 3.12009E-19 |

FIG.30A

| NAME | SURFACE NO. | SHAPE | CURVATURE RADIUS | DISTANCE BE-TWEEN SURFACES | REFRACTIVE INDEX / Abbe NUMBER |
|---|---|---|---|---|---|
| OBJECT SURFACE | (0) | SPHERE | ∞ | 3000 | |
| INCIDENT PUPIL | (1) | SPHERE | ∞ | -3000 | |
| | (2) | SPHERE | ∞ | 8.776 | |
| CONVERSION FILTER | (3) | SPHERE | ∞ | 29.968 | 1.51680/64.20 |
| | (4) | SPHERE | ∞ | 2.0000 | |
| L1 | (5) | SPHERE | 29.5573 | 8.05 | 1.84666/23.78 |
| | (6) | SPHERE | -349.057 | 6.852 | |
| L2 | (7) | ASPHERICAL | 37.9013 | 4.000 | 1.5251/56.46 |
| | (8) | ASPHERICAL | 36.2088 | 0.300 | |
| L3 | (9) | SPHERE | 40.7041 | 7.600 | 1.48749/70.44 |
| L4 | (10) | SPHERE | -21.6220 | 2.000 | 1.84666/23.78 |
| L5 | (11) | SPHERE | 16.6592 | 5.400 | 1.48749/70.44 |
| | (12) | SPHERE | -28.2280 | 0.2 | |
| L6 | (13) | SPHERE | -155.2213 | 2 | 1.72825/28.32 |
| | (14) | SPHERE | -3200.4136 | 2.058 | |
| APERTURE | (15) | SPHERE | ∞ | 25.868 | |
| L7 | (16) | SPHERE | -176.6205 | 5.150 | 1.80610/33.27 |
| | (17) | SPHERE | -33.2193 | 0.300 | |
| L8 | (18) | ASPHERICAL | 24.8635 | 4.000 | 1.4909/58.03 |
| | (19) | ASPHERICAL | 21.4581 | 23.848 | |
| L9 | (20) | SPHERE | 762.5671 | 3.6 | 1.68893/31.16 |
| | (21) | SPHERE | -97.7293 | 13.221 | |
| L10 | (22) | SPHERE | -27.4129 | 2.000 | 1.51680/64.20 |
| | (23) | SPHERE | 302.6168 | 16.154 | |
| L11 | (24) | XY POLYNOMIAL SURFACE | ∞ | 5.5 | 1.4909/58.03 |
| | (25) | XY POLYNOMIAL SURFACE | ∞ | 13.746 | |
| L12 | (26) | XY POLYNOMIAL SURFACE | ∞ | 6.500 | 1.4909/58.03 |
| | (27) | XY POLYNOMIAL SURFACE | ∞ | 138 | |
| DUMMY SURFACE | (28) | SPHERE | ∞ | 0 | |
| M | (29) | XY POLYNOMIAL SURFACE | ∞ | 0.000 | |
| DUMMY SURFACE | (30) | SPHERE | ∞ | Z(OTHER TABLE) | |
| IMAGE SURFACE | (31) | SPHERE | ∞ | 0 | |

ASPHERICAL SURFACE COEFFICIENT $$Z = \frac{c \cdot h^2}{1+\sqrt{1-(1+K)c^2 \cdot h^2}} + A \times h^4 + B \times h^6 + C \times h^8 + D \times h^{10} + E \times h^{12} + F \times h^{14} + G \times h^{16} + H \times h^{18} + J \times h^{20}$$

| | SURFACE 7 | SURFACE 8 | SURFACE 18 | SURFACE 19 |
|---|---|---|---|---|
| 1/c | 37.9013 | 36.2088 | 24.8635 | 21.4581 |
| K | 0 | 0 | 0 | 0 |
| A | -8.80780E-05 | -9.16949E-05 | -4.12807E-05 | -5.50544E-05 |
| B | -1.26498E-07 | -1.16097E-07 | -2.49347E-08 | -9.92681E-09 |
| C | 2.49000E-10 | 5.84407E-10 | 1.16176E-10 | -2.76936E-11 |
| D | 5.10690E-13 | 2.85323E-13 | -6.62044E-13 | 4.90518E-13 |
| E | 3.67318E-14 | 3.57250E-14 | 2.51558E-15 | -1.92651E-15 |
| F | -1.08286E-16 | -1.40212E-16 | -1.10043E-18 | -5.18981E-18 |
| G | -1.35910E-18 | -2.10617E-18 | -4.38566E-20 | 4.03230E-20 |
| H | 8.17204E-21 | 1.51487E-20 | 1.67769E-22 | -7.54970E-23 |
| J | -1.27383E-23 | -2.76639E-23 | -1.92120E-25 | 3.83027E-26 |

DISTANCE BETWEEN SURFACES

| | | 60 INCH | 80 INCH | 100 INCH |
|---|---|---|---|---|
| DISTANCE BE-TWEEN SURFACES Z (mm) | S23 | 15.448 | 16.154 | 16.598 |
| | S25 | 15.407 | 13.746 | 12.659 |
| | S30 | -737.741 | -1000.14 | -1262.29 |

FIG.30B

FREE CURVED SURFACE COEFFICIENT $$z = \frac{c \cdot (x^2 + y^2)}{1 + \sqrt{1 - (1+K) \cdot c^2 \cdot (x^2 + y^2)}} + \sum \sum C_j(m,n) \cdot x^m \cdot y^n$$

$$j = [(m+n)2 + m + 3n]/2 + 1$$

| CODE | | SURFACE 24 | SURFACE 25 | SURFACE 26 | SURFACE 27 | M (MIRROR SURFACE) |
|---|---|---|---|---|---|---|
| 1/R | c | 0 | 0 | 0 | 0 | 0 |
| K | K | 0 | 0 | 0 | 0 | 0 |
| C3 | $y^1$ | -0.033711865 | -0.03287289 | -1.209217423 | -0.942895496 | 0 |
| C4 | $x^2$ | -0.033760554 | -0.028919157 | -0.032125475 | -0.023377796 | 0.003734045 |
| C6 | $y^2$ | -0.037549374 | -0.032261899 | -0.006378474 | -0.007637891 | 0.000974577 |
| C8 | $x^2 y$ | 0.000192255 | 0.000212873 | 0.001541008 | 0.000691526 | -5.44852E-05 |
| C10 | $y^3$ | 1.18036E-05 | 6.47807E-06 | 0.001351066 | 0.000412826 | -2.12237E-05 |
| C11 | $x^4$ | 1.39825E-05 | 1.76715E-05 | 1.1125E-05 | 7.76559E-07 | -2.32275E-07 |
| C13 | $x^2 y^2$ | 7.43611E-05 | 8.09426E-05 | 2.69044E-05 | 3.56573E-06 | 4.66279E-07 |
| C15 | $y^4$ | 5.48622E-05 | 5.55601E-05 | -8.94567E-06 | 1.40687E-05 | 2.52572E-07 |
| C17 | $x^4 y$ | 1.79943E-06 | 1.89288E-06 | 2.7695E-07 | 3.8157E-07 | 7.38445E-09 |
| C19 | $x^2 y^3$ | -1.71752E-06 | 5.36525E-07 | -2.57259E-06 | -1.06806E-06 | -1.08133E-09 |
| C21 | $y^5$ | -3.01587E-06 | -3.056E-07 | -4.25185E-06 | -2.14934E-06 | -1.141E-09 |
| C22 | $x^6$ | 4.96031E-08 | 4.12283E-08 | 3.51886E-08 | 2.35153E-08 | 2.01889E-11 |
| C24 | $x^4 y^2$ | -5.11788E-07 | -2.30221E-07 | -7.86108E-08 | -9.80525E-09 | -1.15944E-10 |
| C26 | $x^2 y^4$ | -3.13265E-07 | -1.13116E-07 | 5.71121E-08 | 6.12726E-08 | -4.5125E-11 |
| C28 | $y^6$ | 8.32938E-08 | -8.13867E-09 | 1.3018E-07 | -1.98403E-08 | -2.97223E-11 |
| C30 | $x^6 y$ | -2.26174E-09 | -2.88847E-09 | -3.84415E-09 | -2.19057E-09 | -7.71492E-13 |
| C32 | $x^4 y^3$ | 2.92489E-08 | 2.2784E-09 | 3.03795E-10 | -6.91821E-10 | 1.01434E-12 |
| C34 | $x^2 y^5$ | 2.4922E-08 | -4.25213E-09 | -1.56196E-09 | -2.31856E-09 | 1.15881E-12 |
| C36 | $y^7$ | 2.54687E-09 | -1.31292E-09 | 8.12824E-09 | 1.87314E-09 | 5.06058E-13 |
| C37 | $x^8$ | -2.28649E-10 | -1.28564E-10 | -7.70475E-11 | -3.51571E-11 | -1.03188E-15 |
| C39 | $x^6 y^2$ | 1.36684E-09 | 3.42266E-10 | 2.21058E-10 | 5.41065E-11 | 1.2181E-14 |
| C41 | $x^4 y^4$ | 1.84146E-09 | 4.56372E-10 | 1.81858E-10 | 8.68556E-12 | -3.86777E-15 |
| C43 | $x^2 y^6$ | -4.62084E-10 | 2.47566E-10 | -3.43141E-10 | -8.28845E-11 | -1.73246E-14 |
| C45 | $y^8$ | 3.44881E-11 | -4.24824E-12 | -2.02803E-10 | 3.37026E-10 | -1.54115E-16 |
| C47 | $x^8 y$ | -1.0375E-12 | 4.22981E-13 | 3.58297E-12 | 1.46777E-12 | 4.37922E-17 |
| C49 | $x^6 y^3$ | -1.29246E-10 | -1.78469E-11 | 1.83053E-12 | 1.81376E-12 | -1.17589E-16 |
| C51 | $x^4 y^5$ | -1.98384E-10 | -2.50323E-11 | 6.165E-12 | 4.36933E-12 | 1.8912E-18 |
| C53 | $x^2 y^7$ | 3.40724E-11 | 6.91869E-12 | 5.30662E-12 | 8.32308E-12 | 1.45543E-16 |
| C55 | $y^9$ | -2.00518E-11 | 1.10692E-12 | -1.30488E-11 | -1.96144E-11 | -4.63099E-17 |
| C56 | $x^{10}$ | 6.42135E-13 | 2.22829E-13 | 5.27741E-14 | 1.70347E-14 | -3.6473E-20 |
| C58 | $x^8 y^2$ | -4.0404E-13 | -1.03778E-13 | -9.19835E-14 | -7.15937E-15 | -3.2781E-19 |
| C60 | $x^6 y^4$ | 3.79659E-12 | 4.46878E-13 | -4.55624E-13 | -6.85439E-14 | 5.62673E-19 |
| C62 | $x^4 y^6$ | 3.96883E-12 | 3.88287E-13 | -4.75575E-14 | -1.25736E-13 | -2.85967E-20 |
| C64 | $x^2 y^8$ | -1.54741E-12 | -3.34649E-13 | 1.68939E-13 | -3.76646E-13 | -5.01102E-19 |
| C66 | $y^{10}$ | 6.48204E-13 | 1.11217E-14 | 3.459E-13 | 2.91921E-13 | 2.58602E-19 |

FIG.31
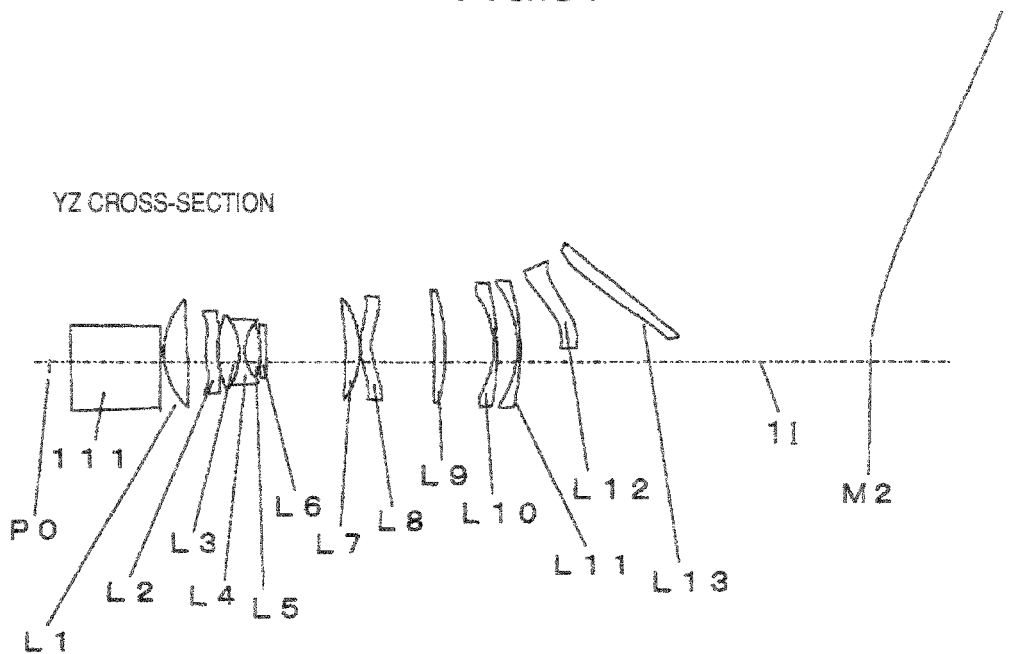
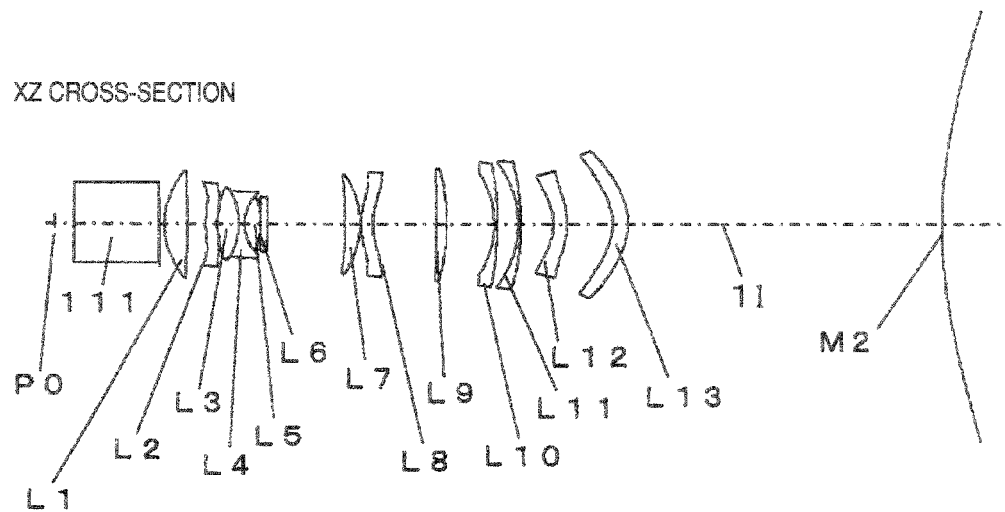

FIG.32A

| NAME | SURFACE NO. | SAHPE | CURVATURE RADIUS | DISTANCE BE-TWEEN SURFACES | REFRACTIVE INDEX / Abbe NUMBER |
|---|---|---|---|---|---|
| OBJECT SURFACE | (0) | SPHERE | ∞ | 3000 | |
| INCIDENT PUPIL | (1) | SPHERE | ∞ | -3000 | |
| | (2) | SPHERE | ∞ | 8.776 | |
| CONVERSION FILTER | (3) | SPHERE | ∞ | 29.968 | 1.51680/64.20 |
| | (4) | SPHERE | ∞ | 2.0000 | |
| L1 | (5) | SPHERE | 29.8099 | 8.05 | 1.84666/23.78 |
| | (6) | SPHERE | -319.613 | 6.440 | |
| L2 | (7) | ASPHERICAL | 34.3146 | 4.000 | 1.5251/56.46 |
| | (8) | ASPHERICAL | 30.9484 | 0.300 | |
| L3 | (9) | SPHERE | 35.8772 | 7.600 | 1.48749/70.44 |
| L4 | (10) | SPHERE | -23.0886 | 2.000 | 1.84666/23.78 |
| L5 | (11) | SPHERE | 15.7813 | 5.400 | 1.48749/70.44 |
| | (12) | SPHERE | -30.9444 | 0.2 | |
| L6 | (13) | SPHERE | -198.3317 | 2 | 1.72825/28.32 |
| | (14) | SPHERE | 2500.4535 | 2.827 | |
| APERTURE | (15) | SPHERE | ∞ | 24.933 | |
| L7 | (16) | SPHERE | -128.2388 | 5.150 | 1.80610/33.27 |
| | (17) | SPHERE | -31.7162 | 0.300 | |
| L8 | (18) | ASPHERICAL | 25.9279 | 4.000 | 1.4909/58.03 |
| | (19) | ASPHERICAL | 22.0958 | 22.078 | |
| L9 | (20) | SPHERE | -250.7098 | 3.6 | 1.68893/31.16 |
| | (21) | SPHERE | -76.6797 | 16.906 | |
| L10 | (22) | SPHERE | -32.2799 | 1.100 | 1.51680/64.20 |
| | (23) | SPHERE | -109.0631 | 7.317 | |
| L11 | (24) | SPHERE | -37.5917 | 1.100 | 1.51680/64.20 |
| | (25) | SPHERE | -83.9810 | 14.519 | |
| L12 | (26) | XY POLYNOMIAL SURFACE | ∞ | 5.5 | 1.4909/58.03 |
| | (27) | XY POLYNOMIAL SURFACE | ∞ | 17.382 | |
| L13 | (28) | XY POLYNOMIAL SURFACE | ∞ | 6.500 | 1.4909/58.03 |
| | (29) | XY POLYNOMIAL SURFACE | ∞ | 0.000 | |
| DUMMY SURFACE | (30) | SPHERE | ∞ | 138 | |
| M | (31) | XY POLYNOMIAL SURFACE | ∞ | 0.000 | REFLECTION SURFACE |
| DUMMY SURFACE | (32) | SPHERE | ∞ | Z(OTHER TABLE) | |
| IMAGE SURFACE | (33) | SPHERE | ∞ | 0 | |

ASPHERICAL SURFACE COEFFICIENT $$Z = \frac{c \cdot h^2}{1+\sqrt{1-(1+K)c^2 \cdot h^2}} + A \times h^4 + B \times h^6 + C \times h^8 + D \times h^{10} + E \times h^{12} + F \times h^{14} + G \times h^{16} + H \times h^{18} + J \times h^{20}$$

| | SURFACE 7 | SURFACE 8 | SURFACE 18 | SURFACE 19 |
|---|---|---|---|---|
| 1/c | 34.3146 | 30.9484 | 25.9279 | 22.0958 |
| K | 0 | 0 | 0 | 0 |
| A | -8.78989E-05 | -9.35003E-05 | -4.31862E-05 | -5.64328E-05 |
| B | -1.22442E-07 | -1.29391E-07 | -2.05325E-08 | 5.06145E-10 |
| C | 2.88631E-10 | 7.20259E-10 | 1.25314E-10 | -3.48473E-11 |
| D | -1.74138E-13 | -4.90455E-13 | -6.72912E-13 | 5.21682E-13 |
| E | 3.77580E-14 | 3.51088E-14 | 2.50539E-15 | -1.81035E-15 |
| F | -9.83879E-17 | -1.19511E-16 | -7.27209E-19 | -5.37639E-18 |
| G | -1.36812E-18 | -2.08764E-18 | -4.37912E-20 | 3.94879E-20 |
| H | 8.00978E-21 | 1.45106E-20 | 1.61563E-22 | -7.40050E-23 |
| J | -1.23737E-23 | -2.61328E-23 | -1.79207E-25 | 4.14518E-26 |

CHANGE OF DISTANCE BETWEEN SURFACES

| | | 60 INCH | 80 INCH | 100 INCH |
|---|---|---|---|---|
| DISTANCE BE-TWEEN SURFACES Z (mm) | S25 | 13.490 | 14.519 | 15.162 |
| | S27 | 19.170 | 17.382 | 16.195 |
| | S32 | -717.076 | -969.429 | -1221.11 |

FIG.32B

FREE CURVED SURFACE COEFFICIENT $$z = \frac{c \cdot (x^2+y^2)}{1+\sqrt{1-(1+K) \cdot c^2 \cdot (x^2+y^2)}} + \sum\sum C_j(m,n) \cdot x^m \cdot y^n$$

$$j = [(m+n)2 + m + 3n]/2 + 1$$

| CODE | | SURFACE 26 | SURFACE 27 | SURFACE 28 | SURFACE 29 | M (MIRROR SURFACE) |
|---|---|---|---|---|---|---|
| 1/R | c | 0 | 0 | 0 | 0 | 0 |
| K | K | 0 | 0 | 0 | 0 | 0 |
| C3 | $y^1$ | -0.133068445 | -0.132835468 | -1.346949024 | -1.109974915 | 0 |
| C4 | $x^2$ | -0.03077461 | -0.028123397 | -0.030124287 | -0.023331448 | 0.004195686 |
| C6 | $y^2$ | -0.034642332 | -0.031579896 | -0.000954444 | -0.005916418 | 0.00087094 |
| C8 | $x^2y$ | 0.000160639 | 0.000189212 | 0.0013344 | 0.000491916 | -6.41193E-05 |
| C10 | $y^3$ | -3.12712E-05 | -2.82561E-05 | 0.001263158 | 0.000340231 | -2.19665E-05 |
| C11 | $x^4$ | 1.0015E-05 | 1.51081E-05 | 8.3239E-06 | -2.37501E-06 | -2.59891E-07 |
| C13 | $x^2y^2$ | 7.33089E-05 | 7.98512E-05 | 1.79268E-05 | 1.52639E-06 | 6.0977E-07 |
| C15 | $y^4$ | 5.44063E-05 | 5.69971E-05 | -1.62967E-05 | 1.88172E-05 | 2.86195E-07 |
| C17 | $x^4y$ | 1.69633E-06 | 1.97131E-06 | 1.40372E-07 | 5.62245E-07 | 8.71993E-09 |
| C19 | $x^2y^3$ | -1.66443E-06 | 6.23056E-07 | -1.338E-06 | -1.51518E-07 | -2.4737E-09 |
| C21 | $y^5$ | -2.84749E-06 | -2.68734E-07 | -4.23093E-06 | -2.24337E-06 | -1.44138E-09 |
| C22 | $x^6$ | 4.2063E-08 | 3.82084E-08 | 2.99529E-08 | 2.34853E-08 | 2.11062E-11 |
| C24 | $x^4y^2$ | -4.62149E-07 | -2.32482E-07 | -6.23567E-08 | -1.41495E-08 | -1.42612E-10 |
| C26 | $x^2y^4$ | -3.08799E-07 | -1.12762E-07 | 7.722E-08 | 5.13854E-08 | -4.04778E-11 |
| C28 | $y^6$ | 8.0614E-08 | -6.59297E-09 | 1.5068E-07 | -3.99076E-08 | -2.93153E-11 |
| C30 | $x^6y$ | -1.2455E-09 | -2.75828E-09 | -2.52057E-09 | -1.92414E-09 | -8.70557E-13 |
| C32 | $x^4y^3$ | 2.50446E-08 | 2.64327E-09 | -3.31484E-10 | -1.41857E-09 | 1.3274E-12 |
| C34 | $x^2y^5$ | 2.38322E-08 | -4.40943E-09 | -1.68113E-09 | -3.16984E-09 | 1.2429E-12 |
| C36 | $y^7$ | 2.30236E-09 | -1.26974E-09 | 8.63833E-09 | 2.37347E-09 | 4.84709E-13 |
| C37 | $x^8$ | -2.22017E-10 | -1.33675E-10 | -5.81744E-11 | -2.83374E-11 | -7.03219E-16 |
| C39 | $x^6y^2$ | 1.04344E-09 | 3.49184E-10 | 1.71987E-10 | 4.6589E-11 | 1.42211E-14 |
| C41 | $x^4y^4$ | 1.75217E-09 | 4.74127E-10 | 6.20848E-11 | 6.64049E-12 | -6.84427E-15 |
| C43 | $x^2y^6$ | -5.62785E-10 | 2.3271E-10 | -3.294E-10 | -9.3133E-11 | -1.80735E-14 |
| C45 | $y^8$ | 4.02717E-11 | -7.48213E-12 | -2.73578E-10 | 3.64074E-10 | 3.63885E-17 |
| C47 | $x^8y$ | -1.87297E-12 | 6.55868E-13 | 2.03128E-12 | 9.51006E-13 | 4.08853E-17 |
| C49 | $x^6y^3$ | -1.0026E-10 | -1.72776E-11 | 5.73272E-13 | 1.97917E-12 | -1.35516E-16 |
| C51 | $x^4y^5$ | -1.80719E-10 | -2.65806E-11 | 7.26613E-12 | 6.10662E-12 | 2.55852E-17 |
| C53 | $x^2y^7$ | 3.27256E-11 | 6.77993E-12 | 5.85505E-12 | 1.53499E-11 | 1.39879E-16 |
| C55 | $y^9$ | -1.95674E-11 | 9.09346E-13 | -1.29422E-11 | -1.99094E-11 | -4.18367E-17 |
| C56 | $x^{10}$ | 5.29236E-13 | 2.0936E-13 | 3.0466E-14 | 8.50436E-15 | -6.85925E-20 |
| C58 | $x^8y^2$ | -1.47466E-13 | -9.39849E-14 | -5.18891E-14 | 1.1542E-14 | -2.83838E-19 |
| C60 | $x^6y^4$ | 2.9088E-12 | 3.99192E-13 | -2.45752E-13 | -5.75855E-14 | 6.00398E-19 |
| C62 | $x^4y^6$ | 3.68375E-12 | 4.19956E-13 | -8.1318E-14 | -1.77317E-13 | -1.15284E-19 |
| C64 | $x^2y^8$ | -1.21255E-12 | -2.96963E-13 | 7.57033E-14 | -5.58048E-13 | -4.38756E-19 |
| C66 | $y^{10}$ | 5.93608E-13 | 1.30734E-14 | 4.28765E-13 | 2.91907E-13 | 2.17056E-19 |

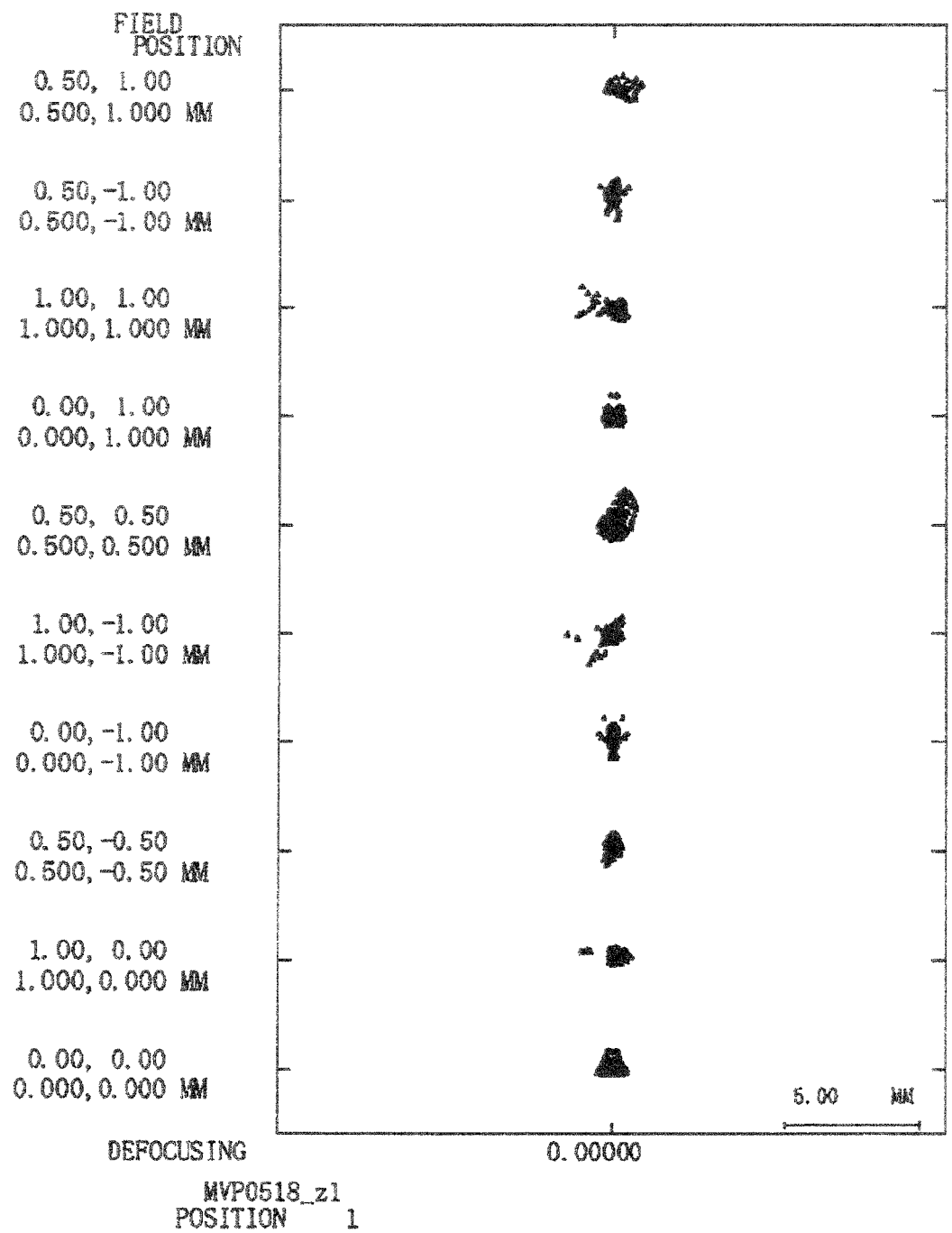

PROJECTION APPARATUS AND TRANSPARENT SCREEN FOR IT

INCORPORATION BY REFERENCE

The present application is a continuation application of Ser. No. 12/777,364, filed May 11, 2010 which claims priority from Japanese application JP-2009-115132 filed on May 12, 2009, the content of which is hereby incorporated by reference into this application.

BACKGROUND OF THE INVENTION

The present invention relates to a projection image display apparatus for projecting an image onto a projection surface using an image display element such as a liquid crystal panel, a screen of the projection surface, and a manufacturing method thereof, in particular, the present invention relates to technology to make a projection apparatus obtained by combination thereof more compact and higher performance.

For example, in the projection image display apparatus for displaying in an enlarging way a display screen of a reflection type or transparent type liquid crystal panel, or an image display element with a structure arranged with a plurality pieces of micro mirrors, onto a screen or a board etc. of the projection surface, it is needless to say that a sufficiently enlarged image is designed to be obtained on the projection surface. However, what is called a short-projection-type projection optical system has begun appearing on the market, which has shortened distance between the projection image display apparatus and the projection surface, so that a shadow of a presenter is not reflected onto the projection surface or an enlarged image light does not directly enter the eyes of the presenter. This projection optical system is configured so that the enlarged image light enters from an oblique direction relative to the projection surface (for example, JP-A-2008-250296).

In addition, it has also been known means for performing optical adjustment in an oblique projection optical system using a curved mirror for such oblique projection (for example, JP-A-2002-350774).

Still more, it has also been known the projection image display apparatus for attaining an ultra-thin-type compact rear-projection-type apparatus (image display apparatus), using this oblique projection optical system and a mirror for folding light path, so that a shadow of a presenter is not reflected onto the projection surface, or an enlarged image light does not directly enter the eyes of the presenter (for example, JP-A-2006-259252).

As a transparent screen optimal to this projection image display apparatus, conventionally, there has been generally a two-piece constitution screen composed of a diffusion sheet 170 (Also, lenticular sheet is possible) made of a diffusion layer 171 and a diffusion sheet substrate 172, as image light R1 and R2 in FIG. 37 and FIG. 38, and a circular Fresnel sheet 167 arranged with a circular Fresnel surface at a view side. Application of this transparent screen to the oblique projection optical system, as illustrated in FIG. 38, does not provide sufficient refraction of image light R1 and R2, and the image light R1 and R2 enters onto the diffusion sheet 170 from an oblique direction, so that a peak brightness direction is not only unable to be controlled to a desired direction but also it generates large reflection loss. Accordingly, there has been proposed a screen with a two-piece constitution by the diffusion sheet 170, as illustrated in FIG. 39 and FIG. 40, and a circular Fresnel sheet 166 of a total reflection system having a Fresnel lens surface oriented toward the side of the projection image display apparatus. As a result, there has also been known already a system which is capable of largely reducing reflection loss, even in corresponding to the oblique projection optical system (for example, JP-A-4-80369).

Still more, there has also been proposed already an image projection system with enhanced convenience by integrating the projection image display apparatus using a general projection optical system, and a reflection type screen (for example, JP-3864051, WO 00/52526).

SUMMARY OF THE INVENTION

However, in the oblique projection optical system for enlarged image light to enter from an oblique direction relative to the projection surface, of conventional technology, in particular, disclosed in the above JP-A-2008-250296, there is shown a configuration for arranging with a curved mirror between the projection optical system and the projection surface, and forming an intermediate image between the curved mirror and said coaxial projection optical system in a coaxial projection optical system, and projecting this intermediate image in a magnified way onto a screen of the projection surface, by enlargement action of the curved mirror.

Therefore, the art described in the above JP-A-2008-250296 requires parallel transfer of a position of the curved mirror, along an optical axis of the above coaxial projection optical system, to change magnification ratio of the enlarged image on the screen, and thus requires a high precision transfer adjustment mechanism so that the curved mirror does not incline relative to the above optical axis, while there is no disclosure on this transfer adjustment mechanism.

In addition, JP-A-2002-350774 has disclosed only an adjustment method by transfer of a free curved mirror, and there is no consideration on specific correction for trapezoidal strain of a projected image accompanied by oblique projection onto a screen of the projection surface unique to the oblique projection optical system, and aberration generated by a difference of projection distance in upper and lower directions of the screen, and there is no description at all on a manufacturing method for the free curved mirror having negative power arranged between the projection optical system and the screen.

On the other hand, JP-A-2006-259252 has proposed an idea having a mirror mechanism unit for enabling to rotate a mirror for reflecting projection light to be projected from a projection lens of a projector main body, wherein this mirror mechanism unit fixes the projector main body to a fixing unit so that a projection angle of the projection light from the projector main body attains a predetermined angle relative to the mirror, and is capable of performing projection from a rear surface relative to the screen (hereafter described as rear projection) without shifting the projection lens arranged inside the projector main body, as well as, in the case of performing front projection (direct projection onto the screen), the mirror mechanism unit has a configuration to store the projector main body in the above mirror mechanism unit, and in the case where the projector main body is stored inside the mirror mechanism, a compact size is attained.

However, in the projector described in the above JP-A-2006-259252, the positional relation of the mirror and the projector main body is fixed in rear projection, and there is no consideration on a method for changing magnification ratio of the enlarged image on the screen in rear projection, or technical means for adjusting the position of the enlarged image.

In addition, the transparent screen described in the above JP-A-4-80369 has a configuration to settle a total reflection Fresnel lens at an incident surface of a circular Fresnel sheet in two-piece constitution screen, for emitting so as to attain nearly parallel to an image view side by the action of this lens surface. In such a transparent screen containing a conventional total reflection Fresnel lens, detailed design on Fresnel angle was not made, resulting in non-uniform brightness. In the case where an image on the screen is viewed from a predetermined direction, when the total reflection Fresnel lens of conventional technology is applied as it is to an oblique projection optical system, since the incident angle largely differs depending on position in the vertical direction of the screen, thereby the emitting direction of light reflected at the Fresnel lens surface changes in the screen, which results in that brightness becomes inhomogeneous when an image projected on the screen is seen from a predetermined direction. In addition, in order to attain total reflection at the whole surface of the screen, it also raises a problem as a whole system, such as limitation of the incident angle of the image light, or also restriction of the positional relation between the projection image display apparatus of an image source and the screen. Still more, manufacturing of the total reflection circular Fresnel lens requires formation of Fresnel shape with a UV resin piece by piece by utilizing a mold, and by hardening with UV rays, thus forming time becomes longer, which incurs drastic cost increase.

On the other hand, in the above JP-3864051 (WO 00/52526), there is described a reflection projection system which is capable of performing the accurate positioning relative to the screen, even in optical and mechanical repetition by a projection head (the projection image display apparatus is built-in), interlocked in a integrated way by the projection screen and a stretchable arm.

However, in the reflection projection system of JP-3864051 (WO 00/52526), there is given no technological consideration at all corresponding to a short-projection projection optical system, which has shortened distance between the projection image display apparatus and the projection surface.

In addition, in the reflection projection system of JP-3864051 (WO 00/52526), because the projection image display apparatus is arranged at the upper part of the screen center, a problem of the projection image display apparatus due to the conventional technology, such that a shadow of a presenter is reflected onto the projection surface, or a enlarged image light directly enters the eyes of the presenter, has not been solved at all.

Still more, in the reflection projection system of JP-3864051 (WO 00/52526), there is only one set of the projection image display apparatus usable in one reflection projection system, which causes necessity to change the attached projection image display apparatus to a more expensive high brightness model or a high resolution model, when trying to obtain a brighter image or a higher resolution On the other hand, the reflection projection system of JP-3864051 (WO 00/52526) is an invention achieved by considering direct attachment at a wall surface of a classroom or the like, and there is no disclosure at all on technical means for transferring whole of the reflection projection system, or ascending or descending of screen height (position). In addition, there is no description at all on a configuration of an image input unit or a voice input unit for still more enhancing interactive property or crime prevention property.

In addition, the reflection projection system at present has a structure for attaching a board directly onto a wall surface of a living room, as illustrated in FIG. 34 (a landscape type with an aspect ratio of 16:9) and FIG. 35 (a type with an aspect ratio of 4:3).

The present invention has been proposed in view of such problems, and it is a first object of the present invention to attain the oblique projection optical system for obliquely projecting an image to the projection surface, which is easy in correction of trapezoidal strain or focus adjustment, as well as to attain the projection image display apparatus using this oblique projection optical system, and a cheap transparent screen having less reflection loss and excellent brightness uniformity corresponding to this, and to provide a high image quality compact projection apparatus with small influence of external light. In addition, it is a second object of the present invention to provide the projection apparatus where a enlarged image light from the projection image display apparatus little enters directly the eyes of the presenter, and the shadow of presenter is less reflected onto the projection surface, even in the reflection projection system using the reflection type screen. Further, it is a third object of the present invention to provide the projection apparatus obtainable a brighter image or higher resolution by installing a plurality of the projection image display apparatus sets together. Still more, it is a fourth object of the present invention to provide the apparatus with excellent usability as in transferring or in moving screen height (position) up and down easily, and with an image input unit and a voice input unit for still more enhancing the interactive property or the crime prevention property.

To attain the above object, the projection optical system according to the present invention is an oblique projection optical system for projecting an image displayed at an image display surface, in an obliquely enlarging way onto a screen or the like of a projection surface, wherein it is configured by a plurality of lenses, and in a lens arranged at the nearest position to the projection surface, an effective region in the vertical direction of the image where image light flux passes is arranged at a position not including an optical axis shared by a largest number of lenses among optical axes of the above plurality of lenses, and by making the shape axis-asymmetry relative to the optical axis, it becomes possible to correct aberration generated by implementing ultra wide angles, or strain generated by the oblique projection.

In addition, the oblique projection optical system, which is one of the configuration requirements of the present invention, is also capable of arranging a compact free curved mirror or a light path folding mirror between a lens arranged at the nearest position to the projection surface and the projection surface, since it becomes possible to elevate a position (increased shift amount) by the above reason in the vertical direction of the screen where a enlarged image is shown relative to the optical axis. Therefore, since the projection image display apparatus is arranged between aforementioned mirror and the screen of the projection surface, and thus the length of an arm for fixing the aforementioned projection image display apparatus can be shortened, it becomes possible to suppress its strength low as well, and reduce the cost of the whole system.

The transparent screen of the present invention corresponding to the oblique projection optical system is capable of reducing decrease in focus performance caused by multiple reflection of image light, which has been generated in the two-piece constitution screen of conventional technology, by making an integral constitution. In addition, on the incident side of the image light, by making a configuration where Fresnel lenses having cross-sectional shape changing depending on positions in the vertical direction of the screen are installed continuously in the vertical direction of the screen, and when the cross-section of this Fresnel lens in the vertical direction of the screen to have a lens region 1 where image light is emitted to an image viewing side by refraction action, and a lens region 2 where image light is emitted to an image viewing side by total reflection of the image light, by changing a ratio of the above lens region 1 and lens region 2 from the lower end of the screen toward the upper end, and by minimizing reflection loss by optimizing the Fresnel angle as well in accordance with the incident angle of image light, the emission direction of image light can be aligned. Further, since the rear surface projection system capable of diffusing in the vertical and horizontal directions of the screen can be attained by a diffusion layer installed at an image view side of the Fresnel lens, an enlarged image light never enters the eyes of the presenter directly.

Still more, since the linear Fresnel lens formed at an image incident surface side of the transparent screen of the present invention is capable of being formed continuously by rolling, significant cost reduction can be attained.

In addition, by shifting relative to the optical axis of the projection lens and fixing an image display element having an effective image display region of equal to or smaller than about 70% relative to its diagonal dimension or area of the effective region of the object surface of the projection lens configuring the oblique projection optical system of the present invention, it becomes possible to shift the enlarged image relative to the optical axis. Accordingly, by arranging the projection image display apparatus by shifting in predetermined amount in the horizontal direction, or in the vertical direction, or both in the horizontal direction and in the vertical direction at the same time, relative to the center of external shape of the screen, enlarged image light little enters the eyes of the presenter directly, and reflection of the shadow of the presenter onto the projection surface becomes further reduced.

Then, in one set of the apparatus, to obtain a brighter image or higher resolution, for example, by installing two sets of the projection image display apparatuses together, an enlarged image obtained by shifting and fixing an image display element having an effective image display region of equal to or smaller than about 90% relative to its diagonal dimension or area of the effective region of the object surface of the projection lens configuring the oblique projection optical system, in one projection image display apparatus, relative to the optical axis of the projection lens, is shifted relative to the optical axis. In the other projection image display apparatus as well, by shifting the enlarged image obtained by shifting and fixing the image display element, having an effective image display region of equal to or smaller than about 90% relative to diagonal dimension or area of an effective region of an object surface of a projection lens configuring said oblique projection optical system, in an opposite direction relative to the optical axis of the projection lens, it becomes possible to overlap images on the projection surface. At this time, it is enough to install together two sets of the projection image display apparatus in a space obtained by the shift amount from the aforementioned optical axis.

It is desirable that a caster for transferring is attached at a lower part of the main body, to make the transfer of the projection image display apparatus easy, that the projection image display apparatus equipped with the oblique projection optical system and a screen are integrated by a linking unit, to make adjustment of the screen height (position) easy; and still more that a camera as a image input unit and a directive microphone as a voice input unit are arranged at the upper end of the screen, to enhance the interactive property or the crime prevention property.

In the projection optical system of the present invention, an effective region in the vertical direction of the image, where image light flux of a lens arranged at position nearest to the projection surface configured by a plurality of lenses passes, is arranged at a position not including an optical axis shared by the largest number of lenses among optical axes of the aforesaid plurality of lenses, and by making the shape axis-asymmetry relative to the optical axis, it becomes possible to correct aberration generated by implementing ultra wide angle, or strain generated by the oblique projection.

Still more, since a compact free curved mirror or a planar mirror for folding light path can be arranged between the lens arranged at the nearest position to the projection surface and the projection surface, the projection image display apparatus can be arranged between the above mirror and the screen of the projection surface, and thus the length of the arm for fixing aforementioned projection image display apparatus can be shortened, and it becomes possible to suppress its strength low as well, and reduce the cost of the whole system.

On the other hand, the transparent screen of the present invention corresponding to the oblique projection optical system is capable of reducing decrease in focus performance caused by multiple reflection of image light, which has generated in the two-piece constitution screen of conventional technology, by taking a integral constitution, and reflection loss at the Fresnel lens can be minimized, as well as significant cost reduction can be attained, since the linear Fresnel lens formed at the image incident surface side is capable of being formed continuously by rolling, as compared with a circular Fresnel lens system by conventional technology.

In addition, by arranging the projection image display apparatus using the oblique projection optical system of the present invention, and by shifting it in predetermined amount in the horizontal direction, or in the vertical direction, or both in the horizontal direction and in the vertical direction at the same time, relative to the center of external shape of the screen, enlarged image light little enters the eyes of the presenter directly, and reflection of the shadow of the presenter onto the projection surface becomes further reduced.

Still more, by installing together in the projection apparatus a plurality of the projection image display apparatus sets used in the oblique projection optical system of the present invention, a brighter image or higher resolution can be obtained.

In addition, by the caster for transferring attached at the lower part of the main body or the adjustment mechanism of screen height (position), the portability and usability are enhanced. Still more by arranging the camera, and the directive microphone as a voice input unit at the upper end of the screen, it becomes possible to enhance the interactive property or the crime prevention property.

Other objects, features and advantages of the invention will become apparent from the following description of the embodiments of the invention taken in conjunction with the accompanying drawings.

BRIEF DESCRIPTION OF THE DRAWINGS

FIG. 24 is a cross-sectional view representing a lens configuration of an oblique projection optical system and ray tracing result according to one embodiment of the present invention.

FIG. 25A is a lens data of a projection lens for attaining an oblique projection optical system according to one embodiment of the present invention.

FIG. 25B is a lens data of a projection lens for attaining an oblique projection optical system according to one embodiment of the present invention.

FIG. 27 is a cross-sectional view of a projection lens representing a lens configuration of one embodiment of an oblique projection optical system of the present invention (with lens data shown in FIGS. 28 A and 28B).

FIG. 28A is a lens data of a projection lens for attaining an oblique projection optical system according to one embodiment of the present invention.

FIG. 28B is a lens data of a projection lens for attaining an oblique projection optical system according to one embodiment of the present invention.

FIG. 30A is a lens data of a projection lens for attaining an oblique projection optical system according to one embodiment of the present invention.

FIG. 30B is a lens data of a projection lens for attaining an oblique projection optical system according to one embodiment of the present invention.

FIG. 31 is a cross-sectional view of a projection lens representing a lens configuration of one embodiment of an oblique projection optical system of the present invention (with lens data shown in FIGS. 30A and 30B).

FIG. 32A is a lens data of a projection lens for attaining an oblique projection optical system according to one embodiment of the present invention.

FIG. 32B is a lens data of a projection lens for attaining an oblique projection optical system according to one embodiment of the present invention.

FIG. 33 is a spot drawing of a projection lens for attaining an oblique projection optical system according to one embodiment of the present invention.

DETAILED DESCRIPTION OF THE EMBODIMENTS

Figure 1:
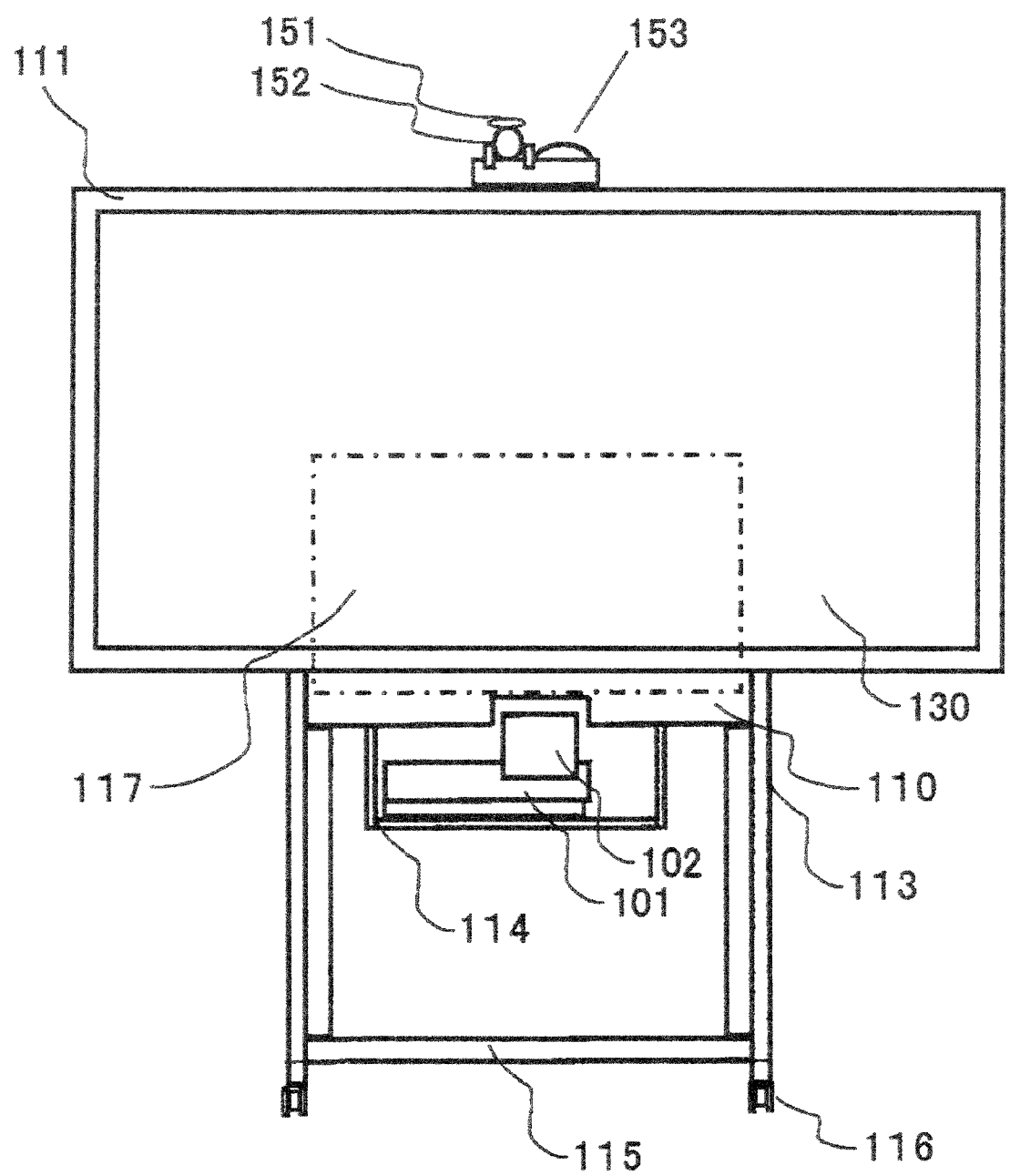
FIG. 1 is a front view illustrating one embodiment of a projection apparatus provided with an oblique projection optical system of the present invention and a mirror for folding light path.

Explanation will be given below on the best mode of the present invention, with reference to accompanying drawings. It should be noted that in each drawing, an element having common function is shown by attaching the same reference numeral, and as for those once explained, explanation thereof is omitted hereafter.

FIG. 1 is a front view of a projection apparatus of a rear-system, as one embodiment of the present invention, and aspect ratio of a projection surface is set to be landscape orientation of 16:9. It has a configuration that a main body of a projection image display apparatus 101 is stored in a storage unit 114 at the lower part of a supporting frame 111 of a transparent screen 130. The projection image display apparatus 101 has a mirror integrated structure so as to shorten distance from the main body to the transparent screen 130 of a projection surface, as shorter as possible.

Enlarged image light is folded at a mirror for folding light path 117 arranged nearly parallel to the transparent screen 130, and emitted to a view side while entering from the rear surface of the transparent screen 130 and being diffused.

The mirror for folding light path 117 is upright relative to the ground and generates no bending by own weight and thus generates no strain in an image.

At the upper part of the projection apparatus, there are provided a monitoring camera 153 with a wide viewing angle, and a usual camera 152, along with a microphone 151 having relatively strong directivity. In a case where the projection apparatus in one embodiment of the present invention is used as a video conference system, it is still more preferable to install a holding mechanism rotatable up and down, along with left and right, to the camera 152 and the directive microphone 151, so as to be able to monitor speaking content and the figure of a speaker during the conference. By installing a reinforcing member 1 (110 in FIG. 1) and a reinforcing member 2 (115 in FIG. 1) at the lower part of the transparent screen, so as to connect a screen leg part 113, a configuration to enhance mechanical strength of the projection apparatus is obtained, and by installing the caster for transferring 116 at the bottom face of the screen leg part 113, an easily transferable projection is attained.

Figure 11:
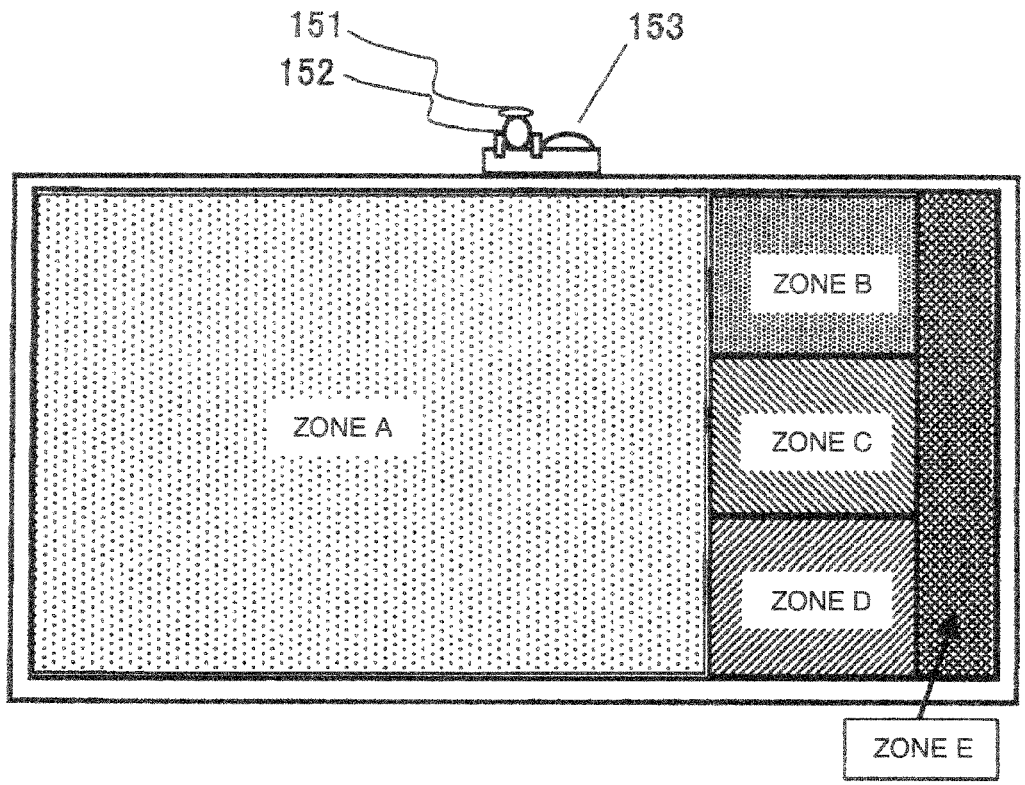
FIG. 11 is a schematic view illustrating one embodiment of division of image display regions of a projection apparatus provided with an oblique projection optical system according to the present invention.

Explanation will be given next on a display method for an image obtained by a monitoring camera 153 and an usual camera 152, with reference to FIG. 11 and FIG. 12. FIG. 11 is a schematic view of a projection image arrangement onto the projection surface of the projection apparatus in one embodiment of the present invention. An image for presentation is displayed at a main zone A, an image from the monitoring camera 153 is displayed at a zone B, and an image from the usual camera 152 is displayed at a zone C. By furnishing zooming function to the usual camera 152, it becomes possible to show a large image of a speaker in a conference or the like. In addition, by setting the monitoring camera 153 so as to take in an image of the whole scene of a conference room or a class room, and by operating it even when the apparatus is not used, and always sending thus obtained image via a LAN line or the like, for monitoring it at other place, crime prevention effect can be obtained. At a zone D, the whole scene of a conference place of other party of the video conference may be displayed. Still more at a zone E, voice collected by the directive microphone 151 may be displayed by character conversion. It goes without saying that images displayed at these A to E zones may be displayed in the full screens or the display position may be changed, by selecting and switching these.

Figure 12:
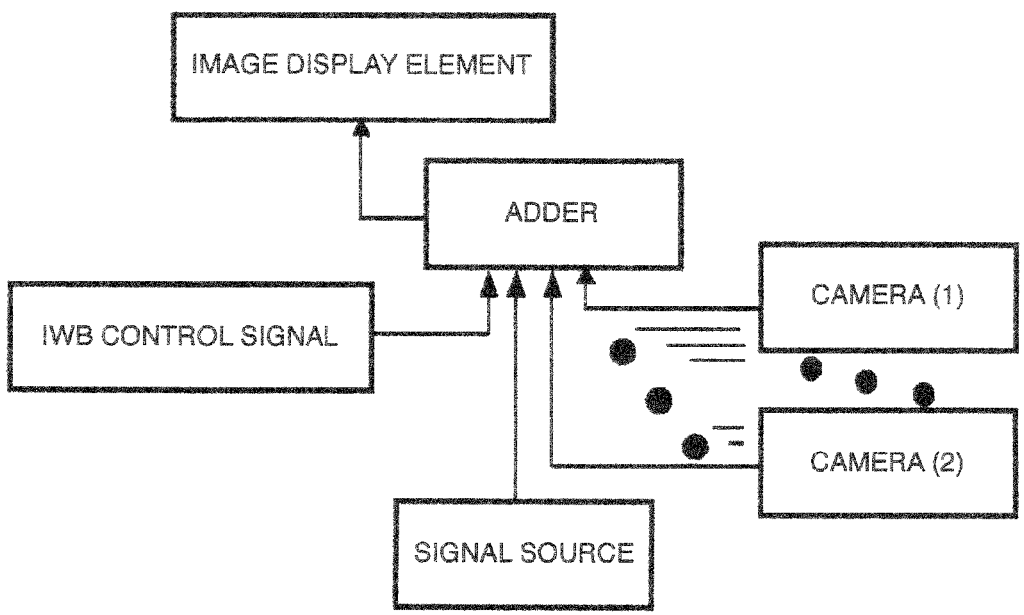
FIG. 12 is a block chart for explaining the principle of image display of a projection apparatus provided with an oblique projection optical system according to one embodiment of the present invention.

An image signals from the above described cameras is designed to be provided to an image display element in a form added to a main image signal for presentation, as represented in FIG. 12. To display the above described image in high quality, an XGA (1024×768 pixels) or more is necessary for an aspect ratio of 4:3, as a resolution of the image display element; and a wide XGA (1280×800 pixels) or more is necessary also for a landscape aspect ratio of 16:9. In addition, as for the effective display region of the image display element, it is desirable that diagonal dimension is equal to or smaller than 1.3 inches. The dimension over this largely increases external dimension of the projection image display apparatus, and significantly deteriorates the compatibility with the projection apparatus according to one embodiment of the present invention.

In addition, to make the apparatus compact, it is enough to set space L between the lens arranged at the nearest position to the above projection surface and aforesaid projection surface, as short as possible, and compact apparatus in a range having no practical problems can be attained by setting 60% or lower relative to diagonal dimension, D, of the projection surface, while 50% or lower is still better.

Figure 2:
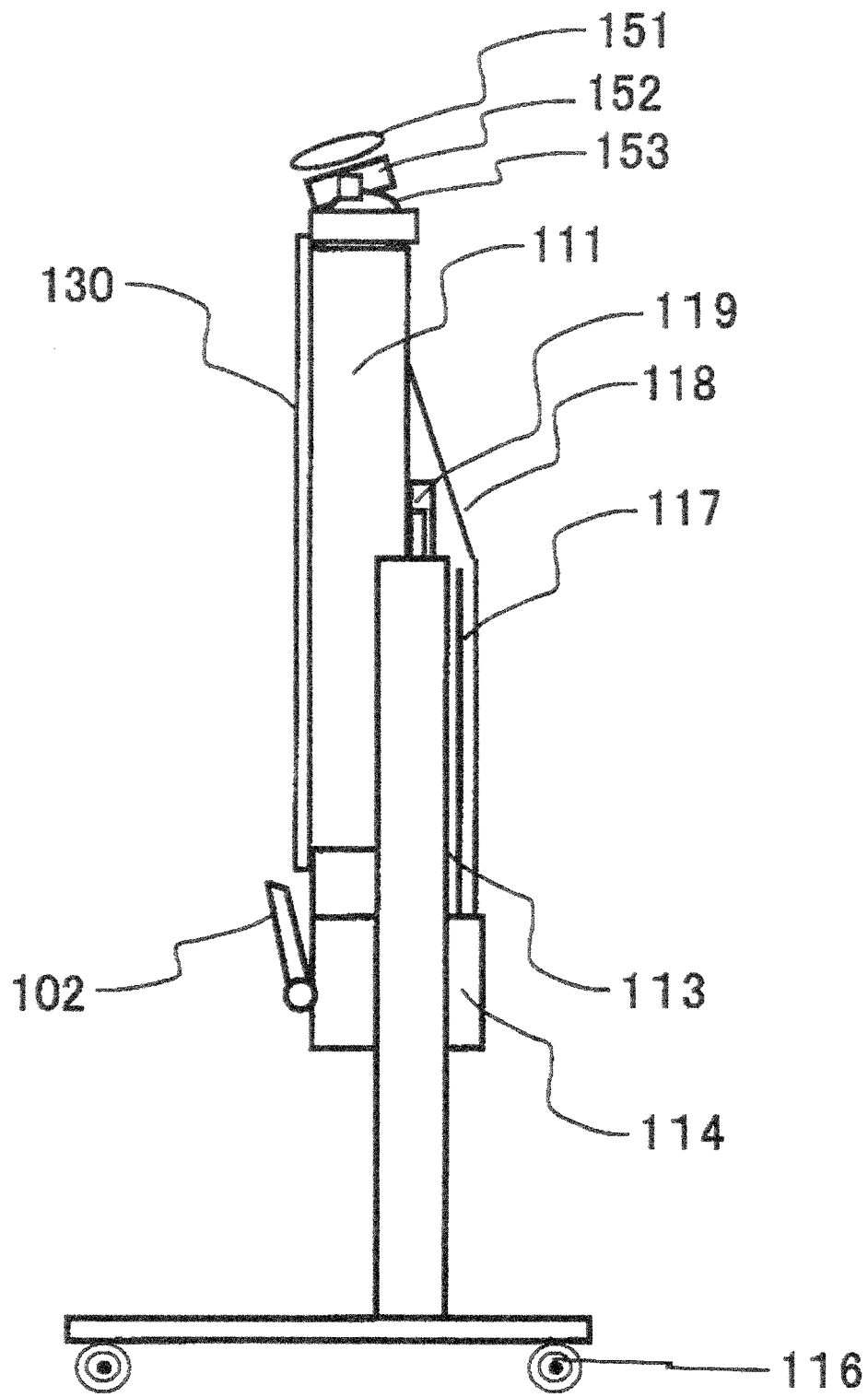
FIG. 2 is a side view illustrating one embodiment of a projection apparatus provided with an oblique projection optical system according to the present invention and a mirror for folding light path.

FIG. 2 is a side view of one embodiment of the present invention illustrated in FIG. 1. It is designed to have a configuration that external light is shielded by installing a back cover 118 between the mirror for folding light path 117 and the transparent screen 130, so that decrease in image quality is not incurred by entering of external light to image light. Still more, it is designed to have a configuration that a main body part excluding the screen leg part 113 is movable up and down, by holding a handle 119 and ascending or descending it. As a result, in a case where the projection apparatus according to one embodiment of the present invention is transferred to a conference room or a class room for use, it can pass through an entrance part of most rooms, by designing the above main body part to have a height of the projection board of equal to or lower than 1800 mm in a state put down to a the lowest end.

Figure 3:
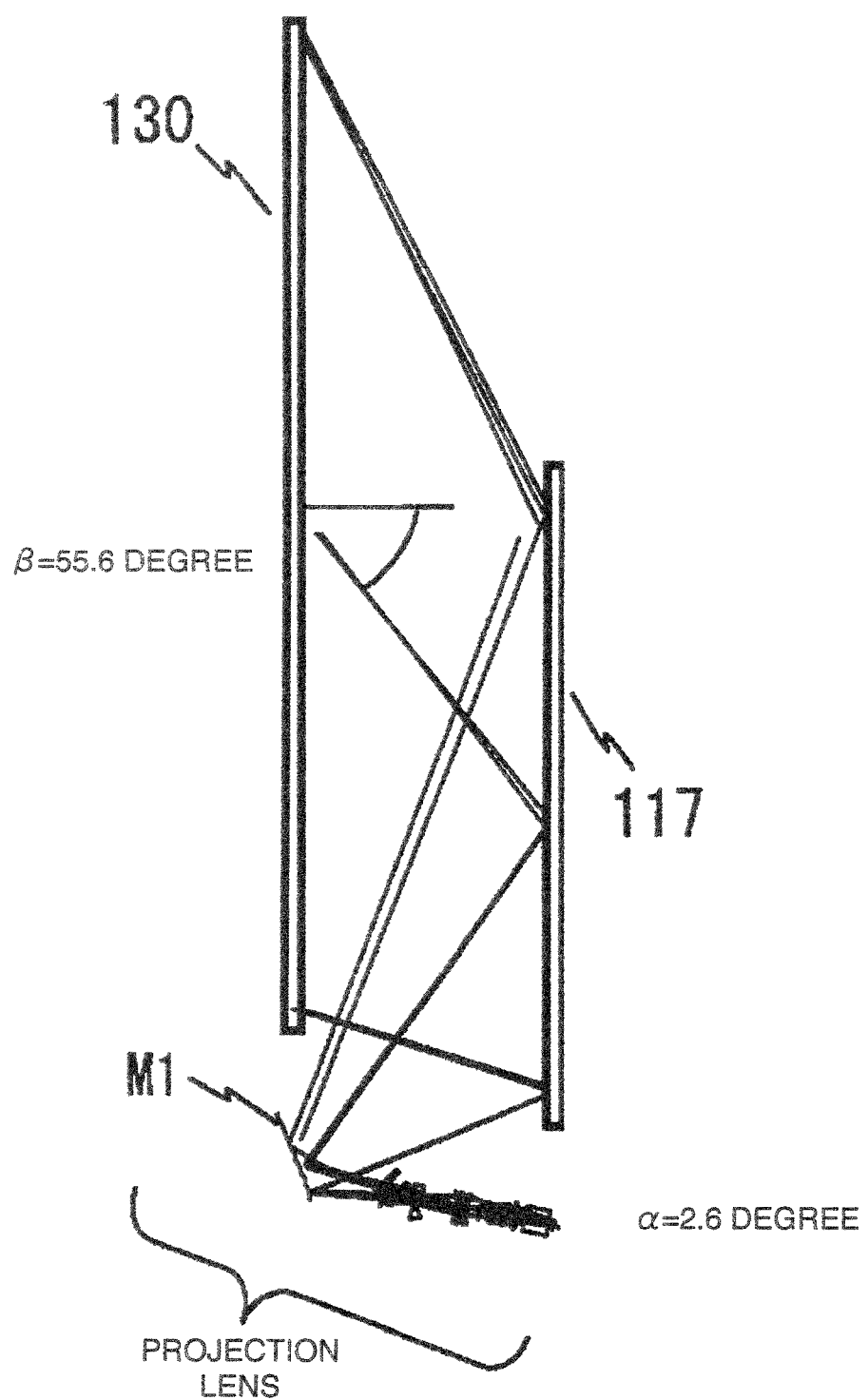
FIG. 3 is a side view illustrating an arrangement of an optical system in one embodiment of a projection apparatus provided with an oblique projection optical system and a mirror for folding light path according to the present invention.

FIG. 3 is one example of a projection lens for attaining an oblique projection optical system applicable to the projection apparatus according to the present invention, and a configuration drawing is represented in FIG. 27, and arrangement of a projection lens showing a lens data, the mirror for folding light path 117 and the transparent screen 130 is represented in FIG. 28. It is designed to have a configuration unique to the oblique projection optical system, where the shift amount of the optical axis of the projection lens is large and the lower end of the mirror for folding light path 117 is below the upper end of a projection lens mirror M1. Brightness becomes non-uniform when the screen is viewed from the view side, because the incident angle to the center of external shape of the screen becomes as large as 55.6 degree, reflection loss itself becomes large in a usual refraction-type transparent screen, the difference of the incident angle is large between the lower end and the upper end of the screen, and reflection loss differs depending on the sections of the screen. Therefore, in the projection apparatus according to one embodiment of the present invention, as will be described later, a transparent screen of a new configuration became necessary.

Figure 4:
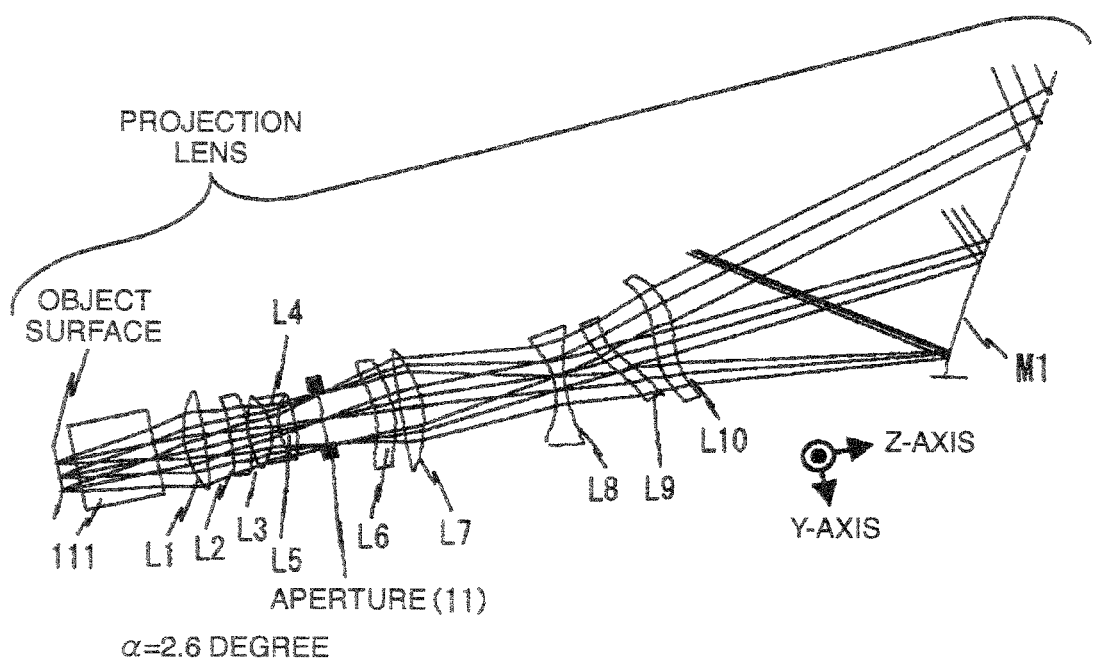
FIG. 4 is a cross-sectional view of a projection lens representing a lens configuration of an oblique projection optical system according to one embodiment of the present invention.

FIG. 4 is a cross-sectional drawing of a ZY surface, representing a lens arrangement of the projection lens and ray tracing result, as an example of a projection lens for attaining an oblique projection optical system applicable to the projection apparatus of the present invention, a configuration drawing thereof is represented in FIG. 27, and lens data thereof is represented in FIGS. 28A and 28B. The upper and lower limits of the mirror M1 configure a free curved shape having largely different inclination. It should be noted that explanation will be given later on a detailed lens configuration.

Figure 5:
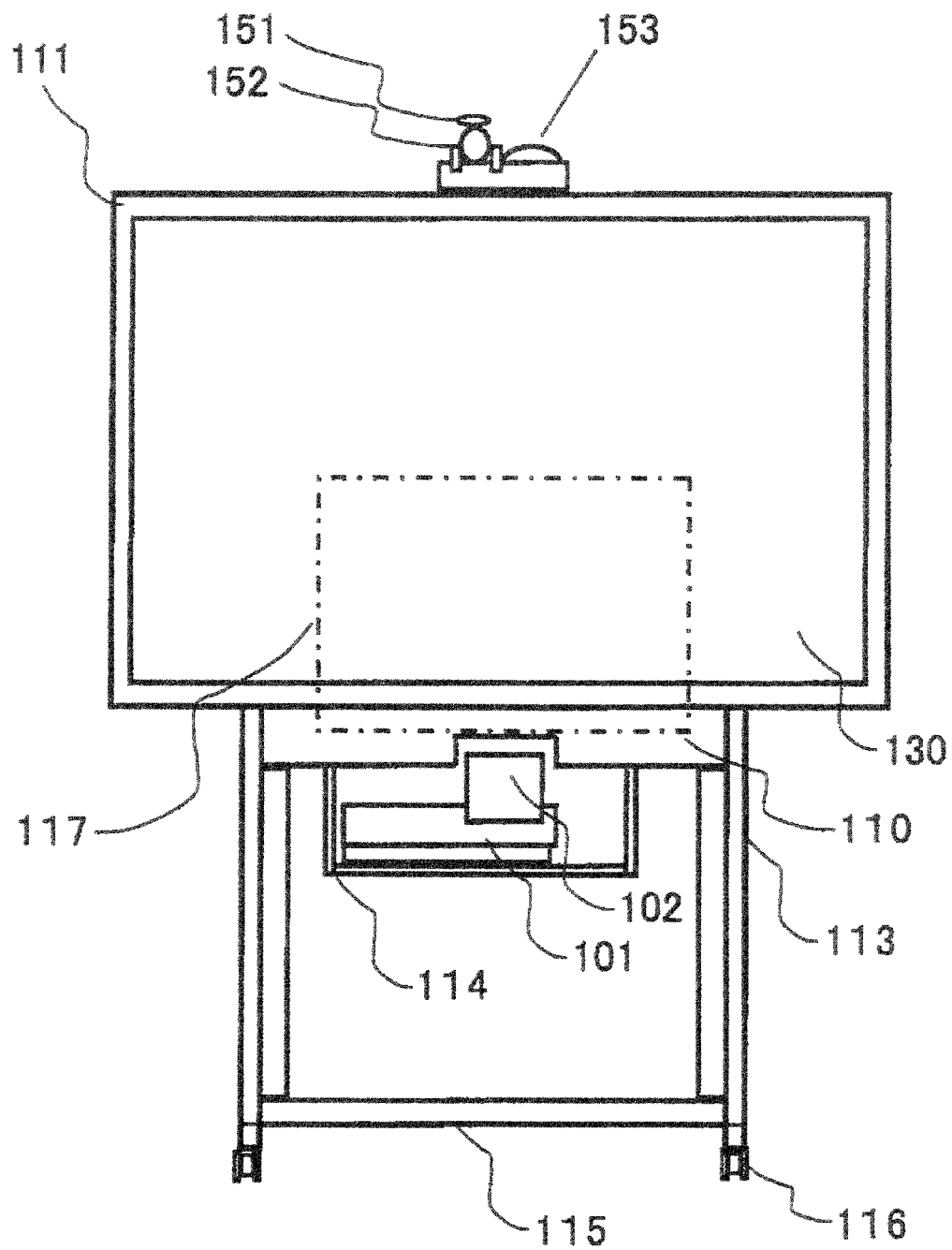
FIG. 5 is a front view illustrating one embodiment of a projection apparatus provided with an oblique projection optical system and a mirror for folding light path according to the present invention.

FIG. 5 is a front view of a rear-system projection apparatus according to the second embodiment of the present invention, and a difference from FIG. 1 is that the aspect ratio of the projection surface is 4:3. Because configuring parts and action of each of the parts are common, explanation on them are omitted here.

Figure 6:
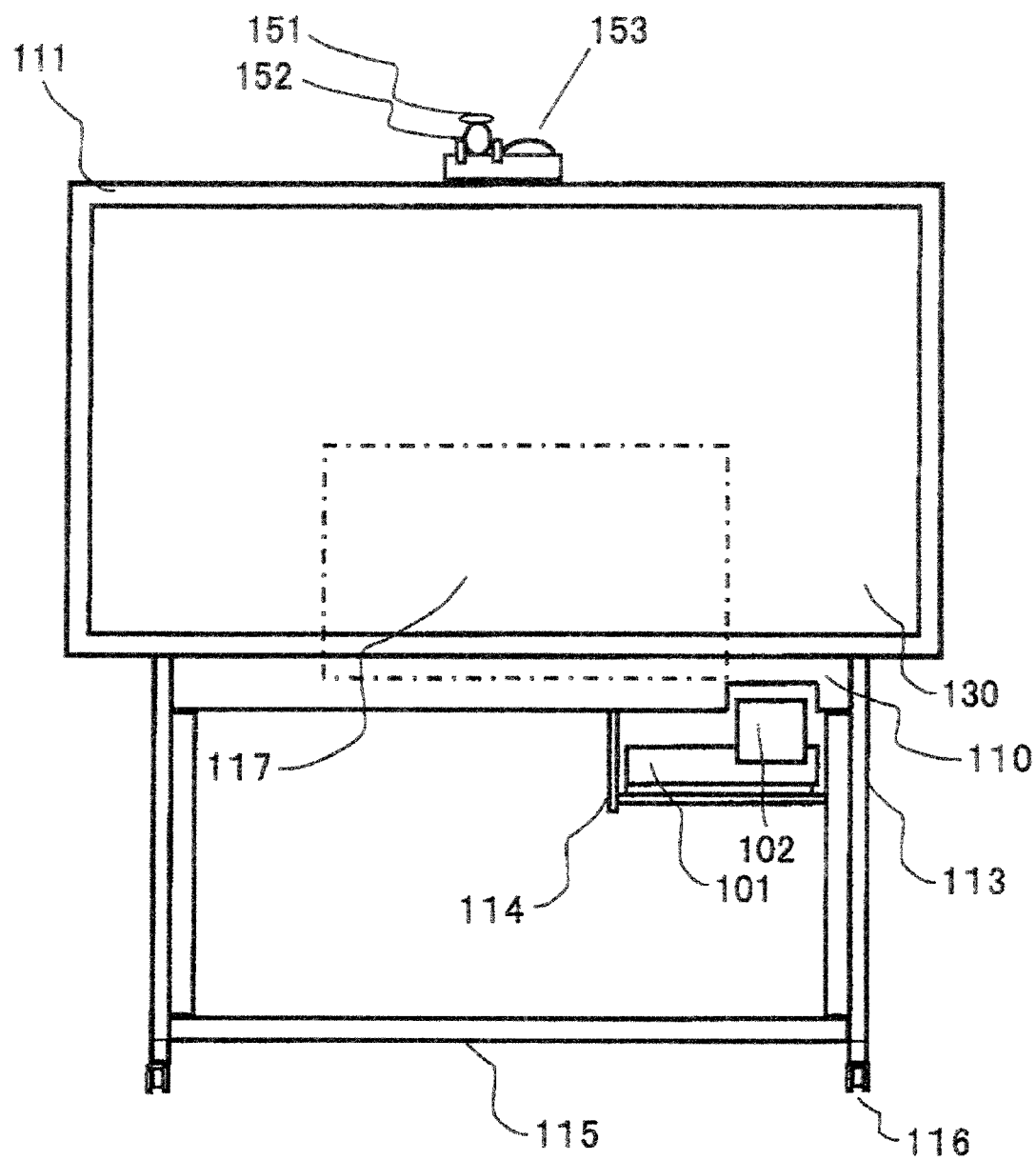
FIG. 6 is a front view illustrating one embodiment of a projection apparatus provided with an oblique projection optical system and a mirror for folding light path according to the present invention.
Figure 9:
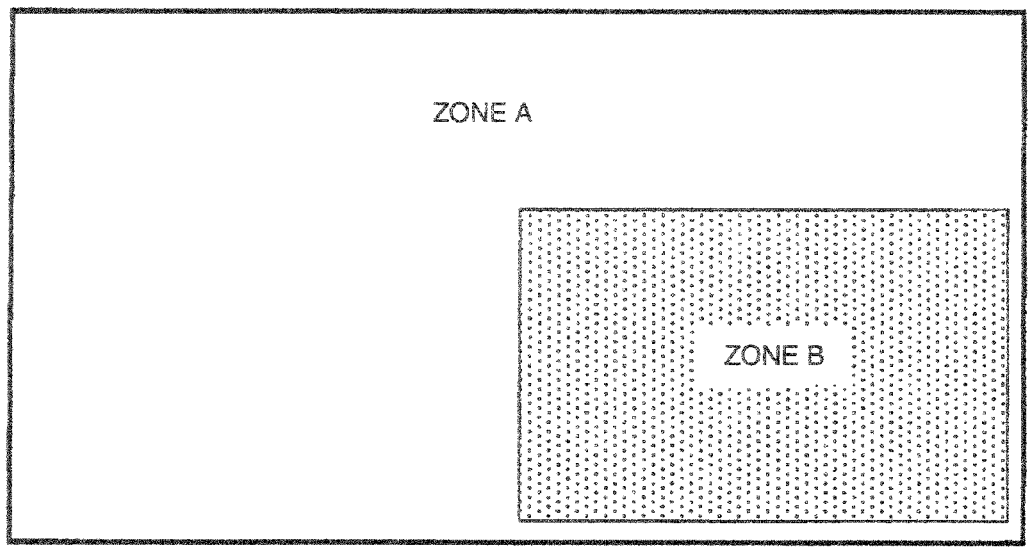
FIG. 9 is a schematic view of comparison of an effective region and a practically used region of a projection lens configuring an oblique projection optical system according to one embodiment of the present invention.

FIG. 6 is a front view of a rear-system projection apparatus according to the third embodiment of the present invention, and a different point from FIG. 1 is that the projection image display apparatus main body 101 is arranged being shifted from the center of the external shape of the transparent screen 130 of the display surface (hereafter referred to as lateral projection), Explanation will be given below on a specific technical means to attain the above arrangement in the projection lens to attain the oblique projection optical system with reference to FIG. 9. A zone A of FIG. 9 shows an effective region of an object surface of the projection lens configuring the oblique projection optical system provided in the projection apparatus according to one embodiment of the present invention. On the other hand, a zone B of the same drawing shows an effective image display region of an image display element for use in the projection image display apparatus according to one embodiment of the present invention.

The smaller ratio of area or diagonal dimension of the zone A and the zone B, B/A, is capable of allowing a more free layout of the image display element at any place inside the effective region of the object surface of the projection lens, therefore, freedom of an installation place of the projection image display apparatus using this optical system is enhanced. However, increase in the effective region of the object surface of the projection lens more than necessity requires a larger diameter lens and leads to cost increase of the whole system, therefore practical lower limit should be about 25% by simulation of the inventors. In addition, to shift the projection image display apparatus main body 101 from the center of the external shape of the transparent screen 103, and arrange it in a range not to disturb a position where a presenter stands, it is required to set the above ratio B/A at 80% for a minimum, while setting at equal to or smaller than 70% enhances the freedom of layout still more.

Figure 7:
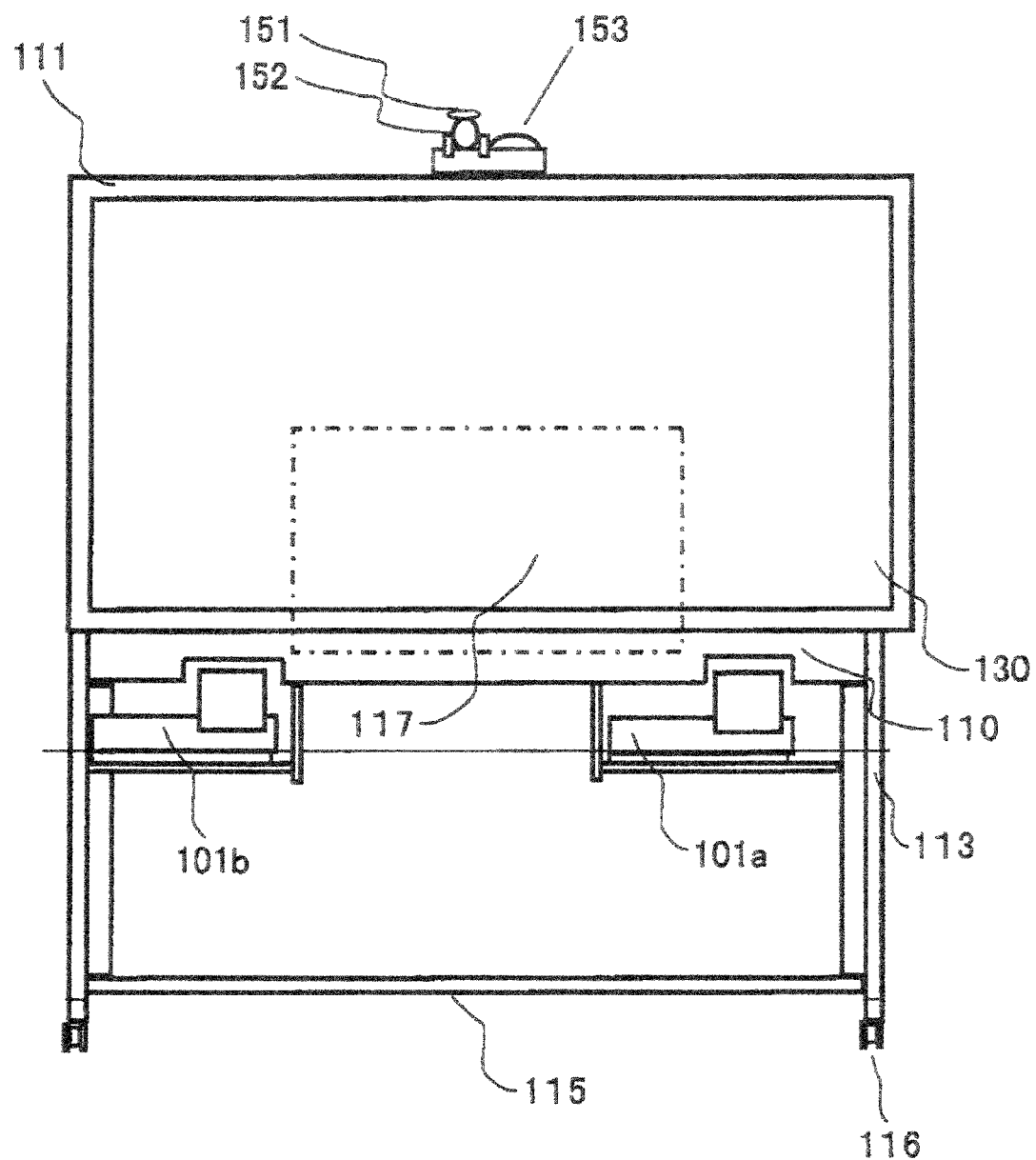
FIG. 7 is a front view illustrating one embodiment of a projection apparatus provided with an oblique projection optical system and a mirror for folding light path according to the present invention.
Figure 10:
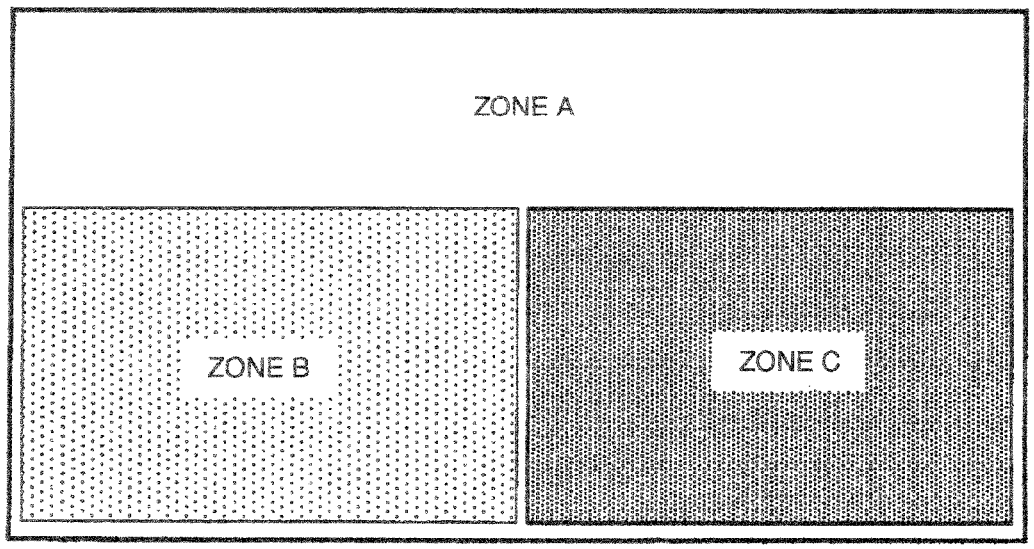
FIG. 10 is a schematic view of comparison of an effective region and a practically used region of a projection lens configuring an oblique projection optical system according to one embodiment of the present invention.

FIG. 7 is a front view of a rear-system projection apparatus according to the fourth embodiment of the present invention, and a different point from FIG. 1 is that two sets of the projection image display apparatus main body 101a and 101b are installed together. In addition, by installing two sets of the projection image display apparatus main bodies 101a and 101b side by side in the horizontal direction of the screen so that incident angles in the vertical direction to the transparent screen becomes the same, simultaneous projection onto two screens becomes possible. Explanation will be given below on relation among the effective region of the object surface (zone A) of the projection lens configuring the oblique projection optical system of each of the adoptable two sets of the projection image display apparatuses, and the effective image display regions, (zone B) and (zone C), of the image display element, at this time, with reference to FIG. 10.

By fixing the projection apparatus in one embodiment of the present invention at a position, so that the effective image display regions (zone B) of the image display element, in one projection image display apparatus in one embodiment of the present invention, becomes as shown in the drawing, relative to the effective region of the object plane (zone A) of the projection lens, configuring the oblique projection optical system, and by fixing the image display element of the other projection image display apparatus as well, so that the effective image display regions (zone C) becomes as shown in the drawing, horizontal resolution can be doubled and a higher precision image can be displayed, because of no overlapping of the image of the two sets on the screen as the projection plane. On the other hand, by setting the above zone B and zone C at a position where the same image is projected and overlapped on the screen (not shown), a light flux amount combined with the two sets of each projection image display apparatus can be obtained.

The smaller ratio of area or diagonal dimension of the zone B and the zone C, relative to the above zone A, B/A and C/A are capable of allowing more free layout of the image display element at any place inside the effective region of the object surface of the projection lens, therefore, the freedom of an installation place of the projection image display apparatus, relative to the enlarged image overlapped, is enhanced. However, increase in the effective region of the object surface of the projection lens more than necessity requires a larger diameter lens and leads to the cost increase of the whole system, therefore, practical lower limit should be about 40% by simulation of the inventors. In addition, to shift the projection image display apparatus main body 101 from the center of the external shape of the transparent screen 130, and to arrange two sets, it is required to set the above ratio B/A and C/A at 90% or lower at a minimum.

Figure 8:
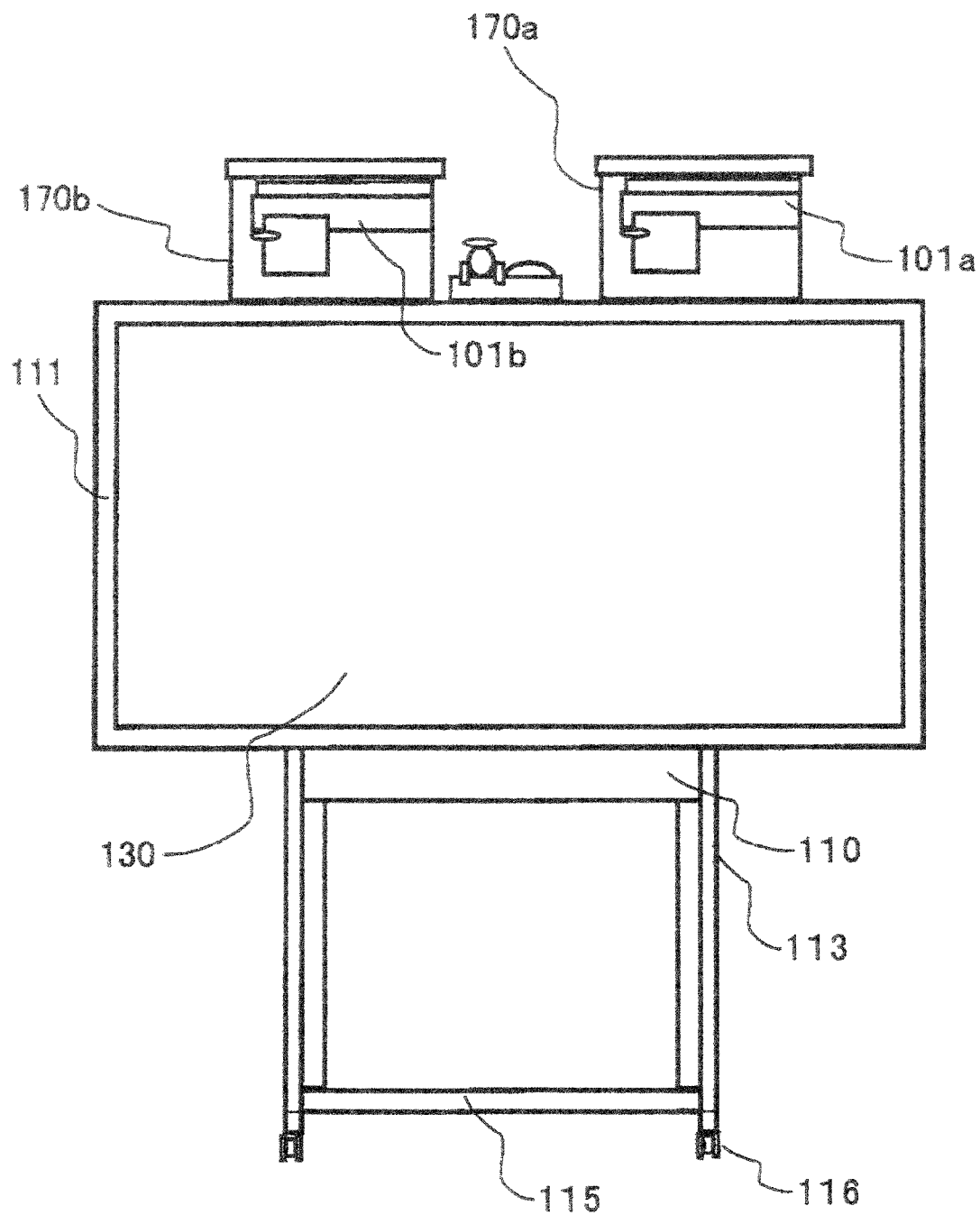
FIG. 8 is a front view illustrating one embodiment of a projection apparatus provided with an oblique projection optical system according to the present invention.

FIG. 8 is a front view of a reflection-system projection apparatus according to the fifth embodiment of the present invention, and a different point from FIG. 7 is that two sets of the projection image display apparatus main body 101a and 101b are installed together via supporting arm 170a and 170b, on an upper part of reflection type screen. Similarly as in the embodiment illustrated in FIG. 7, the two sets of the projection image display apparatus main body 101a and 101b are installed side by side in a horizontal direction of the screen, so that incident angles in a vertical direction to the reflection-system screen becomes the same. As a result, simultaneous projection of the two screens becomes possible. Because the relationship among the effective zone of the object surface (zone A) of the projection lens configuring the oblique projection optical system, and the effective image display regions, (zone B) and (zone C), of the image display element in the two sets of the projection image display apparatuses is the same as the fourth embodiment of the present invention, illustrated in FIG. 7, explanation thereon will be omitted.

Figure 13:
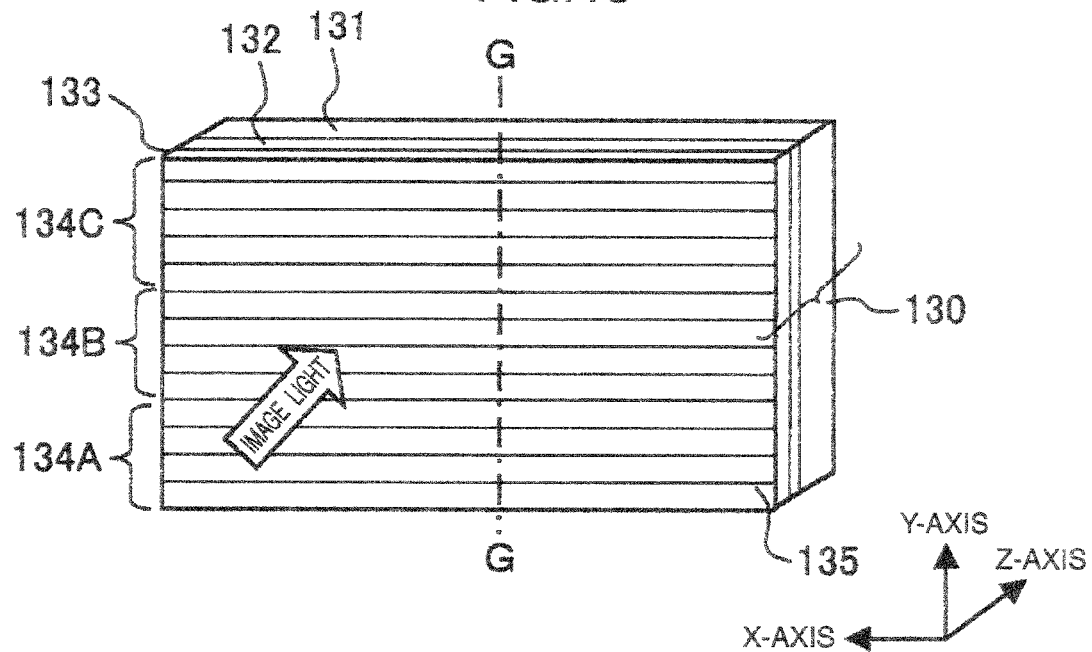
FIG. 13 is a schematic view illustrating a configuration of a transparent screen according to one embodiment of the present invention.

Explanation will be given next on action of the transparent screen according to one embodiment of the present invention, with reference to FIG. 13 to FIG. 15. FIG. 13 is a schematic view of a transparent screen according to one embodiment of the present invention. It has a form where linear Fresnel lenses with cross-sectional shape changing depending on positions in a vertical direction of a screen, are installed continuously in the vertical direction of the screen, as well as the cross-section of the above linear Fresnel lens in the vertical direction of the screen is formed by a lens region where image light is emitted to an image viewing side by refraction action (hereafter referred to as a lens region 1), and a lens region where image light is emitted to an image viewing side by total reflection of the image light (hereafter referred to as a lens region 2), and has a form where ratio of the above lens region 1 and lens region 2 changes from the lower end of the screen toward the upper end. That is, it means that the ratio differs in each of regions 134A, 134B and 134C, however, there may also be a case where the lens region 1 little presents in the region 134A, depending on the incident angle onto the screen of the oblique projection optical system applied to the projection apparatus according to one embodiment of the present invention. It is configured by being provided with a Fresnel sheet substrate 132 installed with a diffusion layer 133 containing a diffusion material, and a hardened surface layer (hard coat layer) 131 for scratch prevention on the view side surface, on the screen view side of a linear Fresnel lens.

Figure 14:
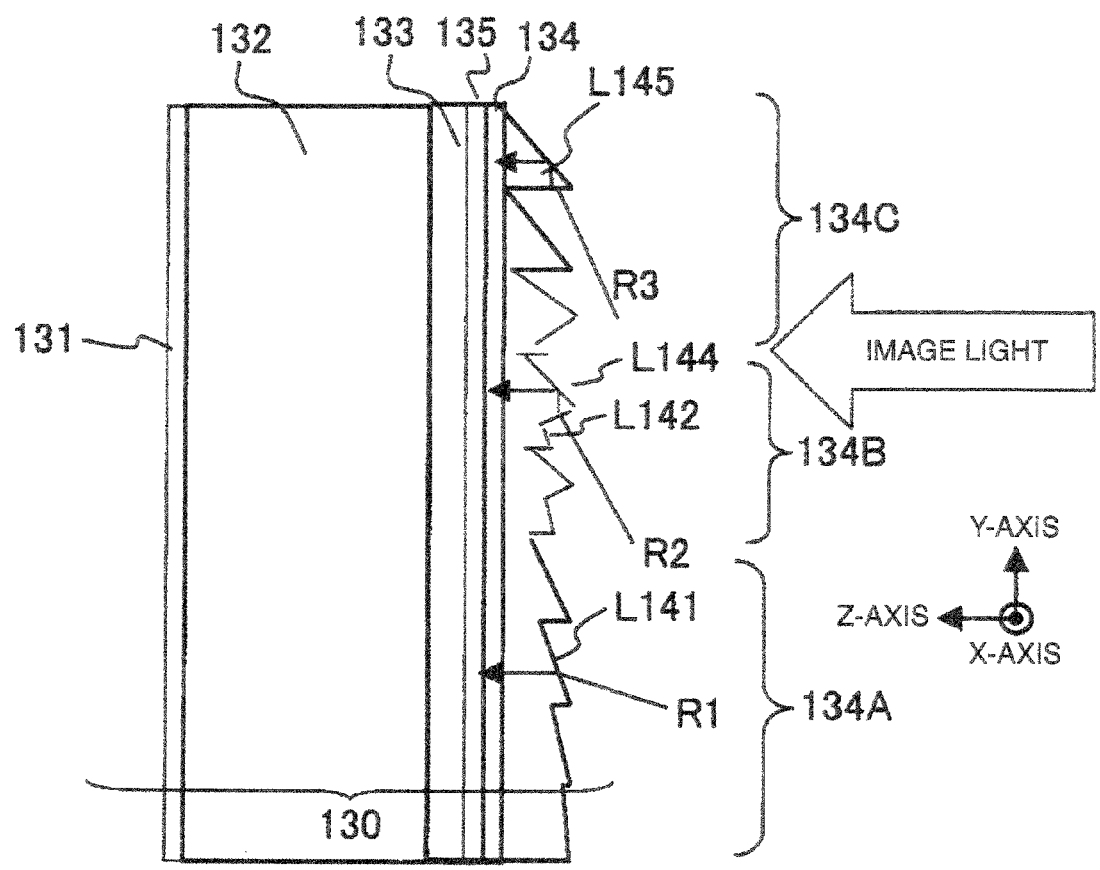
FIG. 14 is a cross-section view illustrating a configuration of a transparent screen according to one embodiment of the present invention.

FIG. 14 is a cross-section view in a vertical direction illustrating schematically a configuration of a transparent screen according to one embodiment of the present invention; the ratio of a refraction-type Fresnel lens increases at the lower end of the screen (region 134A), the ratio of the lens region 2 increases at the center of the screen (region 134B), and only the lens region 2 is present at the upper end part of the screen (region 134C). However, because the incident angle onto the screen changes depending on the shift amount and projection distance of the projection lens of the oblique projection optical system applied to the projection image display apparatus according to one embodiment of the present invention, as described above, it is necessary to optimize this ratio corresponding thereto. For example, in a case where refractive index of a lens part of the linear Fresnel lens is 1.5, because, where light beams exhibit total reflection, incident angle is equal to or larger than 41.8 degree, designing for the light beams after reflection to emit vertically onto the screen surface can be made easily by geometrical optics using the angle of the linear Fresnel lens and incident angle of the light beams as parameters. The linear Fresnel lens is installed at a sheet-like Fresnel substrate 134, and is adhered or stuck to a diffusion layer containing a diffusion material via an adhesive layer 135. Still more, the diffusion layer 133 is stuck or adhered to the screen sheet substrate 132. Still more, on the view side surface of the Fresnel sheet substrate 132, the hardened surface layer (hard coat layer) 131 for scratch prevention is installed.

Figure 15:
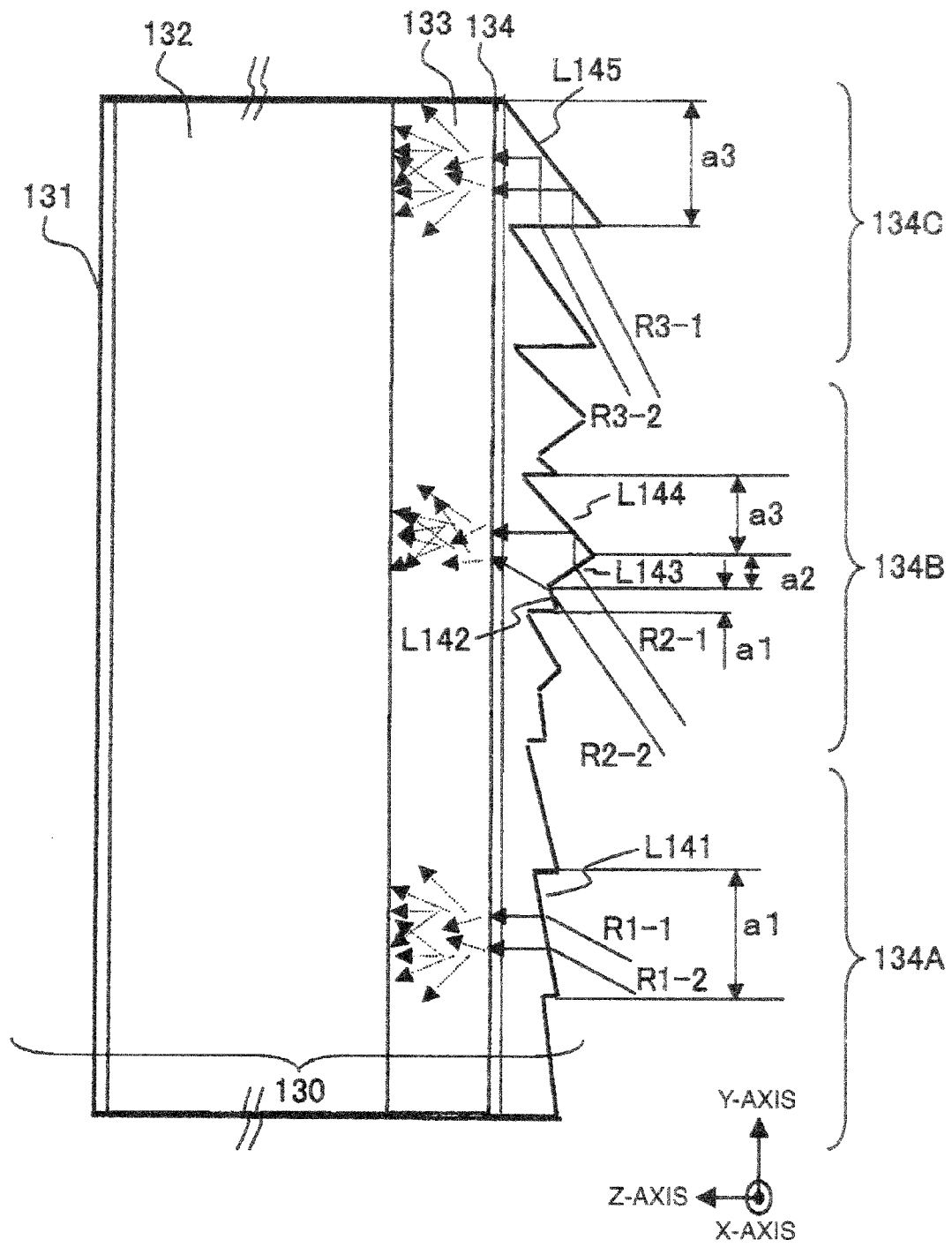
FIG. 15 is an explanation drawing for explaining a configuration and action of a transparent screen according to one embodiment of the present invention.

FIG. 15 is a cross-section view in a vertical direction illustrating schematically a configuration of a transparent screen according to one embodiment of the present invention, and showing ray tracing result of image light. The ratio of a refraction-type Fresnel lens is large at the lower end from the screen (region 134A), the ratio of the lens region 2 is large at the center of the screen (region 134B), and only the lens region 2 is present at the upper end part of the screen (region 134C). Image light R1-1 and R1-2 entered onto the region 134A of the lower end part of the screen are refracted at an incident surface L141 of the Fresnel lens to become nearly parallel light, enter onto the diffusion layer 133, and diffused in vertical and horizontal directions by action of the diffusion material.

In the present embodiment, for explanation reason, a refraction-type lens surface is adopted at the whole surface in a lens regional of the Fresnel lens L141, however, there may also be a case where a refraction surface a1 and a total reflection surface a3 are present in a predetermined ratio, as shown as the center of the screen (region 134B) in the same drawing, also in a region of the lower end part of the screen, depending on the incident angle of the image light onto the screen determined by the shift amount and projection distance of the projection lens of the oblique projection optical system applied to the projection apparatus.

Image light R2-2 entered onto the region 134B of the center part of the screen is refracted at a refraction type lens surface L142 to become nearly parallel light, enters onto the diffusion layer 133, and is diffused in the vertical and horizontal directions by action of the diffusion material. On the other hand, R2-1 enters from a lens surface L143, totally reflects at a total reflection Fresnel lens surface L144 to become nearly parallel light, enters onto the diffusion layer 133, and is diffused in the vertical and horizontal directions by action of the diffusion material. Reflection loss generated at this time becomes nearly zero at the total reflection surface, however, there may be a case where it becomes equal to or higher than 10%, because incident angle is large at the refraction surface. Therefore, it is desirable that the ratio of a1 and a2 in the same drawing is designed optimally, with position in the vertical direction of the screen display and incident angle of image light as parameters, so that this reflection loss also becomes uniform over the whole screen.

In the embodiment illustrated in FIG. 15, for explanation reason, the refraction surface a1 and the total reflection surface a3 are present in a predetermined ratio, as shown as the center of the screen (region 134B), however, there may be a case where also in a region of the center part of the screen, the whole Fresnel lens surface takes a total reflection system, as shown by L143 and L144, depending on the incident angle of the image light onto the screen determined by the shift amount and projection distance of the projection lens of the oblique projection optical system applied to the projection apparatus. On the other hand, in the upper end part of the screen (region 134C), it becomes possible to make emitted image light to a view side without loss, even when incident angle of image light onto the screen is large, by making a Fresnel lens surface L145 a total reflection system.

Figure 36:
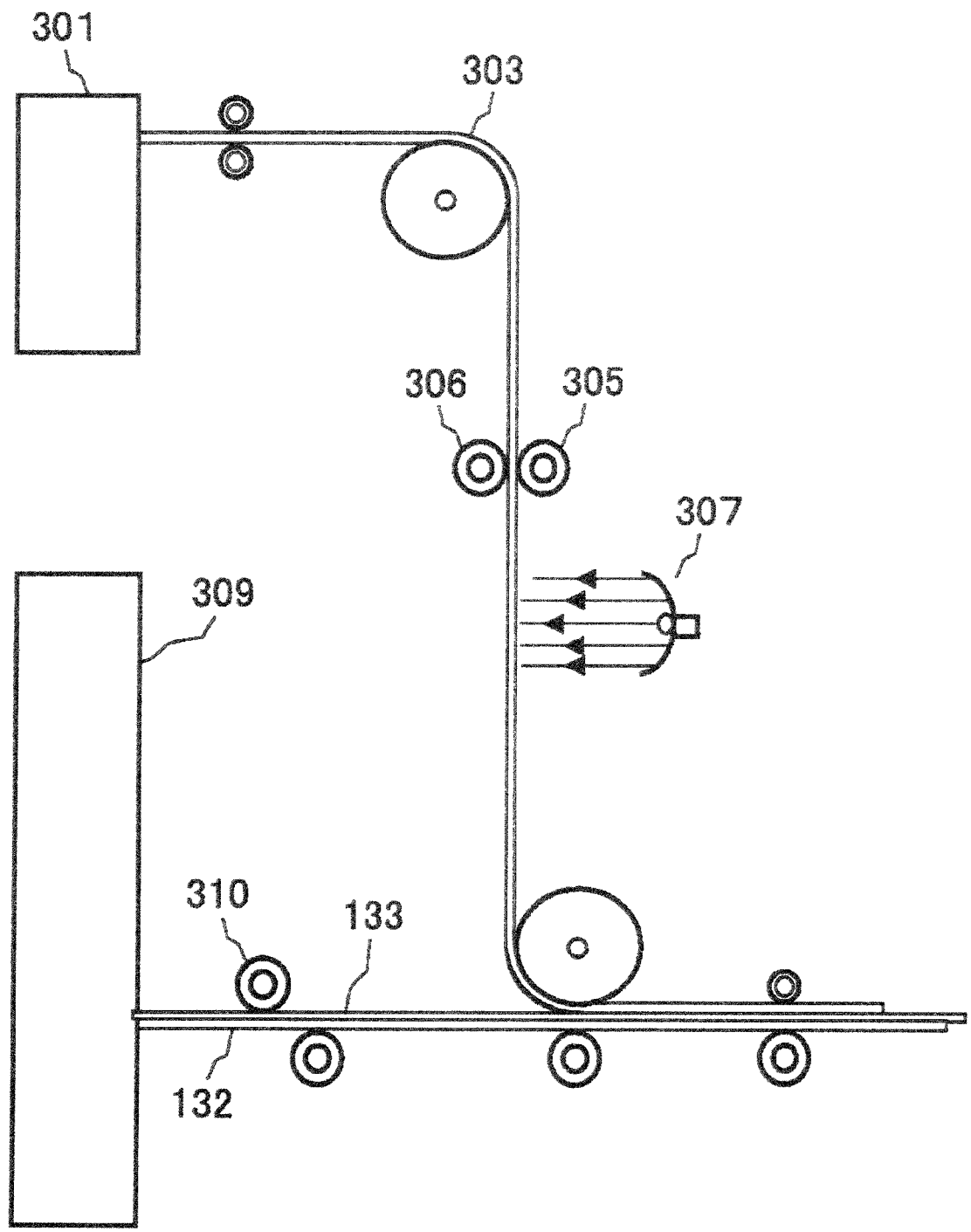
FIG. 36 is a schematic view illustrating a part of a manufacturing method for a transparent screen according to one embodiment of the present invention illustrated in FIG. 15.
Figure 37:
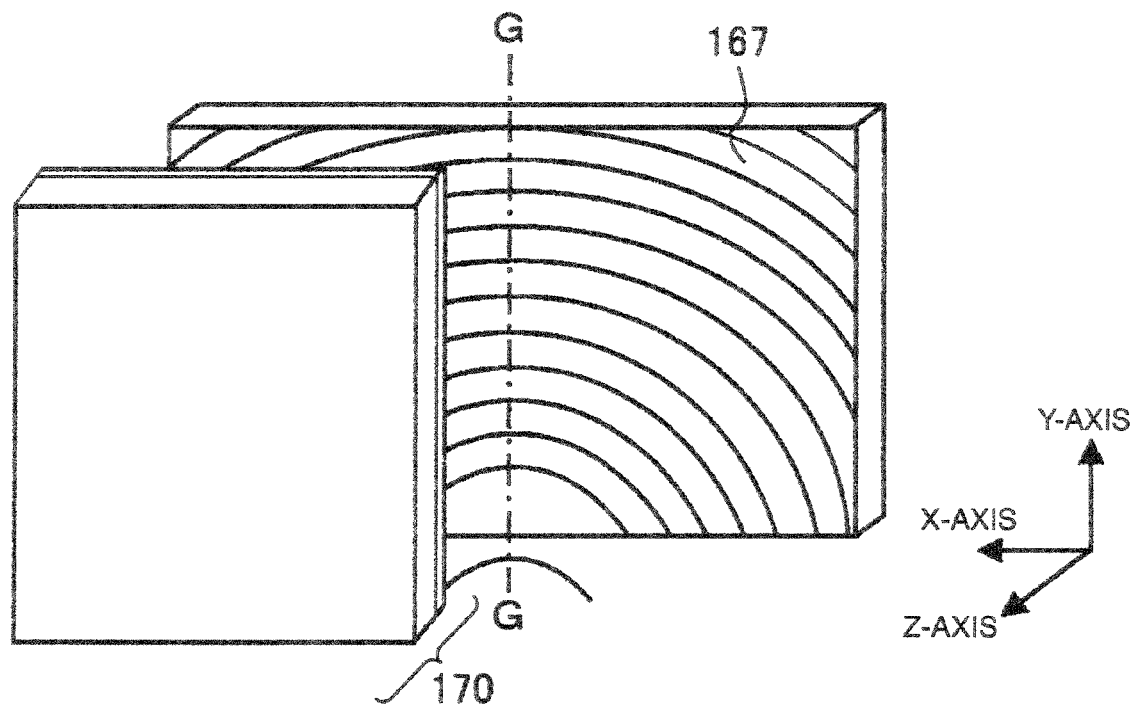
FIG. 37 is an explanation drawing for explaining action of a conventional transparent screen, in the case of combining an oblique projection optical system according to one embodiment of the present invention and a conventional transparent screen.
Figure 38:
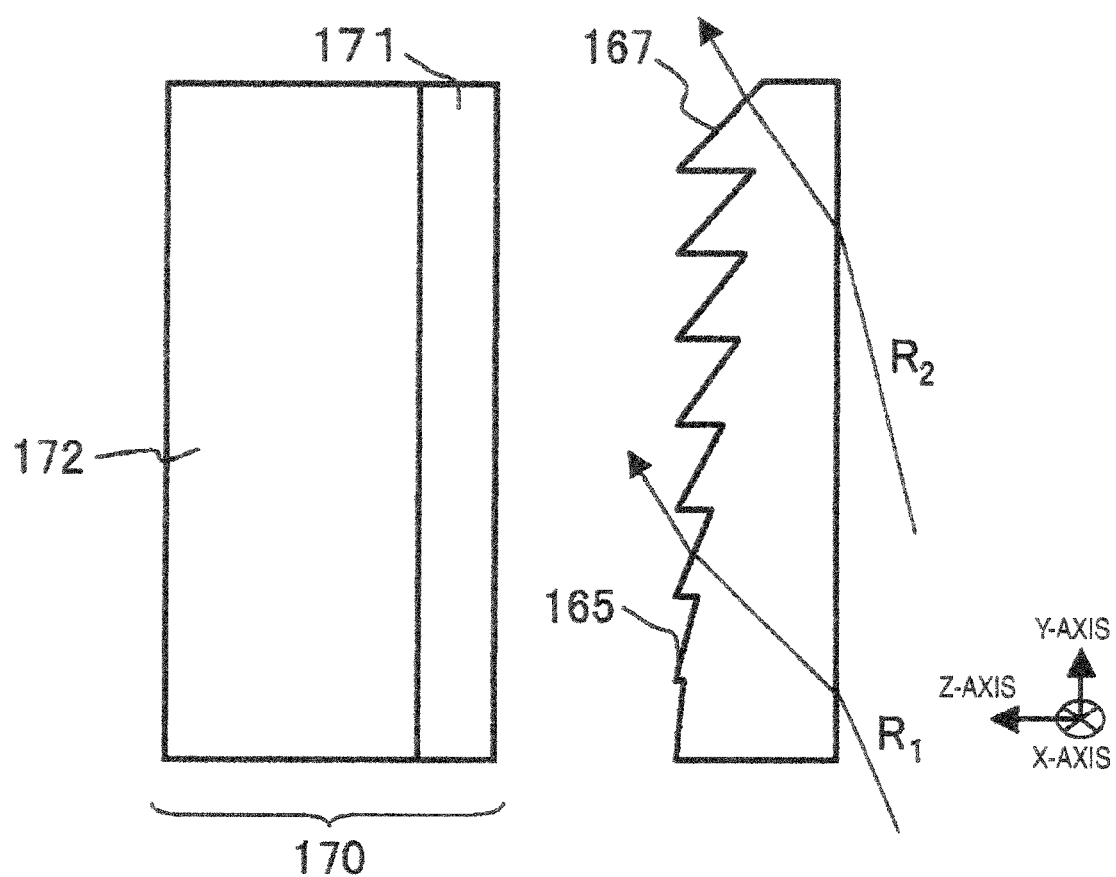
FIG. 38 is an explanation drawing for explaining action of a conventional transparent screen, in the case of combining an oblique projection optical system according to one embodiment of the present invention and a conventional transparent screen.
Figure 39:
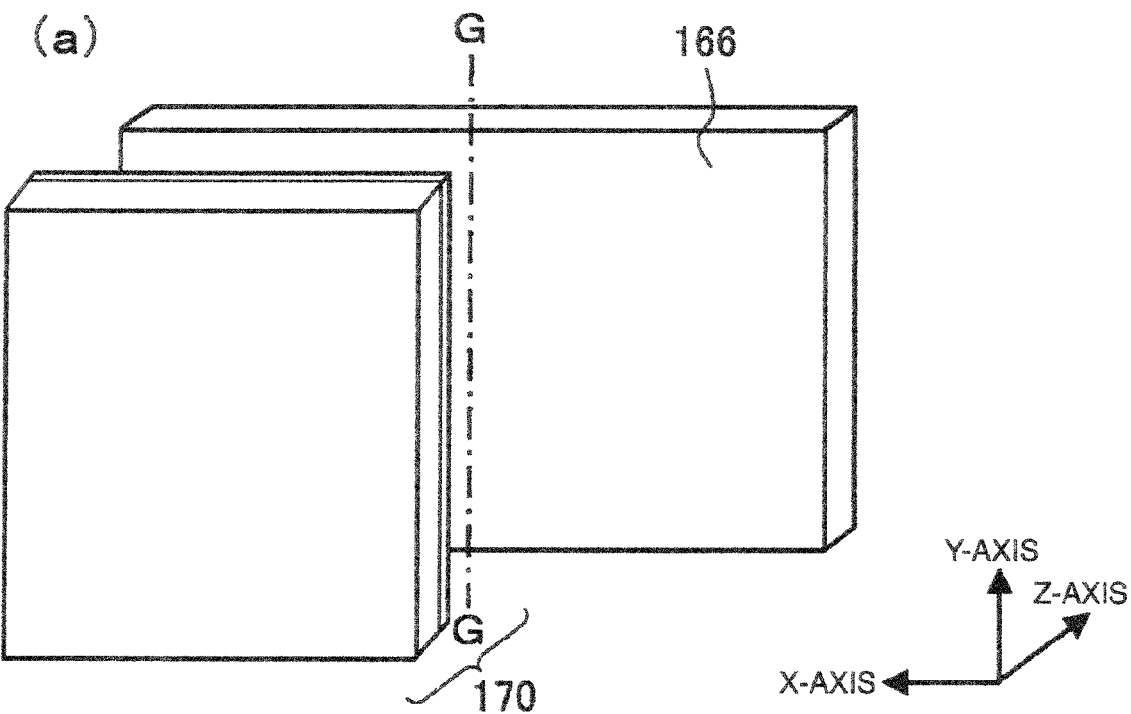
FIG. 39 is an explanation drawing for explaining action of a conventional transparent screen, in the case of combining an oblique projection optical system according to one embodiment of the present invention and a conventional transparent screen.
Figure 40:
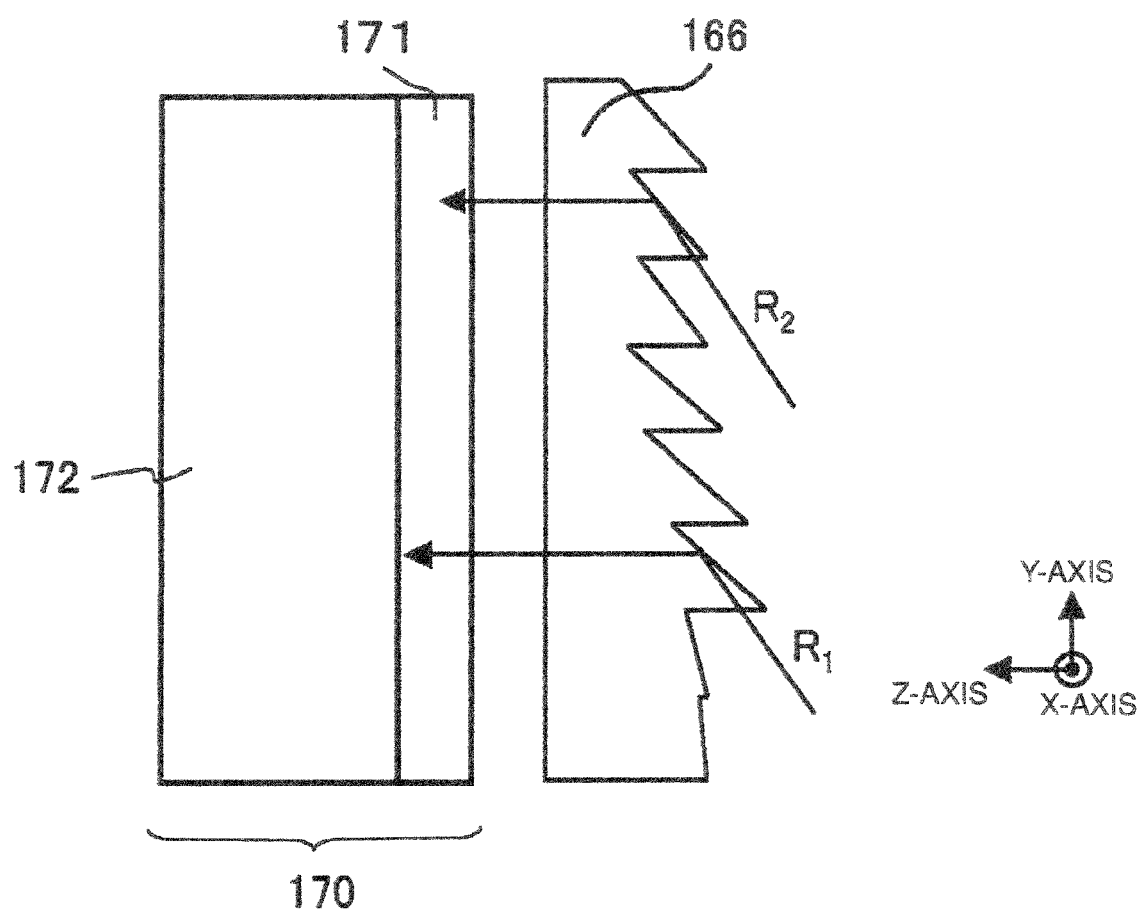
FIG. 40 is an explanation drawing for explaining action of a conventional transparent screen, in the case of combining an oblique projection optical system according to one embodiment of the present invention and a conventional transparent screen.

Explanation will be given below on a manufacturing method and a configuration of the transparent screen according to the above one embodiment of the present invention described above, with reference to FIG. 36. In FIG. 36, a Fresnel sheet substrate 303 wounded in a roll is sent out in a flat state by a sheet supplying machine 301. At this time, onto one surface of the sheet surface, a resin to be hardened with UV rays or visible rays or electron beams is coated, and a Fresnel lens shape is formed using a linear Fresnel molding roll 305, and hardened by irradiation of light from an irradiation unit (lamp) 307 for hardening (with UV rays or visible rays or electron beams). In addition, onto the other surface, adhesives are coated using a coating roll of pressure sensitive adhesives (adhesives) 306, while the screen substrate 132 is formed using an extrusion molding machine 309, and then a diffusion layer is formed at one surface, and fixed under pressure to the screen substrate 132 using a diffusion layer pressure roller 310. The above described two kinds of sheets are stuck (adhered) by a Fresnel sheet pressure roller and integrated, and then cut into required dimension. At this time, because the Fresnel sheet substrate 303 is supplied in a roll-wound state, thickness is preferably equal to or less than 500 µm, and in consideration on blurring amount of image light, thickness is still more preferably equal to or less than 300 µm. Candidates of the material include polycarbonate, polyethylene terephthalate, polypropylene or the like. However, in consideration of dimensional stability, low moisture absorbing material such as polycarbonate, or polyethylene terephthalate is suitable. In addition, as a screen substrate, acrylics, polycarbonate, polystyrene or the like having high transmittance is suitable, and thickness thereof differs depending on screen size. However, it was found from experimental verification for measuring dented amount in pressing with a finger, that ratio (t/D) of t representing the thickness of the screen substrate and D representing diagonal dimension of the screen, of equal to or lower than 0.25% provides insufficient mechanical strength, resulting in large bending when pressed with a finger, while the ratio of over 0.5% increases mass and requires enhancement of mechanical strength of the projection apparatus, and thus leading to cost increase. In addition, to reduce lowering of contrast caused by external light, it is preferable to use a substrate with reduced transmittance for visible light, as a screen substrate. It is because for the external light to enter onto the screen, diffuse at the diffusion material and emit again to the view side, it will pass through the screen substrate twice, while image light only passes through once, and attenuation of the external light is proportional to square of absorbance (1−(transmittance of the substrate+surface reflectance)). The present inventors have determined experimentally that, from the relationship between Gs representing screen gain of the above transparent screen (ratio of brightness of emission light and illumination of injection light) and Ts representing transmittance, a range satisfying the following expression is desirable to obtain good contrast performance:

$$0.6 < Gs < 2.0 \text{ and } 0.3 < Ts < 1.0$$

Because the above-described transparent screen 130 according to one embodiment of the present invention has integral constitution, and the linear Fresnel (there may also be the case partially where a total reflection region and a Fresnel region present together) lens installed on the incident surface of image light can be mass-produced continuously by roll forming, mass-productivity is enhanced drastically and cost reduction is possible, as compared with two-piece constitution according to conventional technology and an individual forming system by a mold, which is a forming method for a Fresnel lens, where a Fresnel lens sheet is a circular Fresnel system.

Figure 16:
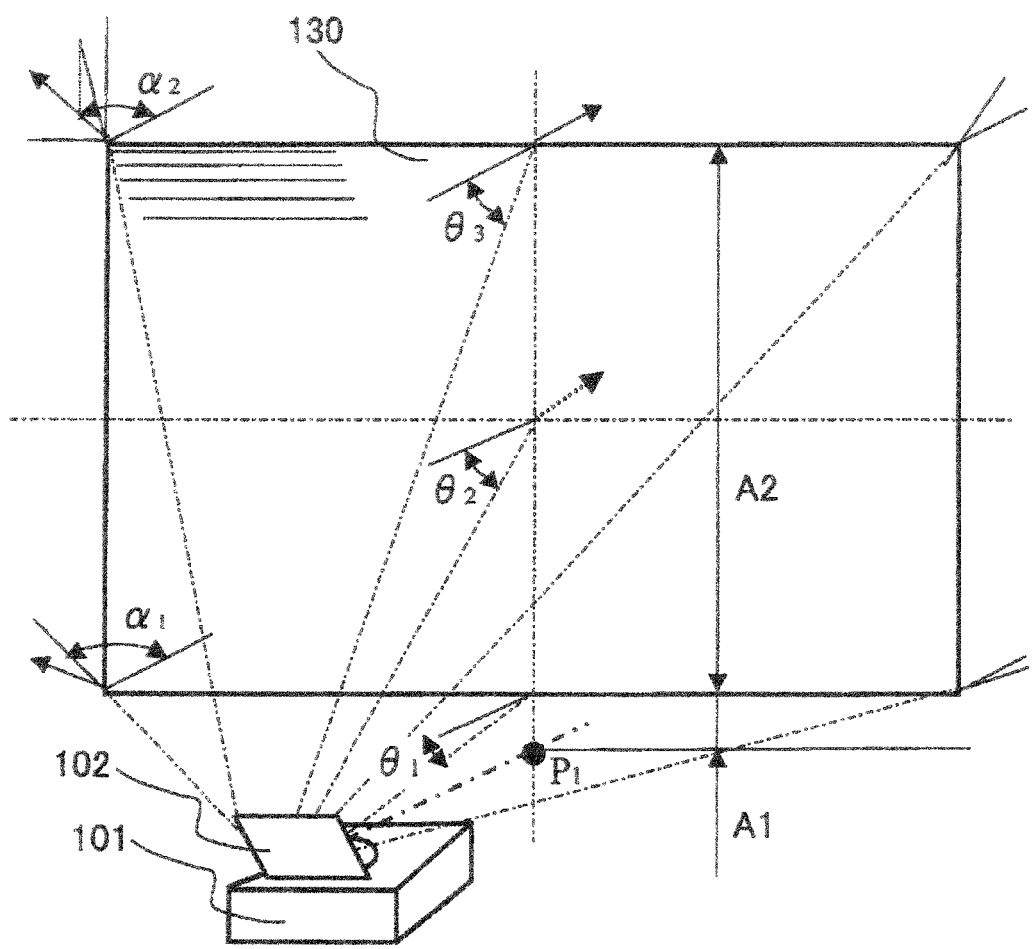
FIG. 16 is a first explanation drawing in one embodiment for explaining action of a transparent screen of the present invention, in the case of combining an oblique projection optical system of the present invention and a transparent screen according to the present invention.
Figure 23:
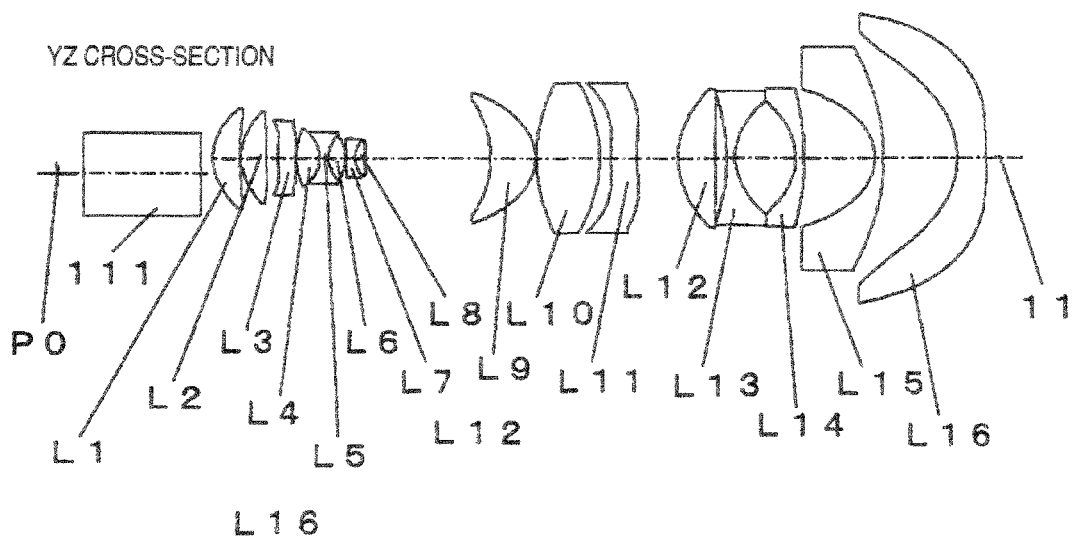
FIG. 23 is a cross-sectional view of a projection lens representing a lens configuration of one embodiment of an oblique projection optical system according to the present invention (lens data represented in FIGS. 25A and 25B).

FIG. 16 is a schematic drawing explaining action of the transparent screen 130, in a case of combining the transparent screen 130 according to one embodiment of the present invention, and the projection image display apparatus 101 equipped with an oblique projection optical system. Aspect ratio of the transparent screen is a landscape type of 16:9, and a mirror for folding light path is omitted, for explanation reason. The projection image display apparatus 101 of the present invention attains a large shift of the optical axis, so that a projection image is not present in the shadow of a mirror 102, by adopting the oblique projection optical system. For example, in the projection lens of a first embodiment of the present invention to be described later (the configuration drawing is represented in FIG. 23, ray tracing result is represented in FIG. 24, and a lens data is represented in FIGS. 25A and 25B), an effective image display region of an image display element has a ratio of A2:A1 of 10:−2.5, in a case where diagonal dimension is landscape width of 0.59 inches. In a case where the projection image has a diagonal dimension of 80 inches, because arrangement of the lower end of the planar mirror M1 at a position of 30 mm from the L16 lens, as represented in FIG. 24, provides a distance from the planar mirror M1 to the transparent screen 130 of 855 mm, A1 becomes 249 mm and A2 becomes 996 mm. Incident angle $\theta_1$ of image light to the lower end of the transparent screen 130 is determined geometrically to be 16.2 degree, by assuming absence of flip-up effect (change of light beam angle before and after reflection at the mirror becomes two times of the mirror inclination). Similarly, incident angle $\theta_2$ of image light at the center of the screen is 41.1 degree, incident angle $\theta_3$ of image light at the upper stage of the screen is 55.5 degree, and reflection at a refractive index of 1.5 of a general resin as the screen substrate, is 14% in S polarized light. Still more, it becomes as high as 60.8 degree at upper end corner part of the most stringent condition, and 18% in S polarized light.

Therefore, in the transparent screen according to one embodiment of the present invention, it is designed to suppress reflection loss by installing the refraction surface a1 and the total reflection surface a3 in a predetermined ratio, as shown as the center of the screen (region 134B) in FIG. 15, even in a region of the lower end of the screen, by increasing ratio of total reflection Fresnel lens surface L toward the upper end of the screen.

Figure 21:
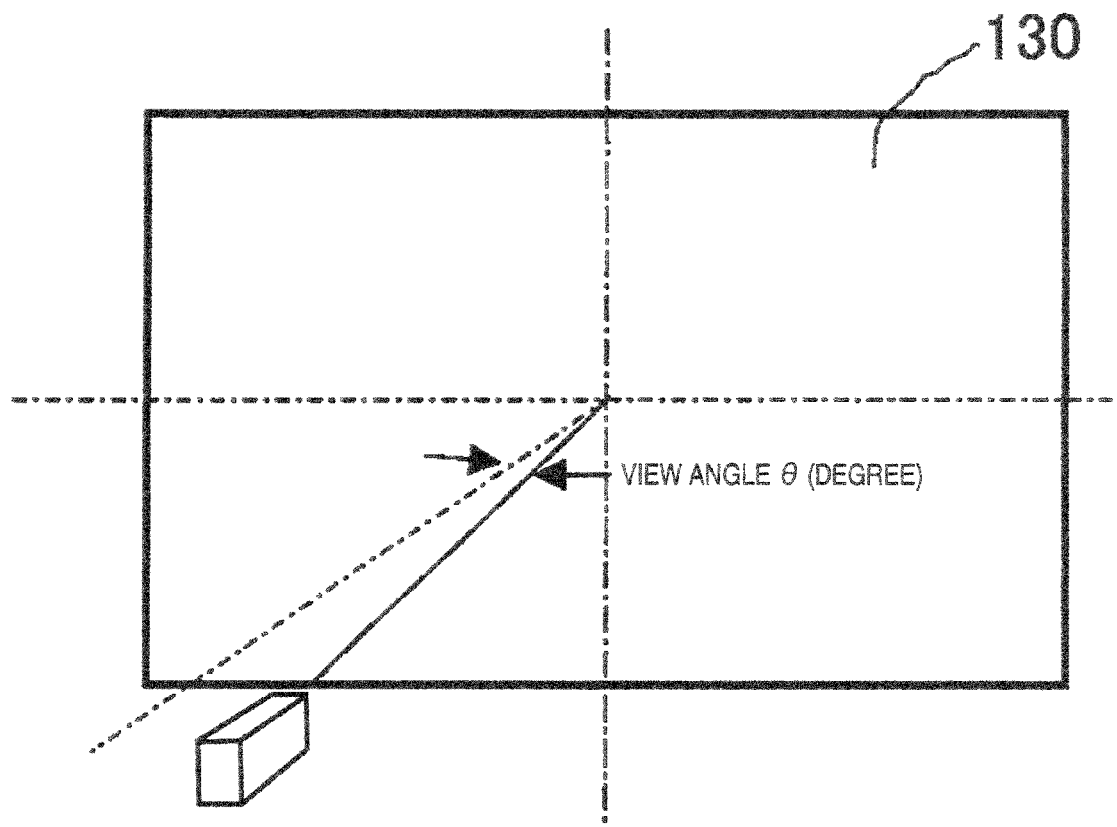
FIG. 21 is an explanation drawing for explaining an evaluation method for directivity characteristics of a transparent screen according to one embodiment of the present invention.
Figure 22:
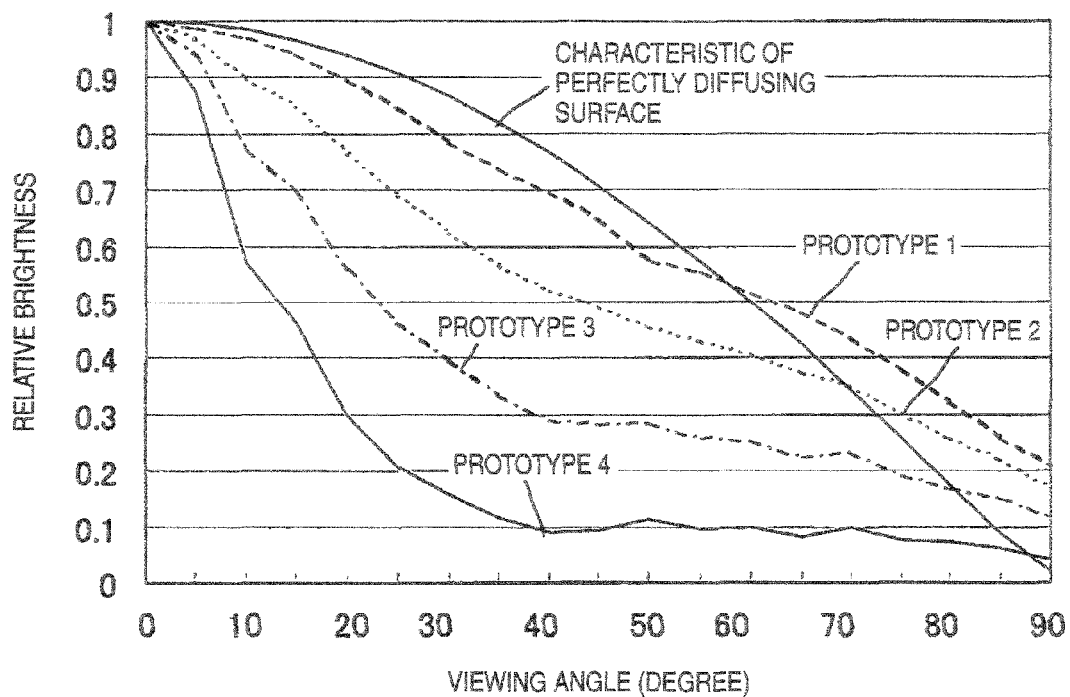
FIG. 22 is a characteristics drawing representing a directivity characteristics of a transparent screen according to one embodiment of the present invention.

Because the transparent screen according to an embodiment of the present invention has integral constitution, and has a form on an incidence side of image light, where Fresnel lenses, with cross-sectional shape changing depending on positions in the vertical direction of a screen, are installed continuously in the vertical direction of the screen, action of the Fresnel lens is not activated in the horizontal direction. Therefore, to control brightness uniformity of the whole screen surface, selection of a diffusion material installed in the diffusion layer, and diffusion characteristics obtained become points. The inventors made several kinds of prototypes of the transparent screens with different diffusion characteristics, and as illustrated in FIG. 21, actually measured brightness change of the screen center using view angle θ as a parameter, and at the same time performed sensory evaluation also on brightness change of the whole screen. Results thereof are represented in FIG. 22. In a prototype 1 (a screen gain of 0.6) and a prototype 1 (a screen gain of 0.9), having characteristics near to a total diffusion surface, characteristics having no practical problems at all was obtained, even by visual evaluation of brightness of the whole screen from an oblique direction. In addition, in a prototype 4 (a screen gain of 2.5), there was a practical problem of conspicuous brightness decrease at a screen part far from a view direction, when the view angle was equal to or larger than 50 degree. Accordingly, a prototype 3 having a screen gain of 2.0 was made as prototype, and by performing similar evaluation, practical level of characteristics was obtained.

Figure 17:
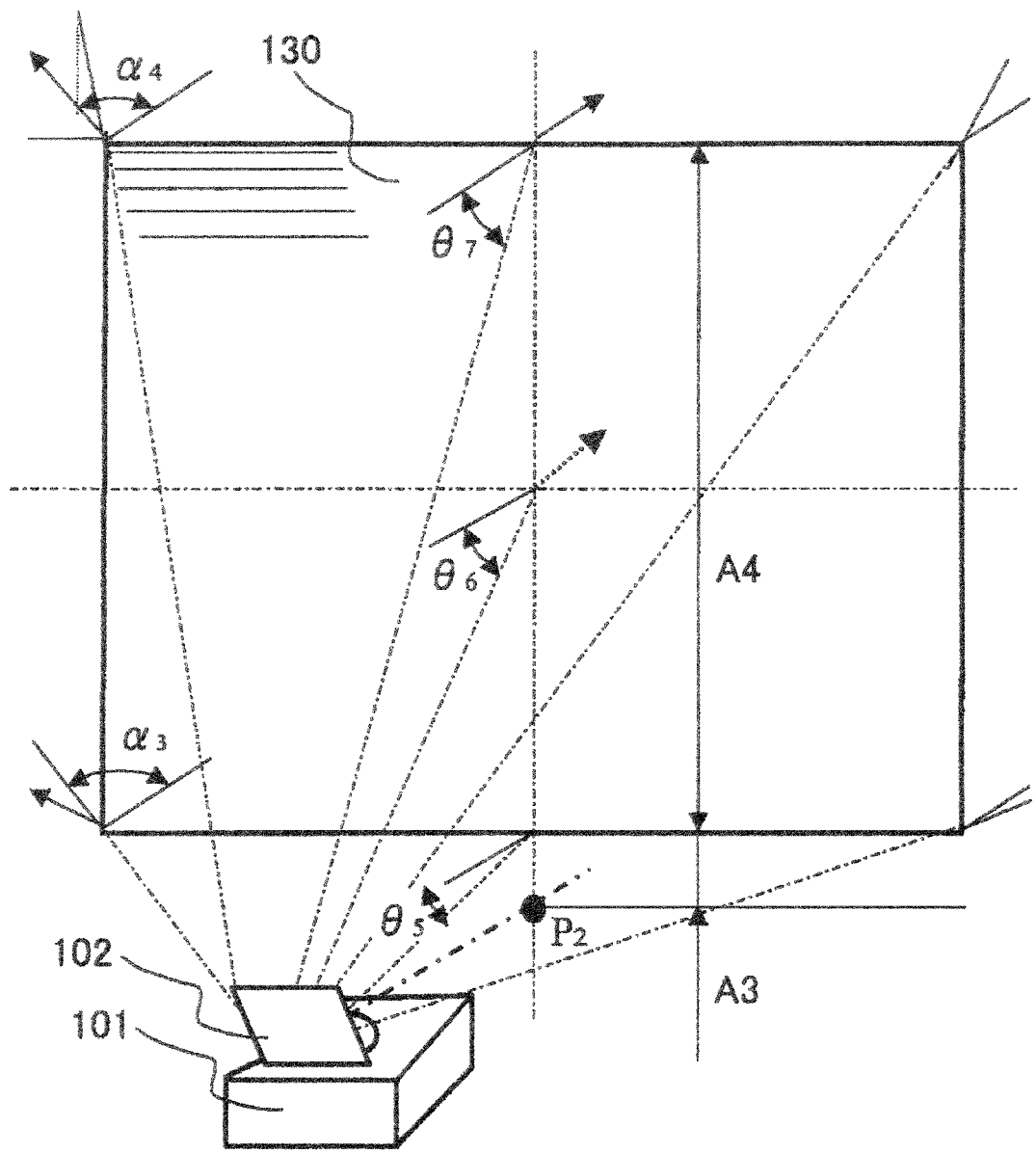
FIG. 17 is a second explanation drawing in one embodiment for explaining action of a transparent screen of the present invention, in the case of combining an oblique projection optical system of the present invention and a transparent screen according to the present invention.

FIG. 17 is a schematic drawing for explaining action of the transparent screen 130, in a case of combining the transparent screen 130 according to the second embodiment of the present invention and the projection image display apparatus 101 equipped with an oblique projection optical system. A difference from the transparent screen according to the first embodiment of the present invention, illustrated in FIG. 16, is that aspect ratio of the projection surface is 4:3, and also in FIG. 17, the light path folding mirror is omitted for explanation reason. The projection image display apparatus 101 in one embodiment of the present invention attains large shift of the optical axis, so that a projection image is not present in the shadow of the mirror 102, by adopting the oblique projection optical system. For example, in the projection lens according to the second embodiment of the present invention to be described later (the configuration drawing is represented in FIG. 23, and a lens data is represented in FIGS. 28A and 28B), an effective image display region of an image display element has a ratio of A4:A3 of 10:−2.3, in a case where diagonal dimension is 0.63 inches. In a case where the projection image has a diagonal dimension of 80 inches, because the distance from the mirror M2 to the transparent screen 130 is 882 mm, the incident angle $\theta_1$ of image light to the lower end of the transparent screen 130 is determined geometrically to be 17.6 degree, because A3 is 280 mm and A4 is 1218 mm, by assuming absence of flip-up effect (change of light beam angle before and after reflection at the mirror becomes two times of the mirror inclination) of image light at the mirror M2, similarly as in the embodiment. Similarly, the incident angle $\theta_2$ of image light at the center of the screen is 45.2 degree, the incident angle $\theta_3$ of image light at the upper stage of the screen is 59.5 degree, and reflection at a refractive index of 1.5 of a general resin, as the screen substrate, is as high as 18% in S polarized light. Still more, it becomes as high as 62.6 degree at the upper corner part, being the most stringent condition, and as high as 20% in S polarized light. In this way, incident angle was determined geometrically, however, when ray tracing is performed and also flip-up effect of the mirror M2 is included, incident angle at the upper end corner part of the screen becomes as high as 69 degree in the present embodiment.

The inventors made several kinds of prototypes of transparent screens with different diffusion characteristics, similarly as in the first embodiment, actually-measured brightness change of the screen center using view angle $\theta$ as a parameter, and at the same time performed sensory evaluation also on the brightness change of the whole screen. Results thereof are shown in FIG. 22. In a prototype 1 (a screen gain of 0.6) and a prototype 1 (a screen gain of 0.9), having characteristics near to a total diffusion surface, characteristics having no practical problems at all was obtained, even by visual evaluation of brightness of the whole screen from an oblique direction. In addition, in a prototype 4 (a screen gain of 2.5), there was a practical problem of conspicuous brightness decrease at a screen part far from a view direction, when the view angle was equal to or larger than 55 degree. Accordingly, a prototype 3 having a screen gain of 2.0 was made as prototype, and by performing similar evaluation, practical level of characteristics was obtained.

Similarly, in the projection lens (its configuration is not shown, and a lens data is represented in FIGS. 30A and 30B) of the third embodiment of the present invention, an effective image display region of an image display element has a ratio of A4:A3 of 10:−2.3, in a case where diagonal dimension is 0.63 inches. Still more, in the projection lens (the configuration is represented in FIG. 31, and a lens data is represented in FIGS. 32A and 32B) of the fourth embodiment of the present invention, an effective image display region of an image display element has a ratio of A4:A3 of 10:−2.3, in a case where diagonal dimension is 0.63 inches. Ratio (D/L) of L representing the distance between the projection surface dimension and the lens, arranged at the nearest position to the projection surface, and D representing the diagonal dimension of the projection image, of the above embodiment of the present invention has the following relationship, for 80 inches projection (a diagonal dimension of 2032 mm):

In the first embodiment: 2032/885.6=2.29
In the second embodiment: 2032/1001.9=2.03
In the third embodiment: 2032/1138=1.79
In the fourth embodiment: 2032/1107.4=1.83 and the above ratio (D/L) of equal to or higher than 1.75 is capable of attaining a sufficiently compact projection apparatus, by arranging the mirror for folding light path between the projection lens and the projection surface.

On the other hand, to enhance the brightness uniformity of the screen display, enhancement of peripheral light amount ratio of the projection lens becomes an important element, other than the aforementioned diffusion characteristics of transparent screen.

Figure 19:
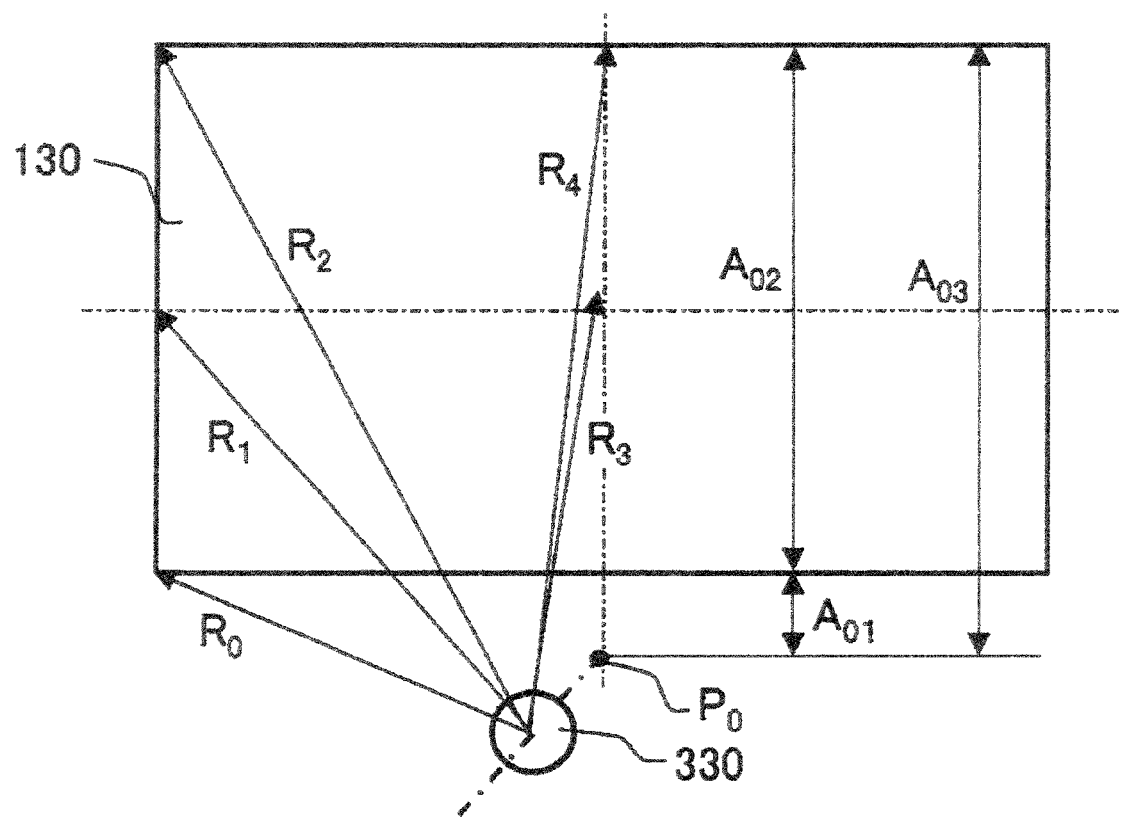
FIG. 19 is an explanation drawing for explaining peripheral light amount ratio of an oblique projection optical system in one embodiment of the present invention.
Figure 20:
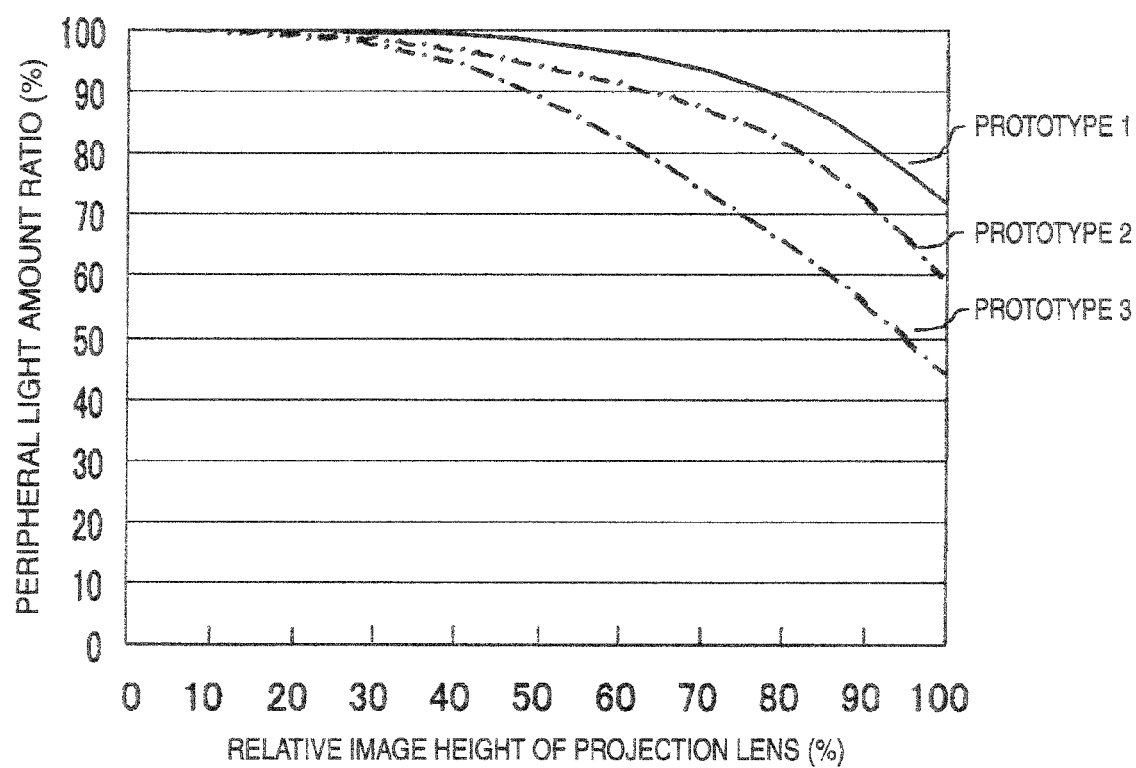
FIG. 20 is a characteristics drawing showing peripheral-light amount ratio of a projection lens for use in an oblique projection optical system according to one embodiment of the present invention.

FIG. 19 is a schematic drawing illustrating positional relation between an exit pupil 330 of a projection lens configuring an oblique projection optical system according to one embodiment of the present invention, and the transparent screens 130 of the projection surface. Because the projection lens according to one embodiment of the present invention has, as aforementioned, a predetermined shift amount ($A_{02}$: $A_{01}$), by setting relative image height of the center $P_0$ of a pseudo optical axis of the projection lens to be 0%, and relative image height of the left and right corner parts of the upper end of the screen to be 100%, ratio of brightness of the center $P_0$ of the pseudo optical axis, and brightness obtained from image light going toward each point of the screen, for example, $R_0$ to $R_4$, was evaluated on each projection lenses of prototype (results are represented in FIG. 20), and similar evaluation was performed by combining a prototype 3 of the transparent screen having a screen gain of 2.0, which was a practical level in the above brightness uniformity evaluation of an embodiment of the present invention.

There was no problem in any prototype lenses on the total surface property of brightness in correct position to the transparent screen, however, there was a practical problem of conspicuous brightness decrease at a screen part far from a view direction, when the transparent screen was viewed from an oblique direction where the view angle is over 45 degree.

Then similar evaluation was performed on the projection lenses of the prototype 2 and the prototype 1, and obtained brightness uniformity in a level not having practical problems at all. From the above evaluations, it was clarified that in order to satisfy the practical level brightness uniformity, in the oblique projection optical system and the transparent screen according to one embodiment of the present invention, it is enough to set the peripheral light amount ratio at equal to or higher than 60% for a relative image light of the projection lens of 100%.

Figure 18:
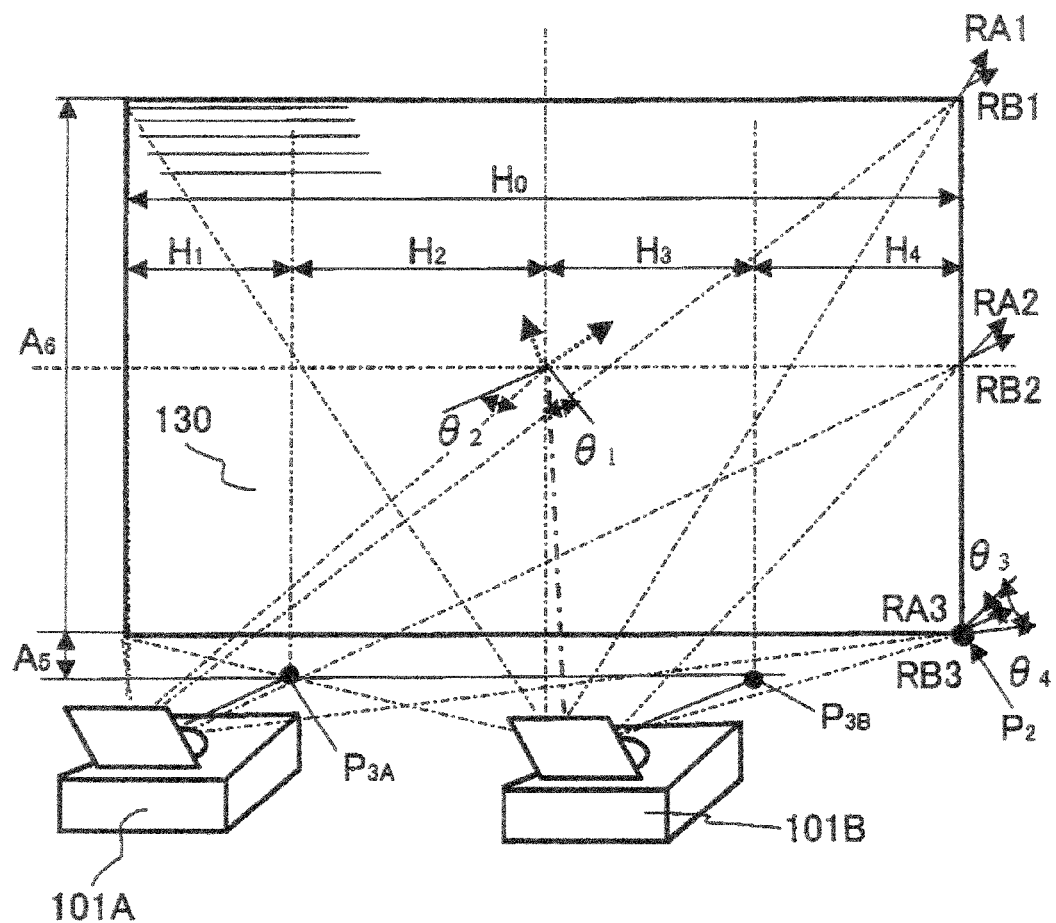
FIG. 18 is a third explanation drawing in one embodiment for explaining action of a transparent screen of the present invention, in the case of combining an oblique projection optical system of the present invention and a transparent screen according to the present invention.

Still more, as the projection apparatus according to one embodiment of the present invention, explanation will be given on a case where the transparent screen 130 according to one embodiment of the present invention and the projection image display apparatuses 101A and 101B provided with the oblique projection optical system according to one embodiment of the present invention, are combined as a plurality of sets, with reference to FIG. 18. Aspect ratio of the transparent screen is set to be landscape 16:9, and, for explanation reason, two sets of the projection image display apparatuses are used, and the light path folding mirror is omitted. The projection image display apparatus 101A and 101B according to one embodiment of the present invention attain large shifts of the optical axis, so that a projection image is not present in the shadow of the mirror 102, by adopting the oblique projection optical system. For example, a ratio of A6:A5 is 10:−2.6, in a case where the diagonal dimension of the effective image display region of an image display element is landscape width of 0.59 inches and the diagonal dimension of the effective region of the object surface of projection lens is landscape width of 0.8 inches. Because each of $H_2$ and $H_3$ become 232 mm, and each of $H_1$ and $H_4$ become 652.7 mm in a case where the diagonal dimension of the projection image is set to be 80 inches, space where two sets of the projection image display apparatus are installable together can be secured. At this time, because use of the projection lens having the projection distance of about those in the first through the fourth embodiments of the present invention, provides each of angle $\theta_2$ and $\theta_1$ of about 14 degree, in the horizontal direction of the screen display of image light going toward the center of external shape of the transparent screen, it was experimentally confirmed that characteristics of the prototype 3 represented in FIG. 22 is capable of providing brightness uniformity in a level of not having a practical problem at each point on the transparent screen. In addition, to still more enhance the uniformity, it is enough to use the transparent screen having the characteristics of the prototype 2 or the prototype 1.

Figure 41:
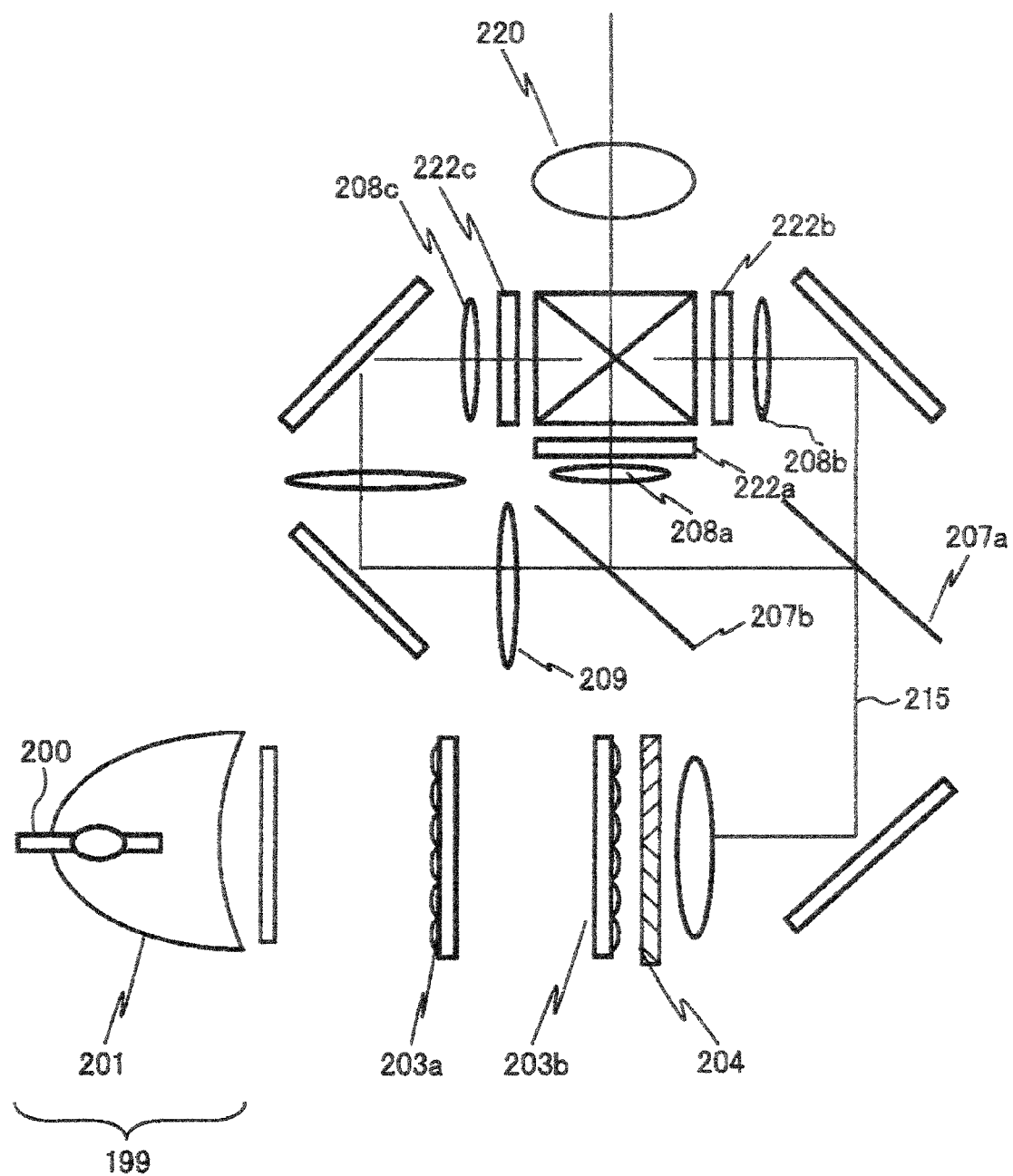
FIG. 41 is a configuration drawing representing one example of a lighting optical system of a projection image display apparatus.

Explanation will be given next on an example of the projection image display apparatus for use in the projection apparatus according to the present invention, and an embodiment of a lighting optics in a case of using a liquid crystal element as the image display element, with reference to FIG. 41. In FIG. 41, a light source 199 is composed of a lamp bulb 200 and a reflector 201. This lamp 199 is a white lamp of a high pressure mercury lamp. In addition, the reflector 201 is one arranged so as to cover the lamp 200 from the rear side, for example, one having a reflection surface of paraboloid shape of revolution, and has an emission opening of circular or polygonal shape. And, light emitted from this lamp bulb 200 is reflected at the reflector 201 having the reflection surface of paraboloid shape of revolution, and emitted as a light flux nearly parallel to an optical axis 215. Light emitted from the light source 199 enters an integrator of a multi-lens-system.

As described above, a multi-lens-system integrator 203 is configured by a multi-lens element 203a and a multi-lens element 203b. It should be noted that lens cell shape of the first multi-lens 203a has rectangular shape nearly analogous to liquid crystal panels 222a, 222b and 222c, when viewed from a direction of an optical axis 215, and is one formed by fixedly setting up a plurality of lens cells in a matrix way, which divides incident light from a light source to a plurality of light by the plurality of lens cells, by which leading to pass through efficiently the second multi-lens 203b and a polarized light conversion element 204. That is, the first multi-lens 203a is designed so that each lens cell of the lamp bulb 200 and the multi-lens element 203b has optically conjugated relation.

Lens cell shape of the second multi-lens element 203b has rectangular shape when viewed from a direction of an optical axis 215, similarly as in the first multi-lens element 203a, and is one having a configuration fixedly set up with the plurality of lens cells in the matrix way, and the lens cell configuring the relevant lens element projects an image (maps an image) of lens cell shape of each corresponding the first multi-lens element 203a, onto superimpose lenses 208a, 208b and 208c along with onto the liquid crystal panels 222a, 222b and 222c. And, in this process, by action of a polarized light conversion element 204, light from the second multi-lens element 203b is aligned to a predetermined direction of polarized light. At the same time, a projection image by each lens cell of the first multi-lens element 203a is superimposed each by action of the superimpose lenses 208a, 208b and 208c, and thus light amount distribution becomes uniform on each corresponding liquid crystal panels 222a, 222b and 222c.

Finally, explanation will be given on embodiment of the projection lens for use in the oblique projection optical system attaining the projection apparatus according to the present invention, with reference to drawings.

Firstly, FIG. 23 is a cross-sectional view representing a fundamental configuration of the projection lens for use in the above oblique projection optical system, and shows the configuration of the relevant optical system by YZ-cross-section in XYZ orthogonal coordinate system. In this description, for explanation reason of the projection optical system, an object point PO, which become a crystal panel 222 (not shown) of an image display surface, and a cross prism 111 are shown at the left side, and the projection surface is shown at the right side. The present embodiment is one corresponding to a lens data represented in FIGS. 25A and 25B, and a lens L16 arranged at a position nearest to the projection surface has plastic aspherical lens shape, and as represented in FIG. 24, by arranging it at a position where an effective region of a lens, through which image light flux passes, does not include an optical axis shared by a plurality of lenses configuring the oblique projection optical system, control of light flux forming an image at the peripheral of the screen, becomes possible only by the shape of lens L16, and correction of trapezoidal strain generated by oblique projection, or aberration accompanied by ultra-wide angle (in particular, high order coma aberration or astigmatism) is attained. In addition, when the lens L16 has rectangle shape nearly equal to an XY ratio (aspect ratio) of the effective area of the image display surface, or trapezoidal shape matching to a region where image light flux passes through, it also has a shielding effect of unnecessary light which decreases image forming performance.

On the other hand, L3 and L11 are also plastic aspherical lenses, but because each lens is arranged at a position where an effective region of a lens, through which image light flux passes, includes an optical axis shared by a plurality of lenses configuring the oblique projection optical system, they have aspherical shape symmetric to the optical axis 11. The projection lens to attain the inclined projection optical system according to the present embodiment is configured by 16 pieces made of 13 pieces of glass lenses and three pieces of plastic lenses, and when magnification ratio was changed by changing projection distance, focus adjustment is performed by transferring L15 and L16 at the same time.

In embodiments represented in FIG. 27 through FIG. 32, the origin of XYZ orthogonal coordinate system is set at the center of the display screen of a liquid crystal panel 222 (not shown), which displays an image by modulating lighting flux by an image signal, and is shown as P0 in the drawing. Z-axis is assumed to be parallel to the normal line of the liquid crystal panel 222 (not shown) for image display. Y-axis is parallel to the shorter side of the display screen of the liquid crystal panel 222 (not shown) for image display, and is assumed to be the same as a longitudinal (up and down) direction of the liquid crystal panel 222 (not shown) for image display. X-axis is parallel to the longer side of the display screen of the liquid crystal panel 222 (not shown) for image display, and assumed to be the same as a lateral (left and right) direction of the display screen of the liquid crystal panel 222 (not shown) for image display. In addition, attached FIG. 27 and FIG. 31 are YZ and XZ cross-sectional views of the projection lens as other embodiment of the oblique projection optical system configuring the projection image display apparatus.

Figure 26:
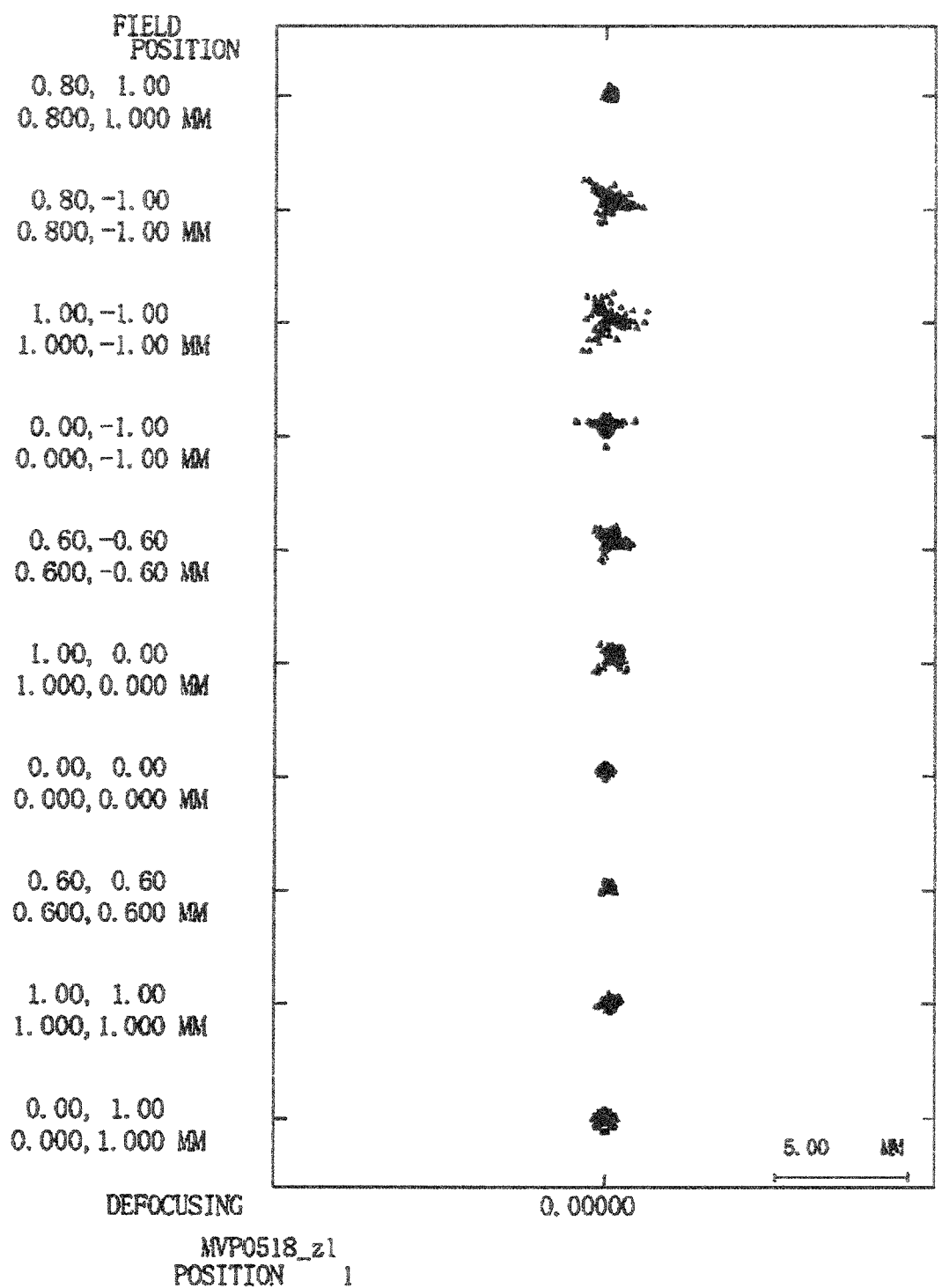
FIG. 26 is a spot drawing of a projection lens for attaining an oblique projection optical system according to one embodiment of the present invention as represented in FIGS. 25A and 25B.

FIG. 25A represents data relating to a spherical system, and 25B represents data relating to an aspherical system, among the lens data of the projection lens represented in FIG. 23, among projection lenses attaining the oblique projection optical system as one embodiment of the present invention. Still more, FIG. 26 shows spot shape of an image obtained on the projection surface, in a case where a landscape wide image, having an effective image display range of a liquid crystal panel for image display of 0.59 inches, is projected to 80 inches in a magnified way.

Figure 29:
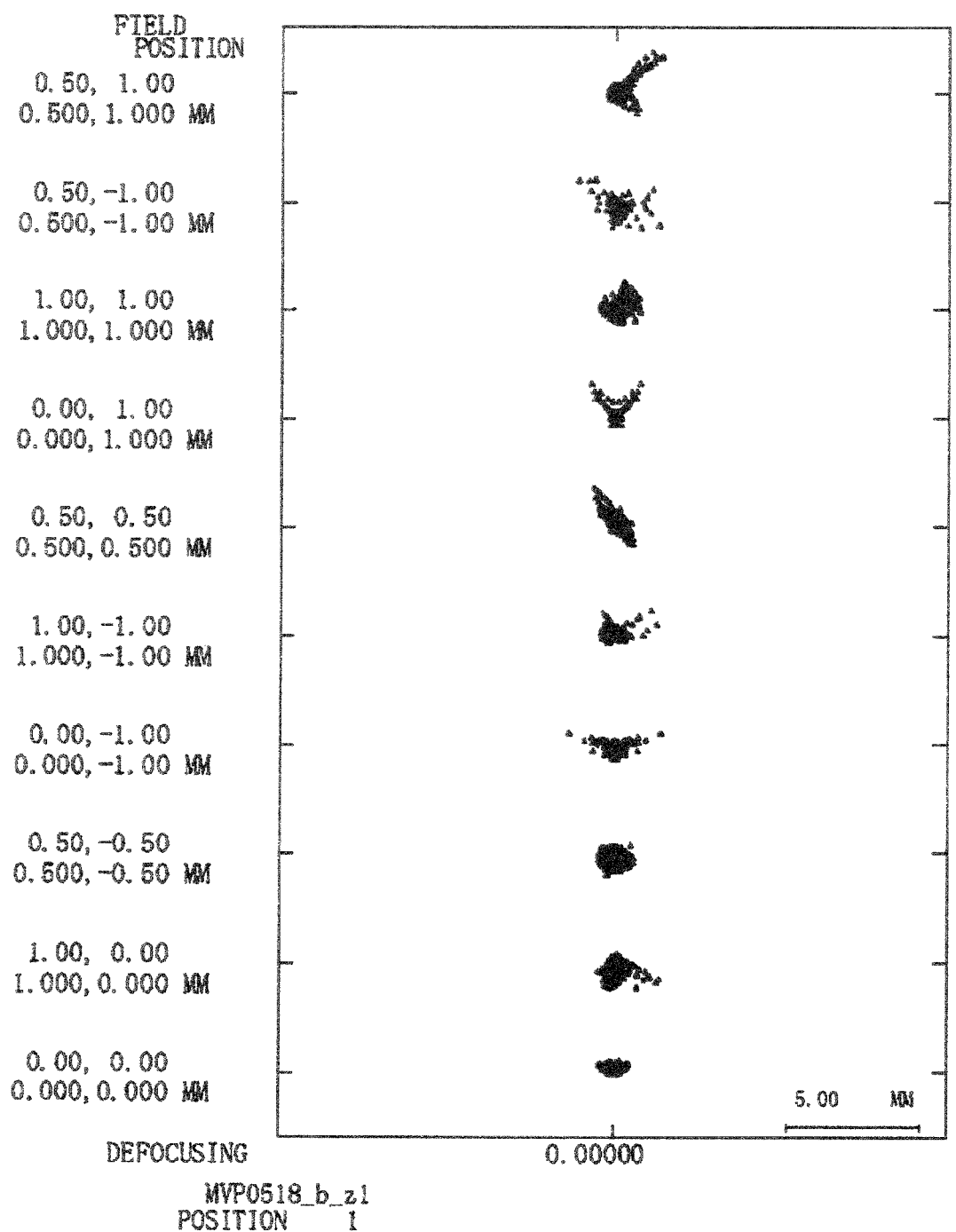
FIG. 29 is a spot drawing of a projection lens for attaining an oblique projection optical system according to one embodiment of the present invention as shown FIGS. 28A and 28B.
Figure 34:
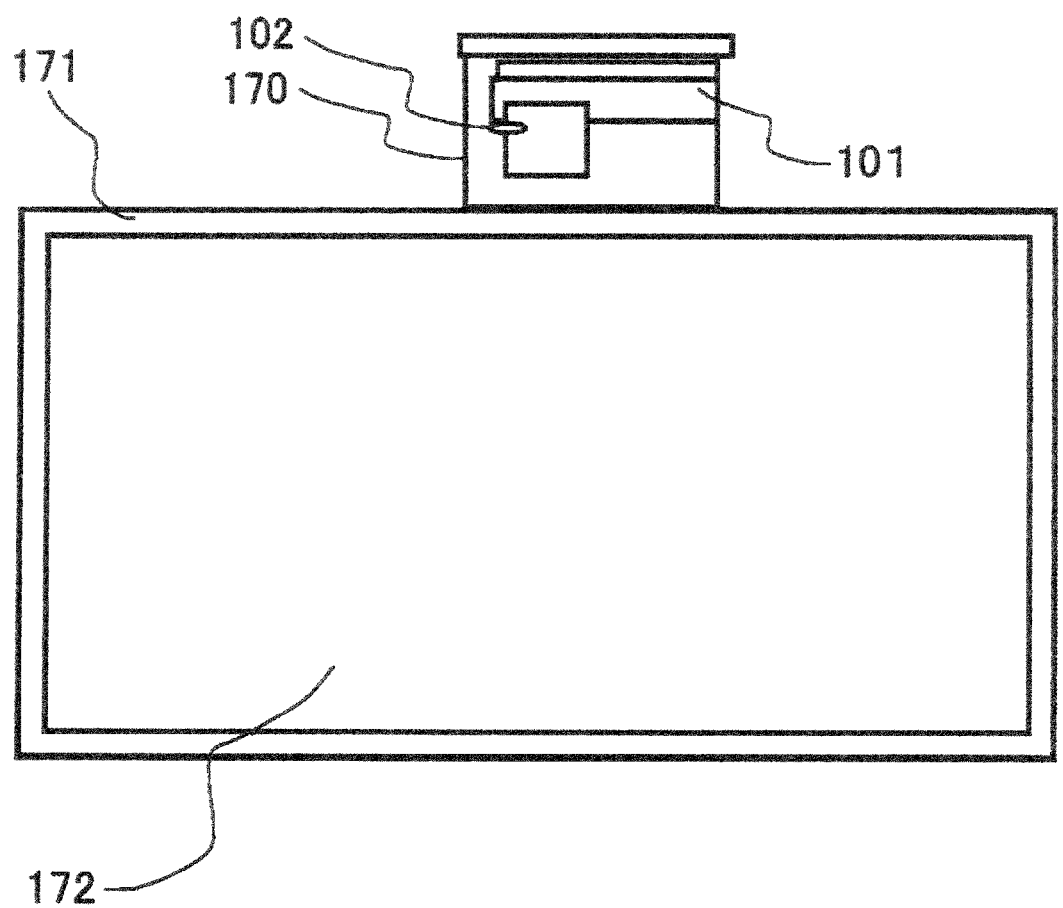
FIG. 34 is a front view illustrating one embodiment of a projection apparatus provided with a conventional oblique projection optical system.
Figure 35:
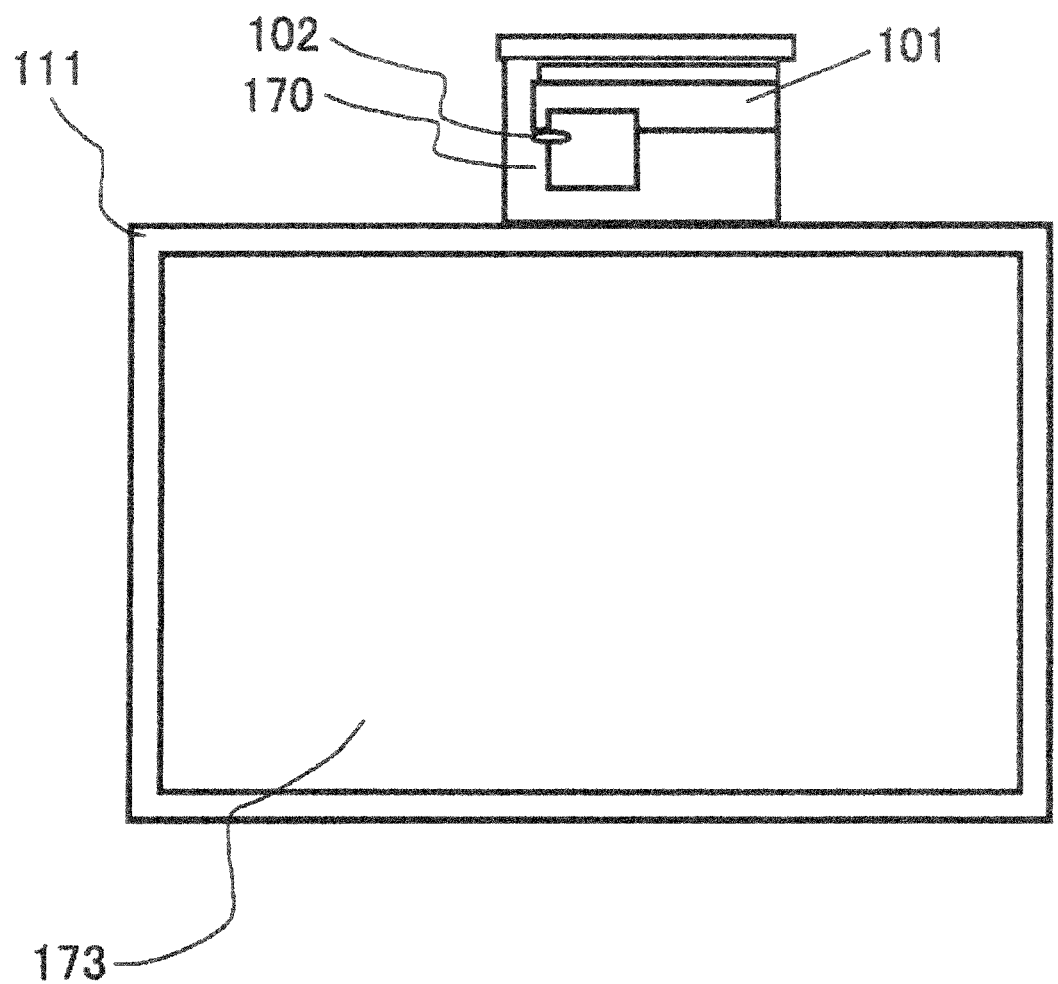
FIG. 35 is a front view illustrating one embodiment of a projection apparatus provided with a conventional oblique projection optical system.

In addition, FIG. 27 represents a cross-sectional view of the projection lens attaining the oblique projection optical system as the second embodiment, FIG. 28A represents data relating to a spherical system and an aspherical system, and 28B represents data relating to a free curved surface system, among lens data. Still more, FIG. 29 shows spot shape of an image obtained on the projection surface, in a case where an image, having an effective image display range of a liquid crystal panel for image display of 0.63 inches, is projected to 80 inches in a magnified way.

Similarly, FIG. 30A represents data relating to a spherical system and an aspherical system, and 30B represents data relating to a free curved surface system, among lens data of the projection lens attaining the oblique projection optical system as the third embodiment.

Similarly, FIG. 31 represents a cross-sectional view of the projection lens attaining the oblique projection optical system as the fourth embodiment, FIG. 32A represents data relating to a spherical system and an aspherical system which can be taken at this time, and 32B represents data relating to a free curved surface system. Still more, FIG. 33 shows spot shape of an image obtained on the projection surface, in a case where an image, having an effective image display range of a liquid crystal panel for image display of 0.63 inches, is projected to 80 inches in a magnified way.

Relation between Dv representing vertical dimension of the projection screen and shift amount of image display position from the optical axis in each of the embodiments is as follows:

In the first embodiment, 10:−2.5
In the second embodiment, 10:−2.3
In the third embodiment, 10:−2.3
In the fourth embodiment, 10:−2.3 and in the projection lens attaining the oblique projection optical system obtained according to the present invention, it is possible to set a shift amount S1 of equal to or more than 20% relative to the size Dv in the vertical direction of the image, as described above. Still more, the ratio (D/L) of D representing diagonal dimension of the projection screen, and L representing the distance between the lens arranged at the nearest position to the projection surface and the projection surface, has following relationships, for 80 inches projection (a diagonal dimension of 2032 mm):

In the first embodiment: 2032/885.6=2.29
In the second embodiment: 2032/1001.9=2.03
In the third embodiment: 2032/1138=1.79
In the fourth embodiment: 2032/1107.4=1.83 and the above ratio (D/L) of equal to or higher than 1.75 is capable of attaining a sufficiently compact projection apparatus, by arranging the mirror for folding light path between the projection lens and the projection surface.

On the other hand, in the first embodiment, as represented in FIG. 24, because the projection image display apparatus provided with the mirror for folding light path M1 can be attained, there are great merit such that a large screen is obtained by small installation space or the presenter does not directly see image light of the projection image display apparatus any more.

Subsequently, explanation will be given on a specific method for reading aberration correction mechanism and the lens data of the projection lens attaining the oblique projection optical system according to an embodiment of the present invention, using the lens data represented in FIGS. 25A and 25B for the projection lens of the embodiment 1 having a configuration represented in FIG. 23. As a whole, it is a three-group lens configuration, wherein L16 to L12 in the order from the projection surface (screen) side configure the third group, and L16 to L13 all are configured in a telecentric way, as concave lenses, and at the same time a convex lens is arranged using a glass material having a small Abbe number as L12 to reduce chromatic aberration of magnification. Still more, by arranging L16 at a position not including an optical axis L11 shared by a plurality of lenses configuring the oblique projection optical system, as represented in FIG. 24, strongly aspherical shape is obtained, which is light flux for making an image at the peripheral of the screen controllable only by lens shape of L16, and correction of trapezoidal strain generated by oblique projection or aberration accompanied by ultra-wide angle (in particular, high order coma aberration or astigmatism) is attained. At this time, it is not necessary that the external shape of lens L16 is circular shape symmetric to the optical axis, by the above reason, and it may be possible to adopt a rectangle with nearly the same XY ratio (aspect ratio) of the effective area of the image display surface, or trapezoidal shape matching to a region where image light flux passes through. Therefore, it has also an effect to shield unnecessary light which lowers image forming performance.

In addition, L11 through L19 configure the second group, and L11 is a lens having a strong aspherical shape with weak negative refraction force, and corrects the spherical aberration or the low order coma aberration generated by light flux nearly parallel to the optical axis, and passes through a place apart from the optical axis, and L10 and L9 share a part of the refraction force of a glass projection lens having positive refraction force, along with L9 provides convex meniscus shape at the projection surface (screen) side so as to suppress generation of the coma aberration and astigmatism.

Finally, L8 through L1 configure the first group, and by furnishing negative refraction force to L8 and L7 doublet lenses, and L6 through L4 triplet lenses, stronger telecentric property is furnished. Still more, by making L3 a lens with strong aspherical shape and correcting zona orbicularis coma aberration generated by light flux which is oblique to the optical axis and passes through a place apart from the optical axis, suppression of strain even in oblique projection as the whole projection lens and good focusing performance, as show by the spot image in FIG. 26, were attained.

The projection lens shown in the second embodiment to the fourth embodiment of the present invention attains good aberration correction by less lens pieces, by using a free curved lens having dramatically larger designing freedom, as compared with aspherical lenses used in the first embodiment. The second embodiment represented in FIG. 27 (lens data is represented in FIGS. 28A and 28B) is configured by the mirror M2 having free curved shape and 10 pieces made of 6 pieces of glass lenses and four pieces of plastic lenses, and the plastic lens is configured by asphrical lenses for L2 and L6, and free curved lenses for L9 and L10. In addition, the fourth embodiment represented in FIG. 31 is configured by the mirror M2 having free curved shape, and 10 pieces made of 6 pieces of glass lenses and four pieces of plastic lenses, and the plastic lens is configured by asphrical lenses for L2 and L6, and free curved lenses for L9 and L10.

In the second embodiment, as shown in YZ cross-section of FIG. 27, by arranging L9 and L10 at a position not including an optical axis L11 shared by a plurality of lenses, light flux for making an image at the peripheral of the screen becomes controllable only by the lens shape of L9 and L10, and still more by making a mirror M2 a free curved surface as well, as free curved shape having high aberration correction capability, correction of the trapezoidal strain generated by oblique projection, or aberration accompanied by ultra-wide angle (in particular, high order coma aberration or astigmatism) is attained, and as a result, good aberration correction was attained, as shown by the spot image in FIG. 29.

Similarly, the third embodiment (lens data is represented in FIGS. 30A and 30B) is configured by the mirror M2 having a free curved shape, and 12 pieces made of 8 pieces of glass lenses and four pieces of plastic lenses, and the plastic lens is configured by asphrical lenses for L2 and L8, and free curved lenses for L11 and L12. Also in the third embodiment, although not shown in a drawing, by arranging L11 and L12 at a position not including an optical axis L11 shared by a plurality of lenses, light flux for making an image at the peripheral of the screen becomes controllable only by the lens shape of L11 and L12, and still more by making the mirror M2 a free curved surface as well, having high aberration correction capability, correction of the trapezoidal strain generated by oblique projection, or aberration accompanied by ultra-wide angle (in particular, high order coma aberration or astigmatism) was attained.

Finally, in the fourth embodiment, a difference from the second embodiment, as represented in FIG. 31, is that L6 was added to the first group, L8 of the second group was divided to L10 and L11, and glass lens was increased by two pieces to reduce aberration generating.

As described above, also in the fourth embodiment, as shown in YZ cross-section of FIG. 31, by arranging L12 and L13 at a position not including an optical axis L11 shared by a plurality of lenses, light flux for making an image at the peripheral of the screen becomes controllable only by lens shape of L12 and L13, and by still more making also the mirror M2 a free curved surface, having higher capability of aberration correction, correction of the trapezoidal strain generating by oblique projection, or aberration accompanied by ultra-wide angle (in particular, high order coma aberration or astigmatism) was attained, and as a result, good aberration correction was attained as show by the spot image in FIG. 33.

Explanation will be given next on the above described inclined projection optical system, with reference to FIGS. 25 A and 25B, FIGS. 28A and 28B, FIGS. 30A and 30B, and FIGS. 32A and 32B, by exemplifying specific numerical values.

Firstly, FIG. 23 and FIG. 24 represent configurations of the projection optical system relevant to the embodiment of the present invention based on the numerical value examples represented in FIGS. 25A and 25B, and in the aforementioned XYZ orthogonal coordinates, FIG. 23 and FIG. 24 represent configurations in the YZ cross-section. A configuration drawing of the projection optical system of FIG. 23 is shown by developing in a Z direction, and this is similar also in FIG. 27 and FIG. 31.

Light emitted from PO of an image display screen shown at the left side of the above FIG. 23 (as the embodiment, a liquid crystal panel was used), firstly passes through the first group and the second group configured only by a lens having only a surface of rotation symmetry shape, among the projection lenses containing a plurality of lenses. Then, it passes through the third group containing the aspherical lens L16, which is rotation asymmetry relative to external center of the lens, and projected onto a projection surface in a magnified state.

Here, the first group and the second group of the projection lenses are configured by a plurality of lenses all having a refraction surface with rotation symmetric shape, and four surfaces among each refraction surfaces are rotation symmetric aspherical, and others are spherical. The rotation symmetric aspherical surface used here is expressed by Equation 1 of FIG. 25B, using a local cylindrical coordinate system for each surface.

Here, r represents a distance from the optical axis, and Z represents a sag amount of lens surface shape. In addition, c is a curvature at the apex, k represents a cone constant, and A through J are coefficients of exponentiation terms.

In addition, in FIG. 25A, curvature radius of each surface is described in (mm) unit. In FIG. 25A, in a case where the surface has the curvature center at the left side, it is shown by positive value, while in a contrary case, it is shown by negative value. In addition, in FIG. 25A, distance between the surfaces indicates the distance from the apex of the lens surface to the apex of the next lens surface. In a case where the next lens surface is positioned at the right side in FIG. 25A relative to a certain lens surface, distance between the surfaces is indicated by a positive value, and in a case where it is positioned at the left side, it is indicated by a negative value. Still more, in FIG. 25A, surface number (9), surface number (10), surface number (23), surface number (24), surface number (33), and surface number (34) are rotation symmetric aspherical to the optical axis, and in FIG. 25A, it is described as "aspherical" at the side of the number of the surface in the Table, for easy identification.

A rotation symmetric aspherical surface shape is expressed by the following Equation 1 (in FIG. 25B, the same expression is described except h is used for the following r).

$$Z = \frac{cr^2}{1+\sqrt{1-(1+k)c^2r^2}} + A \cdot r^4 + B \cdot r^6 + C \cdot r^8 + D \cdot r^{10} + E \cdot r^{12} + F \cdot r^{14} + G \cdot r^{16} + H \cdot r^{18} + J \cdot r^{20} \quad \text{(Equation 1)}$$

Coefficients of these six aspherical surfaces are indicated in the following FIG. 25B.

From the Table of the above FIG. 25B, it is understood that Korenich coefficient k is 0 in the present embodiment. Trapezoidal strain caused by oblique incidence is extremely largely generated in an oblique incidence direction, and the strain amount is small in a direction vertical thereto. Therefore, greatly different function is required in the oblique incident direction and the direction vertical thereto, and by not utilizing the above Korenich coefficient k, which is rotation symmetric and functions in all directions, asymmetric aberration can be corrected well.

It should be noted that numerical values indicated in Tables of the above FIGS. 25A and 25B are described as values which can be taken, in a case where an optically-modulated optical image (modulated optical image), in a range of an aspect ratio of 16×9 and a diagonal dimension of 0.59 inches on the screen of a liquid crystal panel of the image display surface, is projected by enlargement onto the screen of the projection surface with a diagonal dimension of 60 inches, 80 inches and 100 inches, and to obtain optimal focus performance in the enlarged image for each size, it is preferable to transfer L15 and L16 in parallel to the optical axis, so that values of lens spaces (30) and (34) become values of the surface spaces of the lower Table of FIG. 25B.

The lens data described in FIGS. 28A and 28B, FIGS. 30A and 30B, and FIGS. 32A and 32B also are described in a similar format, however, the numerical values shown in Tables are described as values which can be taken in a case where an optically-modulated optical image (modulated optical image), in a range of an aspect ratio of 4:3 and a diagonal dimension of 0.63 inches on the screen of a liquid crystal panel of the image display surface, is projected by enlargement onto the screen of the projection surface with a diagonal dimension of 60 inches, 80 inches and 100 inches, and indicates a lens space to be moved to obtain an optimal focus performance in the enlarged image for each size.

In addition, surface number (18), surface number (19), surface number (20), and surface number (21) in FIGS. 28A and 28B are each refraction surface of the free curved lens, and surface number (22) is a reflection surface of the free curved mirror, and are indicated having a shape name attached at the side of the surface number. The shape of these five free curve surfaces is expressed by the following Equation 2, and values of coefficient C (m, n) for each value of m and n in the following Equation are indicated in FIG. 28B. It should be noted that two pieces of the free curved lenses are those for correcting the trapezoid strain generated by oblique projection in cooperation with the free curved mirror M2 of the reflection mirror system.

$$Z = \frac{cr^2}{1+\sqrt{1-(1+k)c^2r^2}} + \sum_m \cdot \sum_n (C(m,n) \cdot x^m \cdot y^n) \quad \text{(Equation 2)}$$

In FIG. 28, the name and value of the coefficient are indicated side by side at the left and right in a frame set, and the right side indicates value of the coefficient, and the left side indicates the name, and two sets of values partitioned by comma in a parenthesis, indicates the values of m and n expressed by Equation 2.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection apparatus having a projection optical system comprising:
    a plurality of lenses which project an image light from an image display element onto a screen;
    wherein the screen is provided with a Fresnel lens on an incidence side of the image light;
    wherein a cross-section of the Fresnel lens in a vertical direction of the screen is comprised of a first lens region wherein the image light is emitted to an image viewing side by refraction action, a second lens region which is a mixed region of the region where the image light is emitted to the image viewing side by refraction action and region where the image light is emitted to the image viewing side by total reflection of the image light are mixed, and a third region where the image light is emitted to the image viewing side by the total reflection of the image light; and
    wherein a ratio of the second lens region changes from a first end of the Fresnel lens in the vertical direction of the screen toward a second end of the Fresnel lens, and wherein the first region is located at the first end, the second region is located at the second end, and the third end is located in between the first end and the second end in the vertical direction of the screen.

2. The projection apparatus according to claim 1, wherein the Fresnel lens has linear Fresnel shape.

3. The projection apparatus according to claim 1, wherein the Fresnel lens is provided with a diffusion material having light diffusion action on the image viewing side of the image light.

4. The projection apparatus according to claim 1, wherein a diagonal dimension of a image display region where the image light is displayed on the image display element is equal to or smaller than 1.3 inches, or an effective pixel number of the image display region is equal to or more than 780,000 pixels.

5. The projection apparatus according to claim 1, wherein a ratio of peripheral light amount of the plurality of lens is equal to or larger than 60%.

6. The projection apparatus according to claim 1, wherein the projection optical system is provided with a curved mirror which reflects light emitted from the plurality of lenses and a planar mirror which directs the light reflected by the curved mirror to the screen.

7. The projection apparatus according to claim 6, wherein the planar mirror is arranged to be parallel to the screen.

8. The projection apparatus according to claim 6,
    wherein the second end of the effective region of the curved mirror in a vertical direction with respect to the screen is positioned above the first end of the effective region of the planar mirror in the vertical direction with respect to the screen.

9. The projection apparatus according to claim 7,
    wherein the second end of the effective region of the curved mirror in a vertical direction with respect to the screen is positioned above the first end of the effective region of the planar mirror, in the vertical direction with respect to the screen.

10. The projection apparatus according to claim 1,
    wherein an effective region of a light flux of image, which passes through a first lens arranged at a nearest position to the screen among the plurality of lenses, does not include an optical axis shared by a plurality of lenses which do not include the first lens; and
    wherein when L represents space between the first lens and the screen, and D represents a diagonal dimension of the screen, a following relationship is satisfied:

$1.75 < D/L.$

11. The projection apparatus according to claim 1, further comprising:
    a mechanism enabling a position of the screen to be adjusted in the vertical direction of the screen.

12. The projection apparatus according to claim 1, wherein the image display element has an effective image display region of equal to or smaller than about 90%, relative to a diagonal dimension or area of an effective region of an object surface of the plurality of lens.

13. The projection apparatus according to claim 1, wherein the image display element has an effective image display region of equal to or smaller than about 70%, relative to a diagonal dimension or area of an effective region of an object surface of the plurality of lens.

14. The projection apparatus according to claim 1, wherein the projection optical system is arranged being shifted by a predetermined amount in a horizontal direction of the screen, relative to a center of an external shape of the screen.

15. The projection apparatus according to claim 1, further comprising:
    a linking unit which integrates the projection optical system and the screen.

16. The projection apparatus according to claim 1, further comprising:

an image input unit and a voice input unit which are arranged at the second end part of the screen.

17. The projection apparatus according to claim 16, further comprising:
means which changes an image signal obtained from the image input unit to an image signal with an aspect ratio of 4:3, and means which scales an image corresponding to a dimension and a display position of an image display region.

18. A screen comprising:
a Fresnel lens; wherein
a cross-section of the Fresnel lens in a vertical direction of the screen is comprised of a first lens region where the image light is emitted to an image viewing side by refraction action, a second lens region which is mixed region of the region where the image light is emitted to the image viewing side by refraction action and region where the image light is emitted to the image viewing side by total reflection of the image light are mixed, and a third region where the image light is emitted to the image viewing side by the total reflection of the image light; and
a ratio of the second lens region changes from a first end of the Fresnel lens in the vertical direction of the screen toward a second end of the Fresnel lens, and wherein the first region is located at the first end, the second region is located at the second end, and the third end is located in between the first end and the second end in the vertical direction of the screen.

19. The screen according to claim 18, wherein the Fresnel lens has a linear Fresnel shape.

20. The screen according to claim 18, wherein the Fresnel lens is formed on a sheet substrate with a thickness of equal to or less than 300 μm using a roll mold, and then hardened by irradiating UV rays, or visible rays, or electromagnetic waves.

21. The screen according to claim 18, wherein the Fresnel lens is fixed to a diffusion layer containing a diffusion material having light diffusion action, by adhesion or pressure sensitive adhesion.

22. The screen according to claim 18, wherein when t represents a substrate thickness of the screen and D represents a diagonal dimension of the screen, a following relationship is satisfied:

$1/400 < t/D < 1/200.$

23. The screen according to claim 18, wherein when Gs represents a gain of the screen and Ts represents a transmittance of the screen, a following relationship is satisfied:

$0.6 < Gs < 2.0$ and $0.3 < Ts < 1.0.$

* * * * *